(12) United States Patent
Hamanaka

(10) Patent No.: US 7,706,601 B2
(45) Date of Patent: Apr. 27, 2010

(54) OBJECT POSTURE ESTIMATION/CORRELATION SYSTEM USING WEIGHT INFORMATION

(75) Inventor: Masahiko Hamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1095 days.

(21) Appl. No.: 10/570,128

(22) PCT Filed: Aug. 27, 2004

(86) PCT No.: PCT/JP2004/012384

§ 371 (c)(1),
(2), (4) Date: Feb. 28, 2006

(87) PCT Pub. No.: WO2005/027048

PCT Pub. Date: Mar. 24, 2005

(65) Prior Publication Data

US 2006/0165293 A1 Jul. 27, 2006

(30) Foreign Application Priority Data

Aug. 29, 2003 (JP) .............................. 2003-305789

(51) Int. Cl.
*G06K 9/00* (2006.01)
(52) U.S. Cl. .................. 382/154; 382/209; 382/199
(58) Field of Classification Search ................ 382/154, 382/209, 103
See application file for complete search history.

(56) References Cited

U.S. PATENT DOCUMENTS 4,654,872 A * 3/1987 Hisano et al. ............... 382/154

(Continued)

FOREIGN PATENT DOCUMENTS

JP 09-091436 4/1997

(Continued)

OTHER PUBLICATIONS

The Transaction of the Institute of Electronics, Information and Communication Engineers, vol. J78-D-11, No. 11, Nov. 1995, pp. 1639-1649.

(Continued)

*Primary Examiner*—Daniel G Mariam
*Assistant Examiner*—Aklilu k Woldemariam
(74) *Attorney, Agent, or Firm*—Dickstein, Shapiro, LLP.

(57) ABSTRACT

An object pose estimating and matching system is disclosed for estimating and matching the pose of an object highly accurately by establishing suitable weighting coefficients, against images of an object that has been captured under different conditions of pose, illumination. Pose candidate determining unit determines pose candidates for an object. Comparative image generating unit generates comparative images close to an input image depending on the pose candidates, based on the reference three-dimensional object models. Weighting coefficient converting unit determines a coordinate correspondence between the standard three-dimensional weighting coefficients and the reference three-dimensional object models, using the standard three-dimensional basic points and the reference three-dimensional basic points, and converts the standard three-dimensional weighting coefficients into two-dimensional weighting coefficients depending on the pose candidates. Weighted matching and pose selecting unit calculates weighted distance values or similarity degrees between said input image and the comparative images, using the two-dimensional weighting coefficients, and selects one of the comparative images whose distance value up to the object is the smallest or whose similarity degree with respect to the object is the greatest, thereby to estimate and match the pose of the object.

3 Claims, 34 Drawing Sheets

U.S. PATENT DOCUMENTS

| | | | | |
|---|---|---|---|---|
| 4,935,810 | A * | 6/1990 | Nonami et al. | 348/45 |
| 5,282,030 | A * | 1/1994 | Nishimura et al. | 348/71 |
| 5,432,543 | A * | 7/1995 | Hasegawa et al. | 348/45 |
| 6,721,444 | B1 * | 4/2004 | Gu et al. | 382/154 |
| 6,850,646 | B1 * | 2/2005 | Silver et al. | 382/199 |
| 2003/0209893 | A1 * | 11/2003 | Breed et al. | 280/735 |
| 2004/0129478 | A1 * | 7/2004 | Breed et al. | 180/273 |
| 2007/0031001 | A1 * | 2/2007 | Hamanaka | 382/103 |

FOREIGN PATENT DOCUMENTS

| | | |
|---|---|---|
| JP | 2000-306095 | 11/2000 |
| JP | 2000-306099 | 11/2000 |
| JP | 2001-012925 | 1/2001 |
| JP | 2001-283216 | 10/2001 |
| JP | 2001-283229 | 10/2001 |
| JP | 2002-024830 | 1/2002 |
| JP | 2002-157595 | 5/2002 |
| JP | 2002-288687 | 10/2002 |
| JP | 2003-058896 A | 2/2003 |

OTHER PUBLICATIONS

Baofeng Guo, et al., "Human face recognition based on spatially weighted Hausdorff distance," Pattern Recognition Letters 24, pp. 499-507, www.elevier.com/locat/patrec.

Hamanaka et al., Sokuchi Shomei Kitei of Mochiita Kao Shongo ni Okeru In'eibu no Eikyo ni Tsuite, FIT (Joho Kagaku Gijutsu Forum), pp. 65-66 (2002).

Hamanaka et al., "Nini'i Shisei ni Taioshita Hyojun Sokuchi Omomi o Mochiita Kao Shogo", The Institute of Electronics, Information and Communication Engineers Gijutsu Hokoku, vol. 103, No. 296, pp. 61-66 (2003).

* cited by examiner $G_{11}$ $G_{12}$ $G_{13}$ ...

$W_{11}$ $W_{12}$ $W_{13}$ ...

OBJECT POSTURE ESTIMATION/CORRELATION SYSTEM USING WEIGHT INFORMATION

TECHNICAL FIELD

The present invention relates to an object pose estimating and matching system for estimating and matching the pose of an object by matching an input image of an object (including the face of a person) that has been captured under different conditions of pose, illumination, etc., against referenced images and three-dimensional object models stored in a database (DB).

BACKGROUND ART

One example of conventional object pose estimating and matching system is disclosed in Shimada, et. al. "Method of constructing a dictionary for personal identification independent of face orientation" IEICE TRANSACTIONS D-II, Vol. J78-D-II, No. 11, pages 1639-1649, 1995 (hereinafter referred to as "first prior art"). As shown in FIG. 1, the object pose estimating and matching system according to the first prior art has image input unit 10, normalizer 15, matching and pose selecting unit 41, and pose-specific reference image storage unit 85.

The conventional object pose estimating and matching system thus constructed operates as follows: Pose-specific reference image storage unit 85 stores at least one pose-specific reference image captured of one or more objects under one or various pose conditions. Each pose-specific reference image is generated from one image or an average of images captured for each pose. Image input unit 10 is implemented by a camera or the like, and stores a captured input image in a memory (not shown). Input images may be read from a recorded file or acquired through a network. Normalizer 15 aligns an input image using feature points extracted from the object, and generates a normalized image. In the illustrated system, normalizer 15 aligns an input image by detecting, as feature points, the positions of characteristic parts, e.g., an eye and a mouth. The pose-specific reference image is also normalized and stored. Normalized images often use features obtained by a feature extracting process. Matching and pose selecting unit 41 calculates distance values (or similarity degrees) between the normalized image and the pose-specific reference images of respective objects obtained from pose-specific reference image storage unit 85, and selects one of the reference images whose distance value up to the object is the smallest (whose similarity degree is the largest), thereby estimating an optimum pose. The distance values are calculated by using the normalized correlation or Euclidean distance, for example. If an input image is matched against one object (one-to-one matching), then the minimum distance value is compared with a threshold value to determine whether the input image is the same as the object or the not. If one of a plurality of objects (reference images) which is closest to an input image is searched for (one-to-N matching), then one of the objects which has the smallest one of the minimum distance values determined up to the respective objects is extracted.

Another example of conventional object pose estimating and matching system is disclosed JP-2003-58896A (hereinafter referred to as "second prior art"). As shown in FIG. 2, the conventional object pose estimating and matching system according to the second prior art has image input unit 10, comparative image generator 20, pose candidate determining unit 30, matching and pose selecting unit 41, and reference three-dimensional object model storage unit 55.

The conventional object pose estimating and matching system thus constructed operates as follows: Reference three-dimensional object model storage unit 55 registers therein reference three-dimensional object models of respective objects (three-dimensional shapes and object surface textures of the objects). Pose candidate determining unit 30 determines at least one pose candidate. Comparative image generator 20 generates a comparative image having illuminating conditions close to those of the input image, based on the reference three-dimensional object models obtained from reference three-dimensional object model storage unit 55. Matching and pose selecting unit 41 calculates distance values (or similarity degrees) between the input image and the comparative images, and selects one of the comparative images (pose candidate) whose distance value up to the model (object) is the smallest, thereby estimating an optimum pose.

Still another example of conventional object matching system is disclosed in Guo, et. al. "Human face recognition based on spatially weighted Hausdorff distance" Pattern Recognition Letters, Vol. 24, pages 499-507, 2003 (hereinafter referred to as "third prior art"). As shown in FIG. 3, the conventional object matching system according to the third prior art has image input unit 10, normalizer 15, weighted matching unit 45, reference image storage unit 89, and weighting coefficient storage unit 99.

The conventional object matching system thus constructed operates as follows: Image input unit 10 and normalizer 15 operate in the same manner as the components denoted by the identical reference numerals according to the first prior art. Reference image storage unit 89 stores at least one reference image for each object. Weighting coefficient storage unit 99 stores weighting coefficients for pixels (or features) to be used for comparing a normalized image and reference images. Weighted matching unit 45 calculates distance values (or similarity degrees) between the normalized image and the reference images of respective objects obtained from reference image storage unit 89, and selects one of the reference images whose distance value is the smallest, thereby matching the input image. If the Euclidean distance, for example, is used for calculating the distances, then a weighted Euclidean distance is calculated according to $D=\Sigma_r w(r)\{x(r)-m(r)\}^2$ where $x(r)$ represents the normalized image, $m(r)$ the comparative image, and $w(r)$ the weighting coefficient (r represents a pixel or feature index).

The conventional object matching systems described above have the following problems:

According to the first prior art and the second prior art, though a pose can be estimated and matched, the accuracy with which a pose is estimated and matched is lowered if a large local difference is developed between an input image and reference images or comparative images from the DB due to local deformations of the object and different image capturing conditions.

The reasons for the above problem are that when the object is deformed, even if the pose of the object is generally aligned with those of the reference images or comparative images, the object has a local area not aligned with the reference images or comparative images, resulting in different pixel values (or features) in the local area. Even when the object is not deformed and has aligned local areas, according to the first prior art, there is developed a local area having largely different pixel values if the input image and the reference images are captured under different conditions. For example, if the input image and the reference images are captured under different illuminating conditions, then shadows are produced in different areas. According to the second prior art, even if a comparative image is generated which is closest to an input image, they have different local areas because of observing errors in three-dimensional object measurement and a simplified process of generating comparative images.

The third prior art is problematic in that the matching accuracy is reduced if object poses and illuminating conditions in an input image and reference images are different from each other.

The reasons for the problem of the third prior art are that weighting coefficients are established for areas of an object, and if pose conditions are different, then the object has a misaligned area, making it impossible to perform proper weighted matching. Furthermore, when illuminating conditions are different, an area that is important for matching often changes. However, since the weighting coefficient remains the same, appropriate weighted matching cannot be performed.

DISCLOSURE OF THE INVENTION

It is an object of the present invention to provide an object pose estimating and matching system for estimating and matching the pose of an object highly accurately by establishing suitable weighting coefficients depending on the pose even if a large local difference is developed in the comparison between an input image and images from a DB.

Another object of the present invention is to provide an object pose estimating and matching system for estimating and matching the pose of an object by establishing suitable weighting coefficients depending on variations that may occur as deformations and illuminating condition variations.

According to a first aspect of the present invention, an object pose estimating and matching system comprises:

reference three-dimensional object model storage means for storing, in advance, reference three-dimensional object models of objects;

reference three-dimensional weighting coefficient storage means for storing, in advance, reference three-dimensional weighting coefficients corresponding to said reference three-dimensional object models;

pose candidate determining means for determining pose candidates for an object;

comparative image generating means for generating comparative images close to an input image depending on said pose candidates, based on said reference three-dimensional object models;

weighting coefficient converting means for converting said reference three-dimensional weighting coefficients into two-dimensional weighting coefficients depending on said pose candidates, using said reference three-dimensional object models; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

Three-dimensional weighting coefficients corresponding to three-dimensional object models are generated and stored. For matching the input image, comparative images are generated from reference three-dimensional object models depending on pose candidates, and the three-dimensional weighting coefficients are converted into two-dimensional weighting coefficients, so that weighted distances are calculated. Therefore, highly accurate pose estimation and matching can be performed by setting appropriate weighting coefficients depending on poses.

According to a second aspect of the present invention, an object pose estimating and matching system comprises:

reference three-dimensional object model storage means for storing, in advance, reference three-dimensional object models of objects;

standard three-dimensional weighting coefficient storage means for storing, in advance, standard three-dimensional weighting coefficients;

reference three-dimensional basic point storage means for storing, in advance, reference three-dimensional basic points corresponding to said reference three-dimensional object models;

standard three-dimensional basic point storage means for storing, in advance, standard three-dimensional basic points corresponding to standard three-dimensional object models;

pose candidate determining means for determining pose candidates for an object;

comparative image generating means for generating comparative images close to an input image depending on said pose candidates, based on said reference three-dimensional object models;

weighting coefficient converting means for determining a coordinate correspondence between said standard three-dimensional weighting coefficients and said reference three-dimensional object models, using said standard three-dimensional basic points and said reference three-dimensional basic points, and converting said standard three-dimensional weighting coefficients into two-dimensional weighting coefficients depending on said pose candidates; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

Comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses.

According to a third aspect of the present invention, an object pose estimating and matching system comprises:

reference three-dimensional object model storage means for storing, in advance, reference three-dimensional object models of objects;

variation-specific reference three-dimensional weighting coefficient storage means for storing, in advance, reference three-dimensional weighting coefficients corresponding to said reference three-dimensional object models and image variations;

pose candidate determining means for determining pose candidates for an object;

variation estimating means for determining a correspondence between an area of a three-dimensional object model and an input image, using said pose candidates and said reference three-dimensional object models, and estimating a variation based on image information of a given area of said input image;

comparative image generating means for generating comparative images close to an input image depending on said pose candidates, based on said reference three-dimensional object models;

weighting coefficient converting means for converting said reference three-dimensional weighting coefficients corresponding to the estimated variation into two-dimensional weighting coefficients depending on said pose candidates, using said reference three-dimensional object models; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

Comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses. Moreover, variation-specific three-dimensional weighting coefficients corresponding variations which can occur in the input image are held, a variation is estimated from the input image, and a corresponding three-dimensional weighting coefficient is employed. Therefore, highly accurate pose estimation and matching can be performed by setting appropriate weighting coefficients depending on variations that may occur as object deformations and illuminating condition variations.

According to a fourth aspect of the present invention, an object pose estimating and matching system comprises:

reference three-dimensional object model storage means for storing, in advance, reference three-dimensional object models of objects;

variation-specific standard three-dimensional weighting coefficient storage means for storing, in advance, standard three-dimensional weighting coefficients corresponding to image variations;

reference three-dimensional basic point storage means for storing, in advance, reference three-dimensional basic points corresponding to said reference three-dimensional object models;

standard three-dimensional basic point storage means for storing, in advance, standard three-dimensional basic points corresponding to standard three-dimensional object models;

pose candidate determining means for determining pose candidates for an object;

variation estimating means for determining a correspondence between an area of a three-dimensional object model and an input image, using said pose candidates and said reference three-dimensional object models, and estimating a variation based on image information of a given area of said input image;

comparative image generating means for generating comparative images close to an input image depending on said pose candidates, based on said reference three-dimensional object models;

weighting coefficient converting means for determining a coordinate correspondence between said standard three-dimensional weighting coefficients corresponding to the estimated variation and said reference three-dimensional object models, using said standard three-dimensional basic points and said reference three-dimensional basic points, and converting said standard three-dimensional weighting coefficients into two-dimensional weighting coefficients depending on said pose candidates; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

Comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses. Moreover, variation-specific three-dimensional weighting coefficients corresponding variations which can occur in the input image are held, a variation is estimated from the input image, and a corresponding three-dimensional weighting coefficient is employed. Therefore, highly accurate pose estimation and matching can be performed by setting appropriate weighting coefficients depending on variations that may occur as object deformations and illuminating condition variations.

According to a fifth aspect of the present invention, an object pose estimating and matching system comprises:

pose-specific reference image storage means for storing, in advance, pose-specific reference images of an object;

pose-specific reference weighting coefficient storage means for storing, in advance, pose-specific reference weighting coefficients corresponding to said reference images;

normalizing means for normalizing an input image to generate a normalized image; and weighted matching and pose selecting means for calculating weighted distance values or similarity degrees between said normalized image and said reference images, using said pose-specific weighting coefficients, and selecting one of the reference images whose distance value up to said object is the smallest or whose similarity degree with respect to said object is the greatest, thereby to estimate and match the pose of said object.

Weighted distances are calculated using pose-specific weighting coefficients corresponding to pose-specific reference images. Therefore, highly accurate pose estimation and matching can be performed by setting appropriate weighting coefficients depending on poses.

According to a sixth aspect of the present invention, an object pose estimating and matching system comprises:

pose-specific reference image storage means for storing, in advance, pose-specific reference images of an object;

pose-specific standard weighting coefficient storage means for storing, in advance, pose-specific standard weighting coefficients;

normalizing means for normalizing an input image to generate a normalized image; and weighted matching and pose selecting means for calculating weighted distance values or similarity degrees between said normalized image and said reference images, using said pose-specific weighting coefficients, and selecting one of the reference images whose distance value up to said object is the smallest or whose similarity degree with respect to said object is the greatest, thereby to estimate and match the pose of said object.

Weighted distances are calculated using pose-specific weighting coefficients corresponding to pose-specific reference images. Therefore, highly accurate pose estimation and matching can be performed by setting appropriate weighting coefficients depending on poses.

According to a seventh aspect of the present invention, an object pose estimating and matching system comprises:

pose-specific reference image storage means for storing, in advance, pose-specific reference images of an object;

pose- and variation-specific reference weighting coefficient storage means for storing, in advance, pose- and variation-specific reference weighting coefficients corresponding to said reference images and image variations;

standard three-dimensional object model storage means for storing, in advance, standard three-dimensional object models;

normalizing means for normalizing an input image to generate a normalized image;

variation estimating means for determining a correspondence between an area of a three-dimensional object model and the normalized image, using pose information of said reference images and said standard three-dimensional object models, and estimating a variation based on image information of a given area of said normalized image; and weighted matching and pose selecting means for calculating weighted distance values or similarity degrees between said normalized image and said reference images, using the pose information of said reference images and said pose- and variation-specific weighting coefficients corresponding to the estimated variation, and selecting one of the reference images whose distance value up to said object is the smallest or whose similarity degree with respect to said object is the greatest, thereby to estimate and match the pose of said object.

Weighted distances are calculated using pose-specific weighting coefficients corresponding to pose-specific reference images. Therefore, highly accurate pose estimation and matching can be performed by setting appropriate weighting coefficients depending on poses. Moreover, pose- and variation-specific weighting coefficients corresponding variations which can occur in the input image are held, a variation is estimated from the normalized image, and a corresponding weighting coefficient is employed. Therefore, highly accurate pose estimation and matching can be performed by setting appropriate weighting coefficients depending on variations that may occur as object deformations and illuminating condition variations.

According to an eighth aspect of the present invention, an object pose estimating and matching system comprises:

pose-specific reference image storage means for storing, in advance, pose-specific reference images of an object;

pose- and variation-specific standard weighting coefficient storage means for storing, in advance, pose- and variation-specific standard weighting coefficients corresponding to image variations;

standard three-dimensional object model storage means for storing, in advance, standard three-dimensional object models;

normalizing means for normalizing an input image to generate a normalized image;

variation estimating means for determining a correspondence between an area of a three-dimensional object model and the normalized image, using pose information of said reference images and said standard three-dimensional object models, and estimating a variation based on image information of a given area of said normalized image; and weighted matching and pose selecting means for calculating weighted distance values or similarity degrees between said normalized image and said reference images, using the pose information of said reference images and said pose- and variation-specific weighting coefficients corresponding to the estimated variation, and selecting one of the reference images whose distance value up to said object is the smallest or whose similarity degree with respect to said object is the greatest, thereby to estimate and match the pose of said object.

Weighted distances are calculated using pose-specific weighting coefficients corresponding to pose-specific reference images. Therefore, highly accurate pose estimation and matching can be performed by setting appropriate weighting coefficients depending on poses. Moreover, pose- and variation-specific weighting coefficients corresponding to variations which can occur in the input image are held, a variation is estimated from the normalized image, and a corresponding weighting coefficient is employed. Therefore, highly accurate pose estimation and matching can be performed by setting appropriate weighting coefficients depending on variations that may occur as object deformations and illuminating condition variations.

BEST MODE FOR CARRYING OUT THE INVENTION

1st Embodiment

Figure 4:
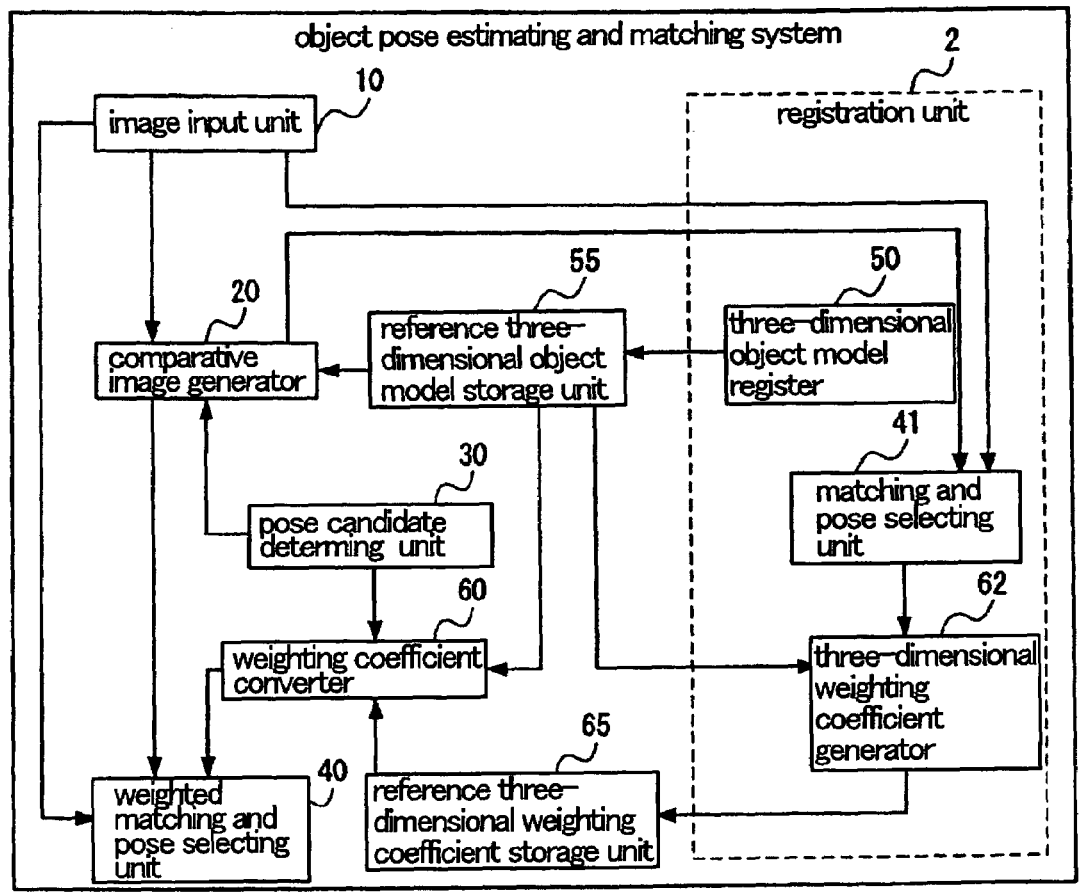
FIG. 4 is a block diagram of an arrangement of an object pose estimating and matching system according to a first embodiment of the present invention.

Referring to FIG. 4, an object pose estimating and matching system according to a first embodiment of the present invention comprises image input unit 10, comparative image generator 20, pose candidate determining unit 30, weighted matching and pose selecting unit 40, weighting coefficient converter 60, reference three-dimensional object model storage unit 55, reference three-dimensional weighting coefficient storage unit 65, and registration unit 2. Registration unit 2 comprises three-dimensional object model register 50, matching and pose selecting unit 41, and three-dimensional weighting coefficient generator 62.

Figure 1:
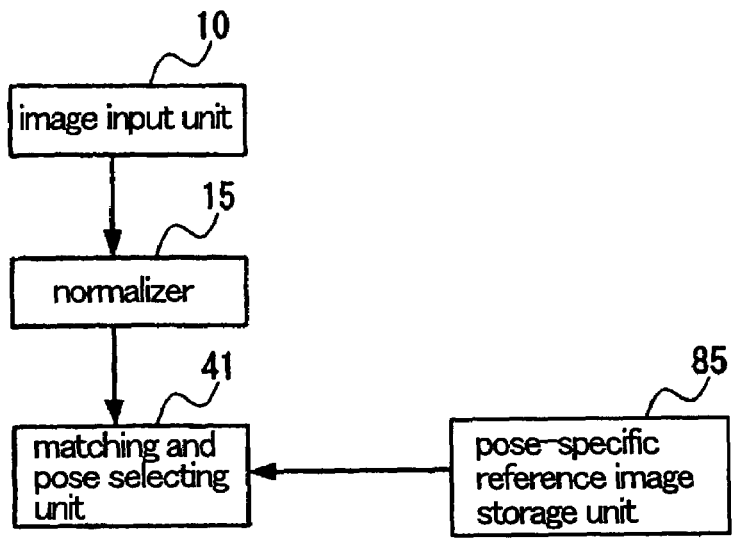
FIG. 1 is a block diagram of an arrangement according to a first prior art.
Figure 2:
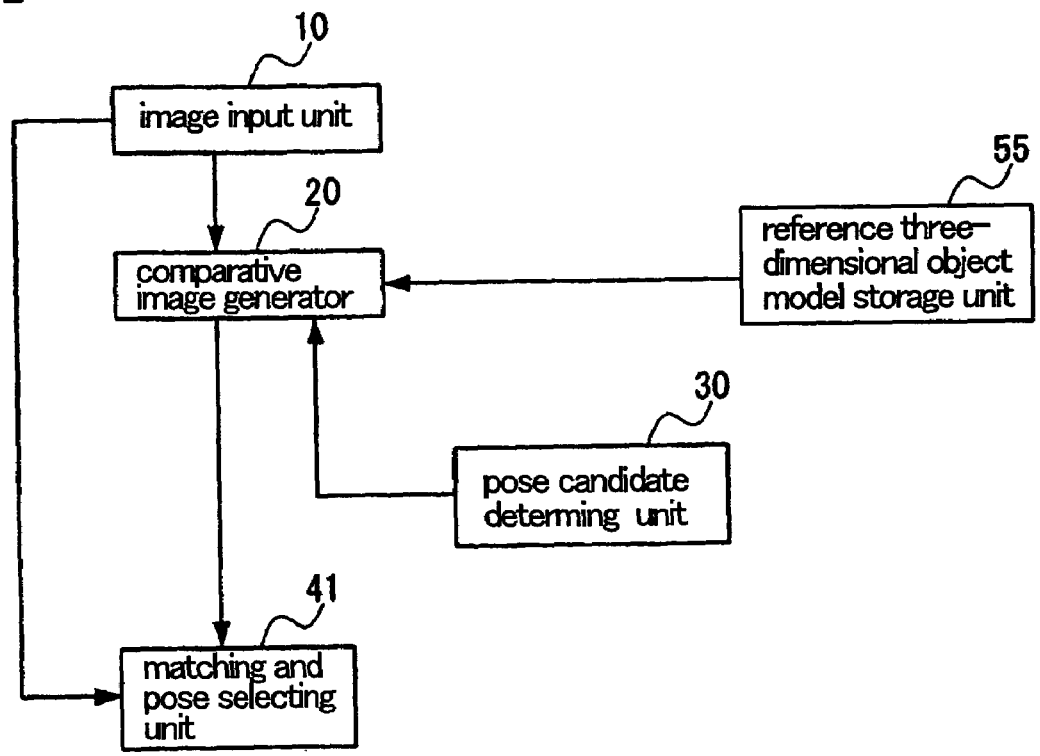
FIG. 2 is a block diagram of an arrangement according to a second prior art.
Figure 3:
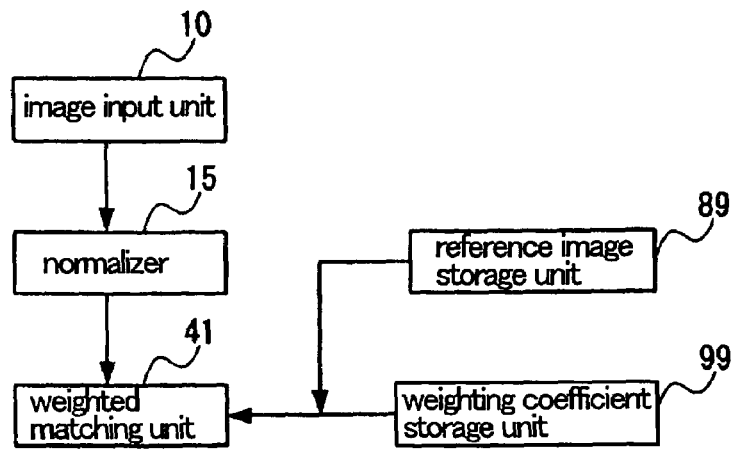
FIG. 3 is a block diagram of an arrangement according to a third prior art.

Image input unit 10, comparative image generator 20, pose candidate determining unit 30, reference three-dimensional object model storage unit 55, and matching and pose selecting unit 41 operate in the same manner as the components denoted by the identical reference numerals according to the second prior art shown in FIG. 2.

Reference three-dimensional weighting coefficient storage unit 65 stores reference three-dimensional weighting coefficients corresponding to the reference three-dimensional object models of respective objects.

Weighting coefficient converter 60 converts reference three-dimensional weighting coefficients obtained from reference three-dimensional weighting coefficient storage unit 65 into two-dimensional weighting coefficients depending on the pose candidates obtained from pose candidate determining unit 30, using the reference three-dimensional object models obtained from reference three-dimensional object model storage unit 55.

Weighted matching and pose selecting unit 40 calculates weighted distance values (or similarity degrees) between the input image obtained from image input unit 10 and the comparative images depending on respective pose candidates obtained from comparative image generator 20, using the two-dimensional weighting coefficients obtained from weighting coefficient converter 60, and selects a comparative image (pose candidate) whose distance value up to the model (object) is the smallest, thereby estimating an optimum pose.

For matching the input image against one object (one-to-one matching), as with the first prior art, the minimum distance value is further compared with a threshold value to determine whether the input image is the same as the object or not. For searching a plurality of objects for an object that is closest to the input image (one-to-N matching), the object whose distance value is the smallest among the minimum distance values determined up to the respective objects is extracted.

Three-dimensional object model register 50 registers reference three-dimensional object models in reference three-dimensional object model storage unit 55.

Three-dimensional weighting coefficient generator 62 generates reference three-dimensional weighting coefficients by learning the degree of importance in matching of each pixel on the three-dimensional model based on a pixel correspondence between the reference three-dimensional object models obtained from reference three-dimensional object model storage unit 55, the two-dimensional image determined by the optimum pose, and the three-dimensional model, using the comparative image of the optimum pose obtained from matching and pose selecting unit 41 and the input image, and registers the generated reference three-dimensional weighting coefficients in reference three-dimensional weighting coefficient storage unit 65.

Overall operation of the present embodiment for pose estimation will be described in detail below with reference to FIG. 4 and a flowchart shown in FIG. 5.

Figure 5:
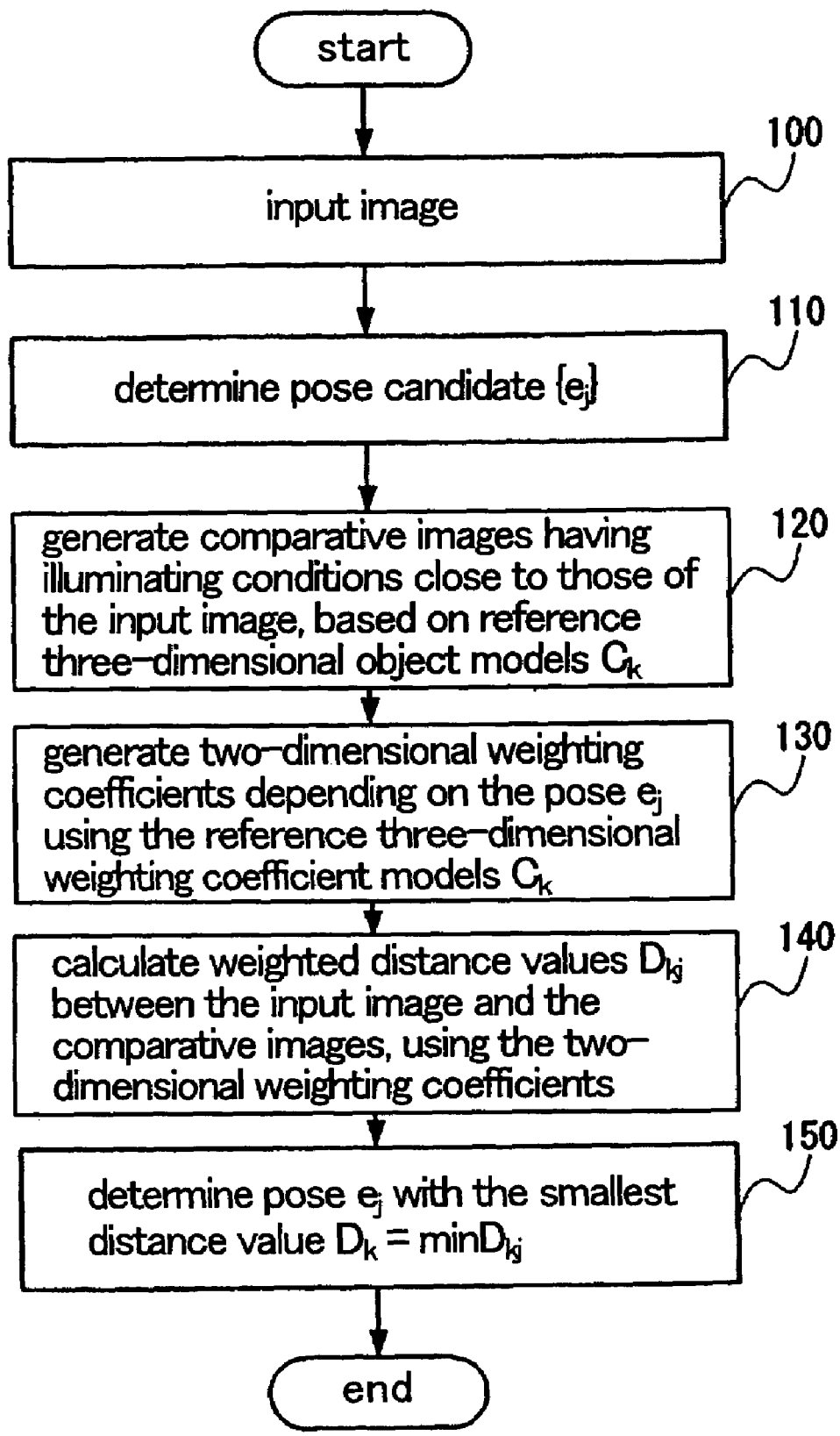
FIG. 5 is a flowchart of an operation sequence (pose estimation) of the first embodiment.

First, an input image of a model (object) is obtained by image input unit 10 (step 100 in FIG. 5). Then, pose candidate determining unit 30 determines a pose candidate group $\{e_j\}$ (step 110). Then, comparative image generator 20 generates comparative images having illuminating conditions close to those of the input image, with respect to the respective pose candidates, based on reference three-dimensional object models $C_k$ obtained from reference three-dimensional object model storage unit 55 (step 120). Weighting coefficient converter 60 converts reference three-dimensional weighting coefficients obtained from reference three-dimensional weighting coefficient storage unit 65 into two-dimensional weighting coefficients depending on the pose candidates, using the reference three-dimensional object models (step 130). Finally, weighted matching and pose selecting unit 40 calculates weighted distance values $D_{kj}$ (or similarity degrees) between the input image and the comparative images, using the two-dimensional weighting coefficients (step 140), and selects a comparative image (pose candidate) whose distance value up to the model (object) for the input image is the smallest, thereby estimating an optimum pose (step 150).

In the above flowchart, the pose candidate whose distance value is the smallest is selected from the predetermined pose candidate group. However, control may return to pose candidate determining unit 30 to search for the pose candidate whose distance value is the smallest by successively changing the pose candidates.

Overall operation of the present embodiment for one-to-one matching will be described in detail below with reference to FIG. 4 and a flowchart shown in FIG. 6.

Figure 6:
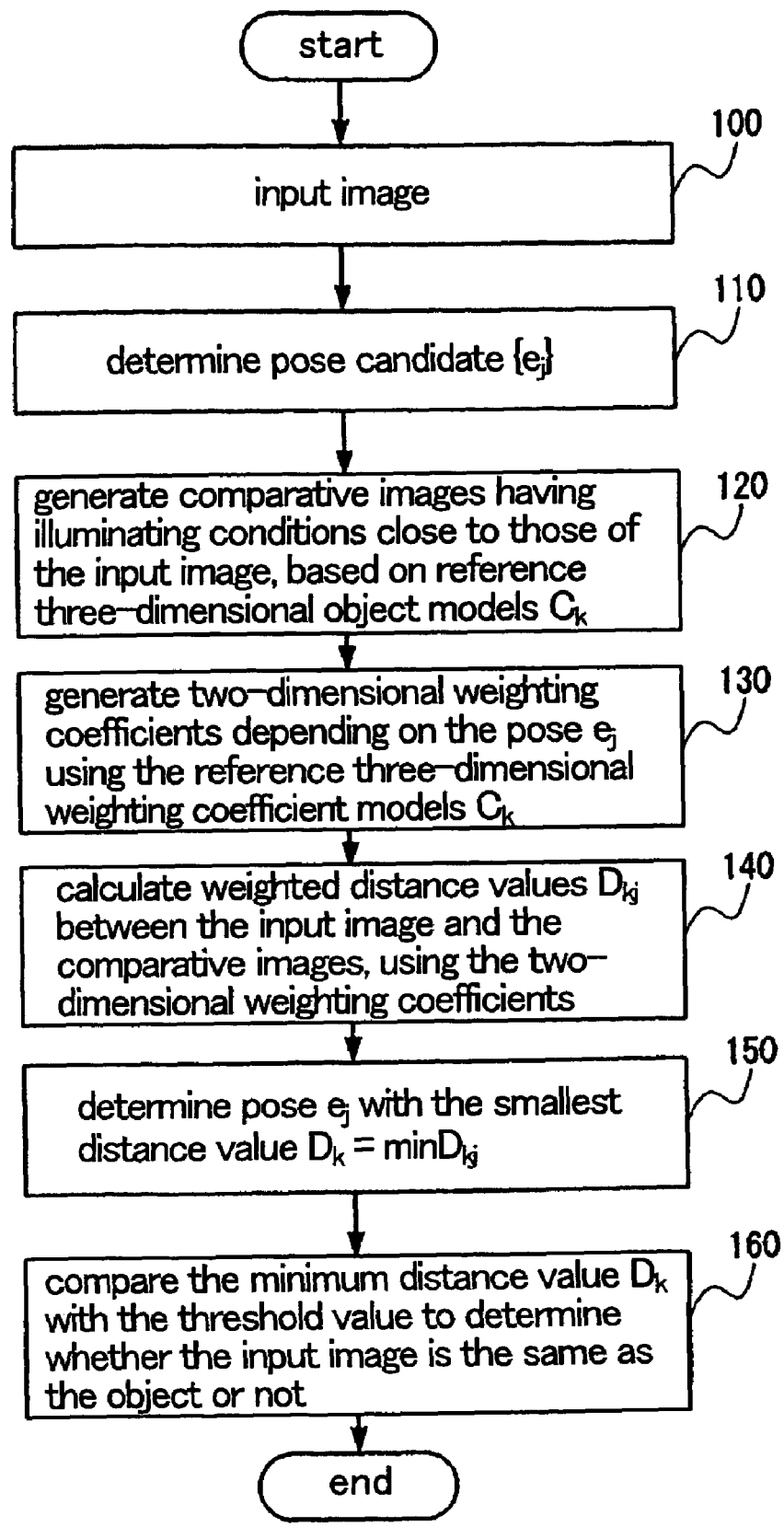
FIG. 6 is a flowchart of an operation sequence (one-to-one matching) of the first embodiment.

Steps 100 through 150 shown in FIG. 6 are identical to steps 100 through 150 shown in FIG. 5. Finally, weighted matching and pose selecting unit 40 compares the minimum distance value with the threshold value to determine whether the input image is the same as the object or not (step 160).

Overall operation of the present embodiment for one-to-N matching will be described in detail below with reference to FIG. 4 and a flowchart shown in FIG. 7.

Figure 7:
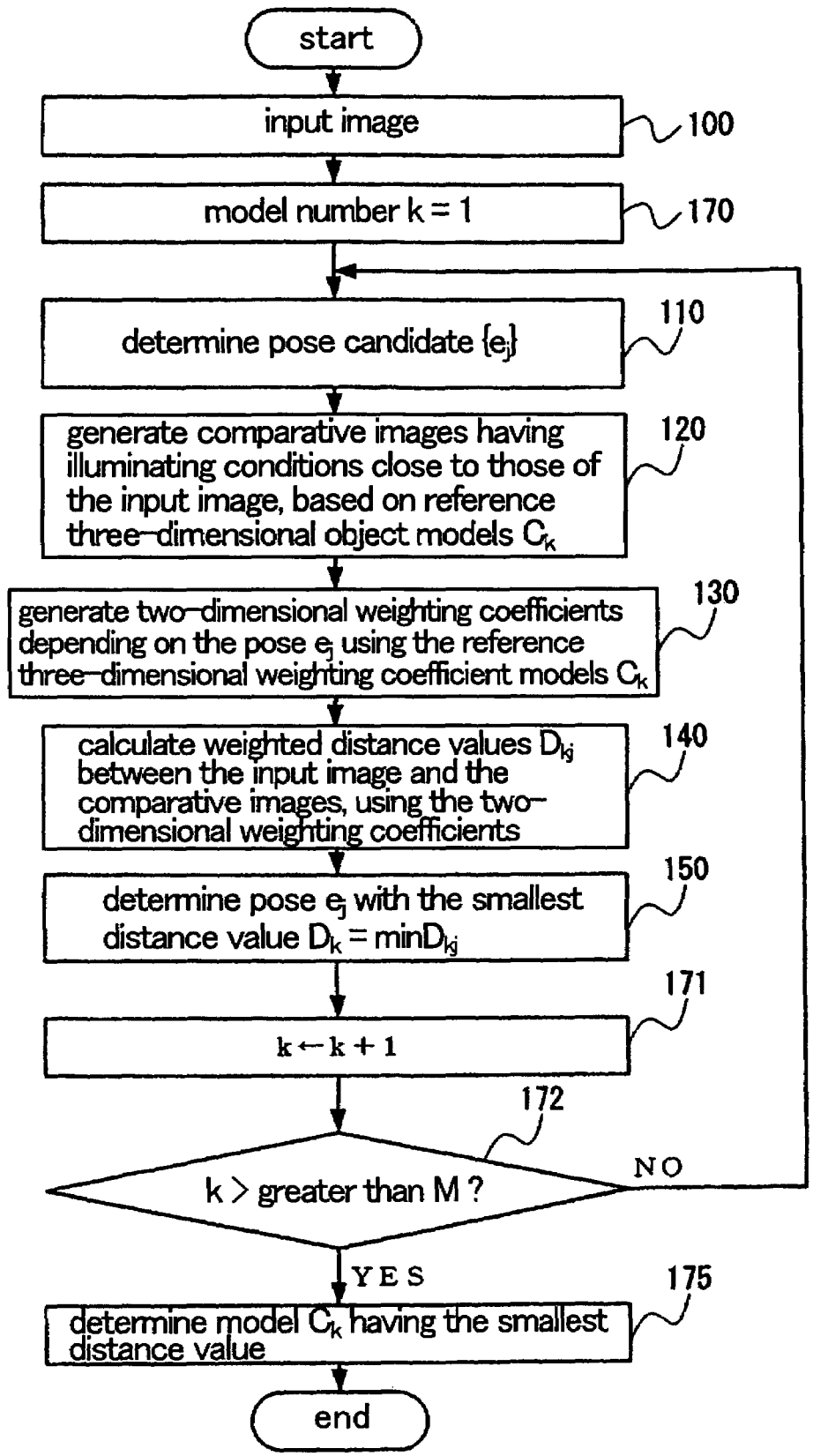
FIG. 7 is a flowchart of an operation sequence (one-to-N matching) of the first embodiment.

First, image input unit 10 produces an input image of a model (object) (step 100 in FIG. 7). Then, weighted matching and pose selecting unit 40 sets a model number k=1 (step 170). Thereafter, steps that are identical to steps 100 through 150 for pose estimation shown in FIG. 6 are executed for each model $C_k$, determining a minimum distance value according to an optimum pose for each model $C_k$. Then, the model number k is incremented by 1 (step 171). If k is equal to or smaller than the number of models (step 172), then control goes back to step 110 for calculating a minimum distance value for a next model. Finally, a model $C_k$ having the smallest minimum distance value is determined as the result of the matching process (step 175).

Overall operation of the present embodiment for registration will be described in detail below with reference to FIG. 4 and a flowchart shown in FIG. 8.

Figure 8:
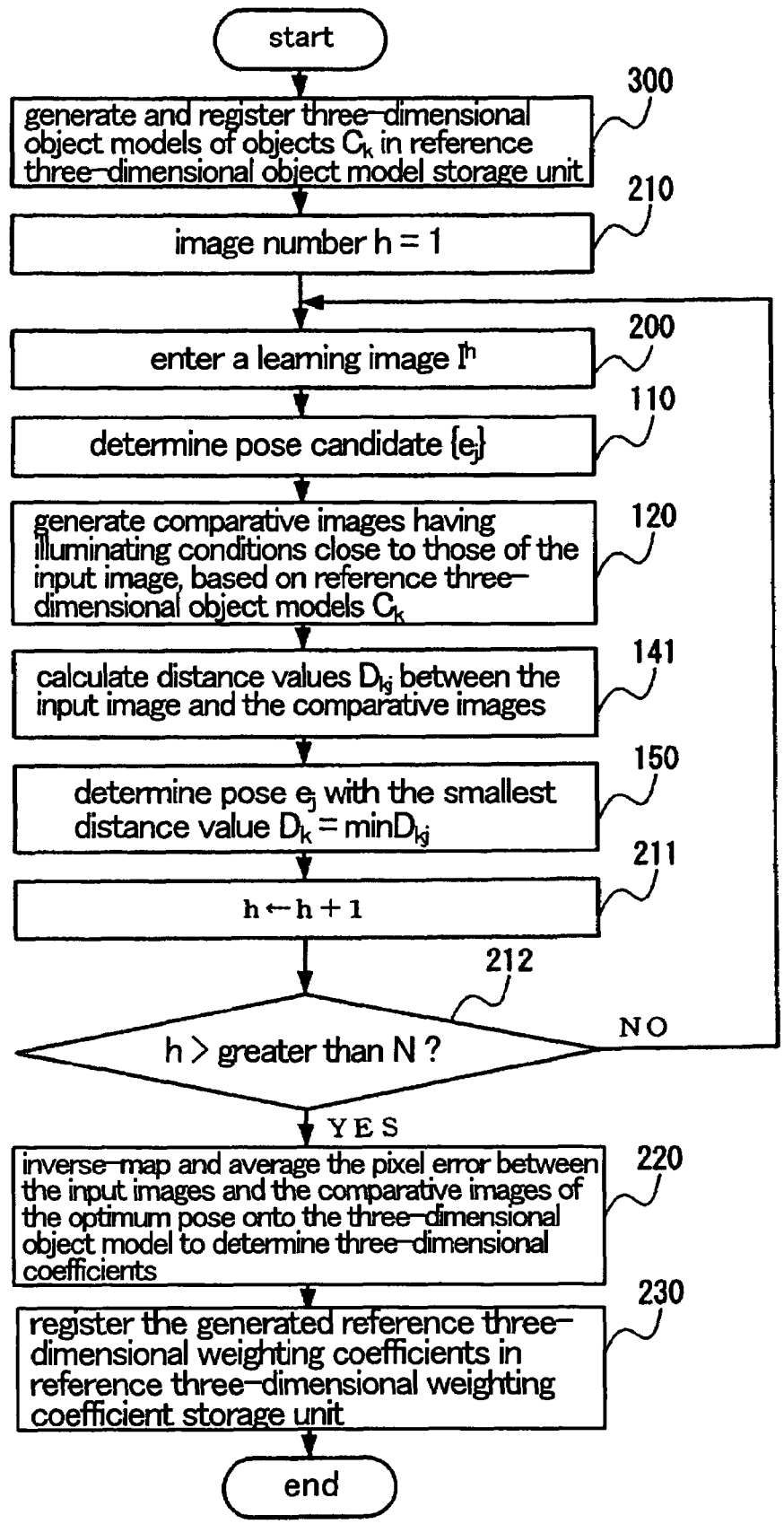
FIG. 8 is a flowchart of an operation sequence (registration) of the first embodiment.

First, three-dimensional object model register 50 registers reference three-dimensional object models of objects $C_k$ in reference three-dimensional object model storage unit 55 (step 300 in FIG. 8). Then, three-dimensional weighting coefficient generator 62 first sets an image number h=1 (step 210) and then enters a learning image having the image number h from image input unit 10 (step 200) for learning reference three-dimensional weighting coefficients using the learning image and the reference three-dimensional object models. Then, pose candidate determining unit 30 determines a pose candidate group $\{e_j\}$ (step 110). Then, comparative image generator 20 generates comparative images having illuminating conditions close to those of the input image, with respect to the respective pose candidates, based on the reference three-dimensional object models $C_k$ obtained from reference three-dimensional object model storage unit 55 (step 120). Matching and pose selecting unit 41 calculates distance values $D_{kj}'$ (or similarity degrees) between the input image and the comparative images (step 141), and selects one of the comparative images (pose candidates) whose distance value up to the model (object) is the smallest, thereby estimating an optimum pose (step 150). Then, three-dimensional weighting coefficient generator 62 increments the image number h by 1 (step 211). If the image number h is equal to or smaller than the number N of learning images (step 212), then control goes back to step 200 for determining a comparative image having an optimum pose which corresponds to a next learning image. If the image number h is greater than the number N of learning images, then three-dimensional weighting coefficient generator 62 generates reference three-dimensional weighting coefficients by learning the degree of importance in matching of each pixel on the three-dimensional model based on a pixel correspondence between the reference three-dimensional object models, the two-dimensional image determined by the optimum pose, and the three-dimensional model, using the comparative images of the optimum poses which correspond to all the learning images (step 220). Finally, three-dimensional weighting coefficient generator 62 registers the generated reference three-dimensional weighting coefficients in reference three-dimensional weighting coefficient storage unit 65 (step 230).

Advantages of the first embodiment will be described below.

According to the present embodiment, three-dimensional weighting coefficients corresponding to three-dimensional object models are generated and stored. For matching the input image, comparative images are generated from reference three-dimensional object models depending on pose candidates, and the three-dimensional weighting coefficients are converted into two-dimensional weighting coefficients, so that weighted distances are calculated. Therefore, highly accurate pose estimation and matching can be performed by setting appropriate weighting coefficients depending on poses.

According to the present invention, furthermore, since only one three-dimensional weighting coefficient is used for all poses, an appropriate three-dimensional weighting coefficient depending on a desired pose can be established in a smaller storage capacity than if two-dimensional weighting coefficients are to be held for respective poses.

According to the present embodiment, furthermore, because the degree of importance in matching of each pixel is learned on the three-dimensional model, an appropriate three-dimensional weighting coefficient depending on a desired pose can be determined with fewer learning images than learning images corresponding to all poses.

A specific example of operation of the first embodiment will be described below. In the specific example to be described below, the face of a person will be described as an example of an object. However, the first embodiment is also applicable to other objects.

Figure 10:
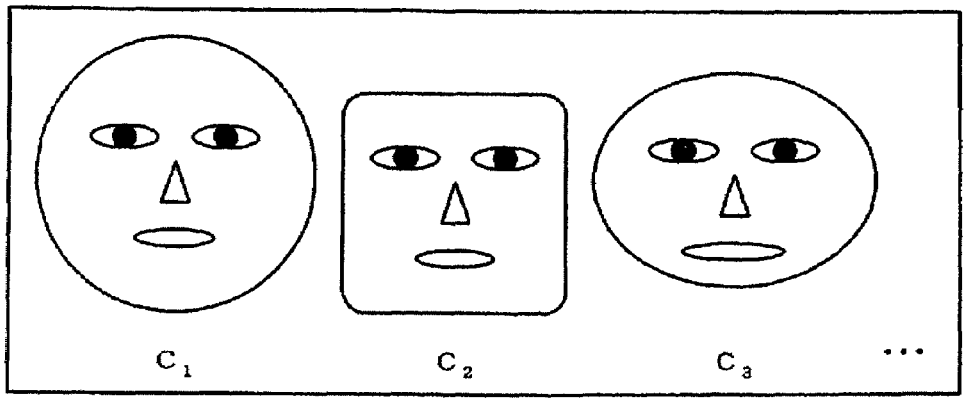
FIG. 10 is a diagram showing a specific example of reference three-dimensional object models according to the first embodiment.

As shown in FIG. 10, reference three-dimensional object model storage unit 55 stores reference three-dimensional object models (three-dimensional shapes and textures) of objects $C_k$. Three-dimensional object models can be generated by, for example, a three-dimensional shape measuring apparatus disclosed in JP-2001-12925A or an apparatus for restoring a three-dimensional shape from a plurality of images captured by a number of cameras disclosed in JP-H09-91436A.

Figure 9:
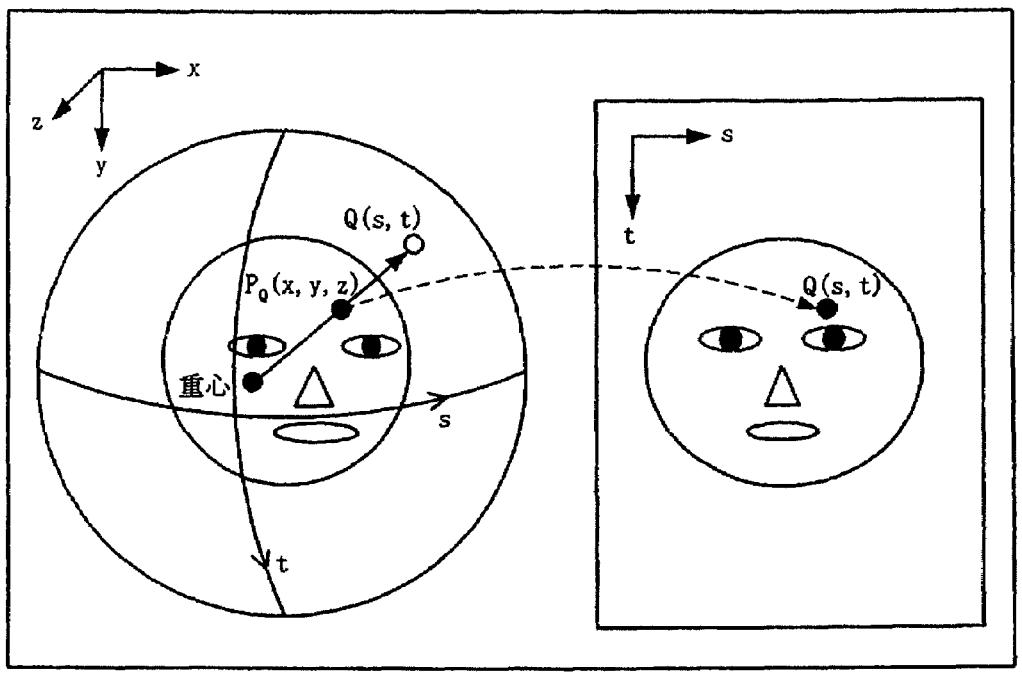
FIG. 9 is a diagram showing a specific example of coordinates of a three-dimensional object model according to the first embodiment.

As shown in FIG. 9, a three-dimensional object model has information representing a shape $P_Q(x,y,z)$ and a texture $T_Q(R,G,B)$ in a three-dimensional space $(x,y,z)$ of an object surface. Q indicates an index of a point on the object surface. For example, an index Q corresponds to the coordinates of a point Q (s,t) projected from a point on the object surface onto a spherical body having at its center the center of gravity of the object, along a line from the center of gravity of the object. For matching purposes, three-dimensional object models are used to generate learning CG images under various illuminating conditions according to computer graphics, and the learning CG images are analyzed for their main components, thereby determining a basic image group.

Figure 11:
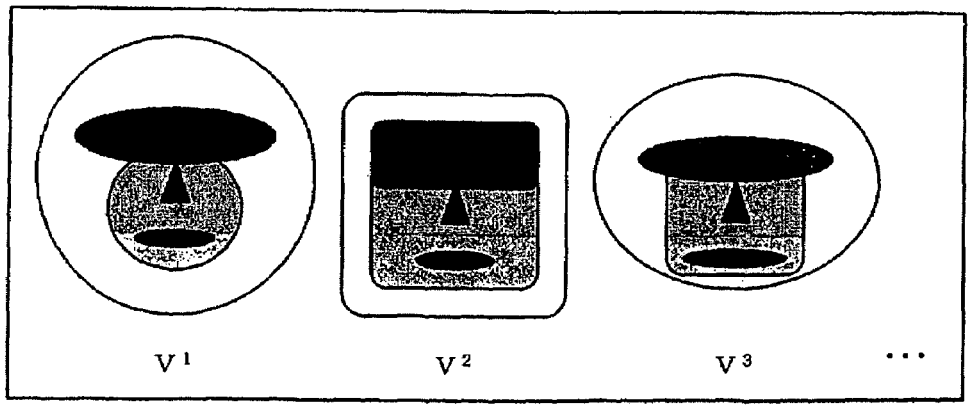
FIG. 11 is a diagram showing a specific example of reference three-dimensional weighting coefficients according to the first embodiment.

As shown in FIG. 11, reference three-dimensional weighting coefficient storage unit 65 stores reference three-dimensional weighting coefficients $V_Q^k$ for objects. For example, the reference three-dimensional weighting coefficient has a value of $V_Q^k=1$ for a black area, a value of $V_Q^k=0$ for a white area, and a value in the range of $0<V_Q^k<1$ for a gray area.

Figure 12:
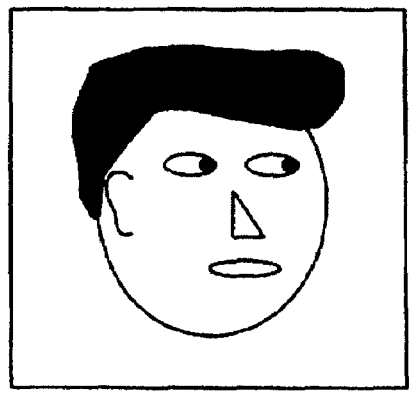
FIG. 12 is a diagram showing a specific example of an input image according to the first embodiment.

The estimation of a pose with respect to a model $C_1$ will be described below. It is assumed that an input image I(r) as shown in FIG. 12 is obtained by image input unit 10 (step 100 shown in FIG. 5). Pose candidate determining unit 30 determines a pose candidate group $\{e_j\}$ (step 110).

The pose candidate group may be preset irrespectively of the input image. However, reference points such as eyes, a nose, a mouth, etc. may manually or automatically be extracted from the input image and the three-dimensional models, and an appropriate pose may be estimated according to a process for calculating the position and orientation of an object as disclosed in JP-2001-283229A. It is efficient to generate a pose candidate group in the vicinity of such an estimated pose.

Comparative image generator 20 generates comparative images $G_{1j}(r)$ having illuminating conditions close to those of the input image, with respect to the respective pose candidates $e_j$, based on the reference three-dimensional object model $C_1$ (step 120).

Figure 13:
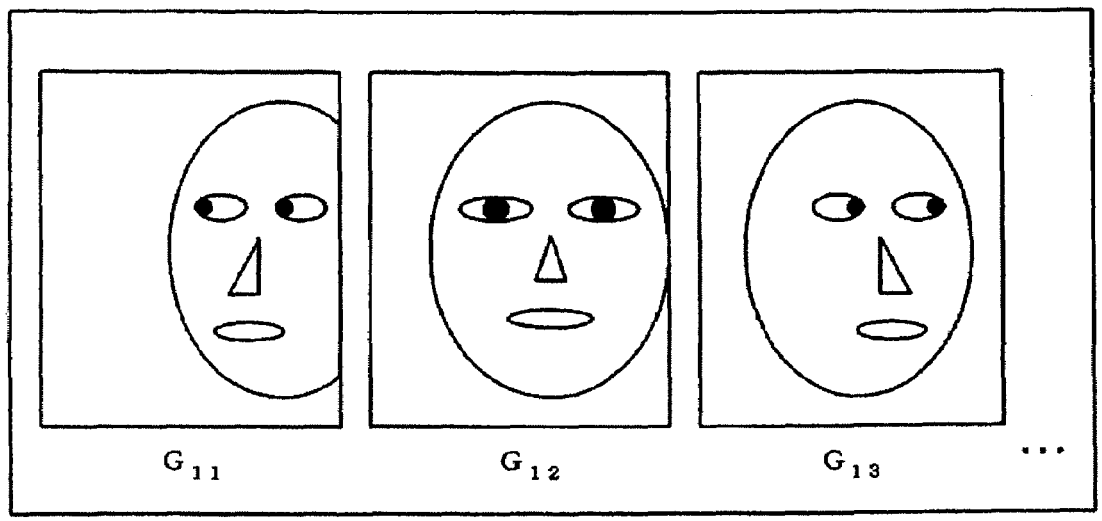
FIG. 13 is a diagram showing a specific example of comparative images according to the first embodiment.

A comparative image having illuminating conditions close to those of the input image is generated as follows: The basic image group that has been determined in advance is coordinate-transformed based on each pose candidate, and coefficients of the linear sum of the coordinate-transformed basic images are determined according to the least-square method so that the linear sum will be close to the input image. An example of comparative images generated with respect to the object $C_1$ is shown in FIG. 13.

Figure 14:
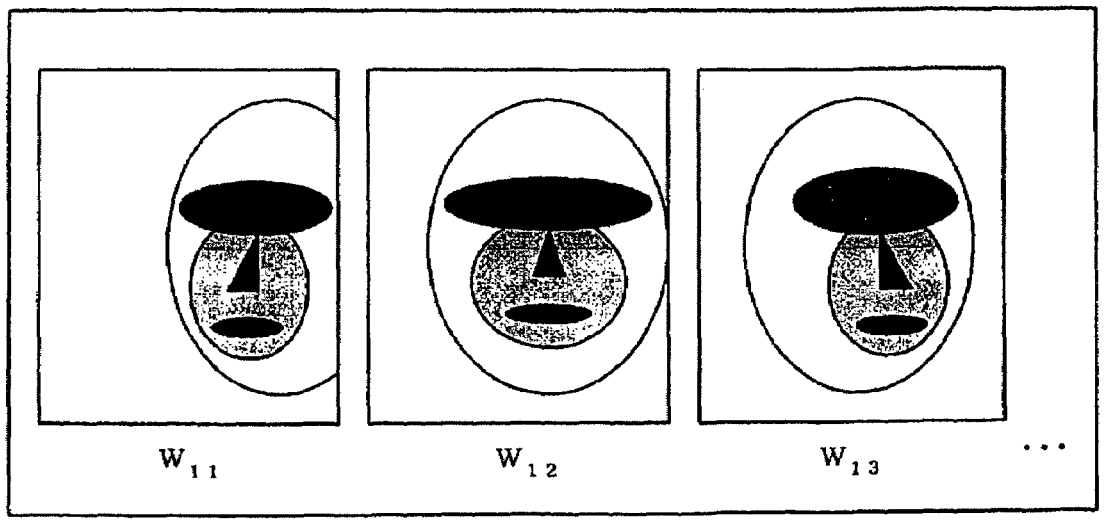
FIG. 14 is a diagram showing a specific example of two-dimensional weighting coefficients according to the first embodiment.

Weighting coefficient converter 60 converts the reference three-dimensional weighting coefficients $V_Q^1$ obtained from reference three-dimensional weighting coefficient storage unit 65 into two-dimensional weighting coefficients $W_{1j}(r)$ depending on the pose candidates $e_j$, using the reference three-dimensional object models $C_1$ (step 130). An example of two-dimensional weighting coefficients generated with respect to the object $C_1$ is shown in FIG. 14.

Weighted matching and pose selecting unit 40 calculates weighted distance values $D_{kj}$ between the input image I(r) and the comparative images $G_{1j}(r)$, using the two-dimensional weighting coefficients $W_{1j}(r)$ (step 140). For example, if the Euclidean distance is used, then weighting is calculated according to $D_{kj}=\Sigma_r W_{kj}(r)\{I(r)-G_{kj}(r)\}^2$, and if a similarity degree $S_{kj}$ is used, then weighting is calculated according to $S_{kj}=\exp(-D_{kj})$.

Finally, weighted matching and pose selecting unit 40 selects a comparative image (pose candidate) whose distance value up to the model $C_1$ is the smallest, thereby estimating an optimum pose (step 150). For the comparative images shown in FIG. 13, for example, a pose $e_3$ is selected as a comparative image whose distance value is the smallest.

A specific example of operation of the first embodiment for registration will be described below. The registration of the reference three-dimensional object model of the objects $C_1$ will be described below.

Figure 15:
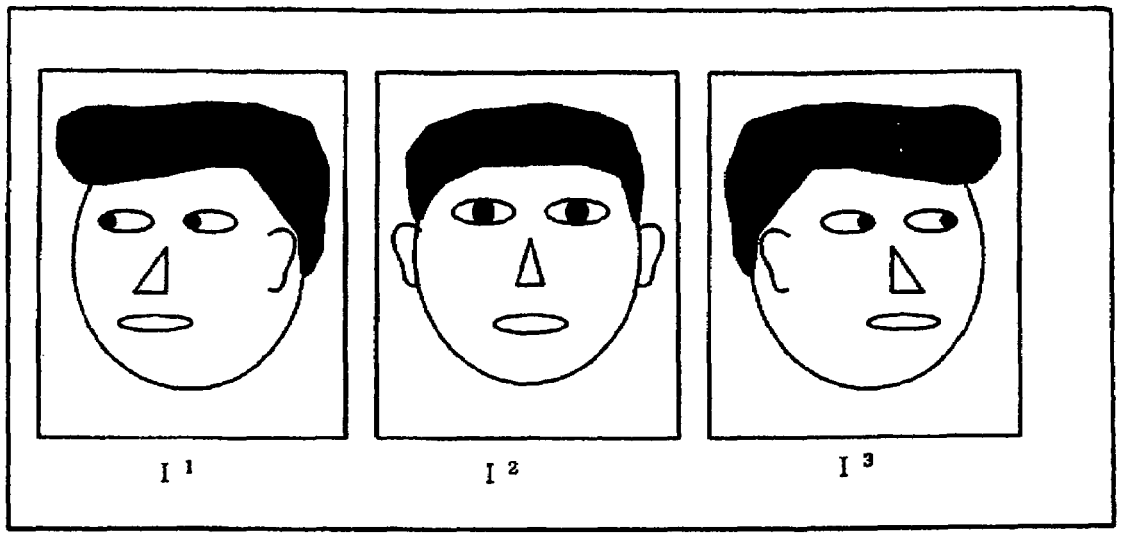
FIG. 15 is a diagram showing a specific example of learning images according to the first embodiment.

First, three-dimensional object model register 50 registers the reference three-dimensional object model of the object $C_1$ in reference three-dimensional object model storage unit 55 (step 300 in FIG. 8). It is assumed that three images as shown in FIG. 15 are obtained as learning images (learning images are images captured under various pose conditions of the object $C_1$).

Then, three-dimensional weighting coefficient generator 62 first sets an image number h=1 (step 210) and then enters a learning image $I^h(r)$ having the image number h from image input unit 10 (step 200) for learning reference three-dimensional weighting coefficients using the learning image and the reference three-dimensional object models.

Then, pose candidate determining unit 30 determines a pose candidate group $\{e_j\}$ (step 110). Comparative image generator 20 generates comparative images $G_{1j}^h(r)$ having illuminating conditions close to those of the input image, with respect to the respective pose candidates $e_j$, based on the reference three-dimensional object model $C_1$ obtained from reference three-dimensional object model storage unit 55 (step 120).

Matching and pose selecting unit 41 calculates distance values $D_{1j}^h$ (or similarity degrees) between the input image $I^h(r)$ and the comparative images $G_{1j}^h(r)$ (step 141). For example, if the Euclidean distance is used, then the distance values are calculated according to $D_{kj}^h=\Sigma_r\{I^h(r)-G_{kj}^h(r)\}^2$.

Matching and pose selecting unit 41 selects a comparative image (pose candidate) whose distance value up to the model (object) is the smallest, thereby determining an optimum pose (step 150). Then, three-dimensional weighting coefficient generator 62 increments the image number h by 1 (step 211). If the image number h is equal to or smaller than the number N=3 of learning images (step 212), then control goes back to step 200 for determining a comparative image having an optimum pose which corresponds to a next learning image.

Figure 16:
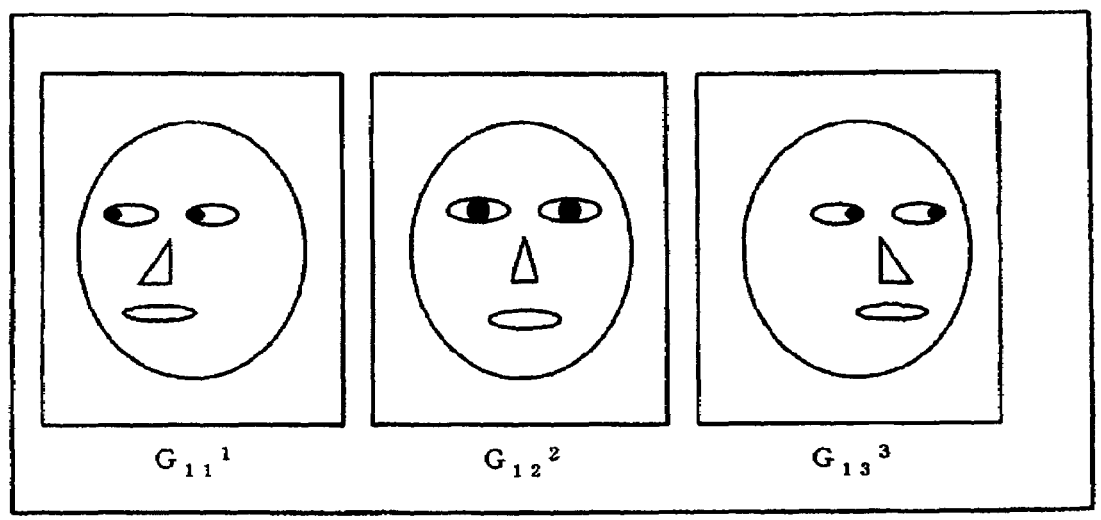
FIG. 16 is a diagram showing a specific example of comparative images according to the first embodiment.

An example of comparative images having optimum poses determined so as to correspond to the respective learning images $I^h(r)$ shown in FIG. 15 is illustrated in FIG. 16.

If the image number h is greater than the number N=3 of learning images, then three-dimensional weighting coefficient generator 62 generates reference three-dimensional weighting coefficients by learning the degree of importance in matching of each pixel on the three-dimensional model based on a pixel correspondence between the reference three-dimensional object models, the two-dimensional image determined by the optimum pose, and the three-dimensional model, using the comparative images $G_{1j}{}^h(r)$ of the optimum poses which correspond to all the learning images $I^h(r)$ (step 220). For example, if an area where an error between learning images and comparative images is small is an area that is important for matching, then a weighting coefficient is defined as the reciprocal of the average error. The error between the learning images $I^h(r)$ and the comparative images $G_{kj}{}^h(r)$ as two-dimensional images is calculated according to $d_{kj}{}^h(r)=|I^h(r)-G_{kj}{}^h(r)|$.

If the relationship between coordinates (s,t) on a three-dimensional object model and the coordinate r on a two-dimensional image at the time comparative image are generated based on the poses $e_j$ from the three-dimensional object model is represented by $r=F(s,t)$, then the coordinates of a point on the three-dimensional model which corresponds to the pixel r on the two-dimensional image are determined according to $\{s,t\}=F^{-1}(r)$ according to an inverse transform. If the error $d_{kj}{}^h(r)$ of each pixel is mapped onto the point $\{s,t\}$ on the three-dimensional model by the inverse transform and the average error of all the learning images is represented by $E_Q{}^k$, then three-dimensional weighting coefficients are calculated according to $V_Q{}^k=A/E_Q{}^k$ (A represents a normalizing coefficient). The three-dimensional weighting coefficients $V_Q{}^k$ are converted into two-dimensional weighting coefficients $W_{kj}(r)$ according to the transform $r=F(s,t)$ obtained for each of the pose candidates $e_j$. Finally, the three-dimensional weighting coefficient $V_Q{}^1$ of the object $C_1$ is registered in reference three-dimensional weighting coefficient storage unit 65 (step 230).

2nd Embodiment

Figure 17:
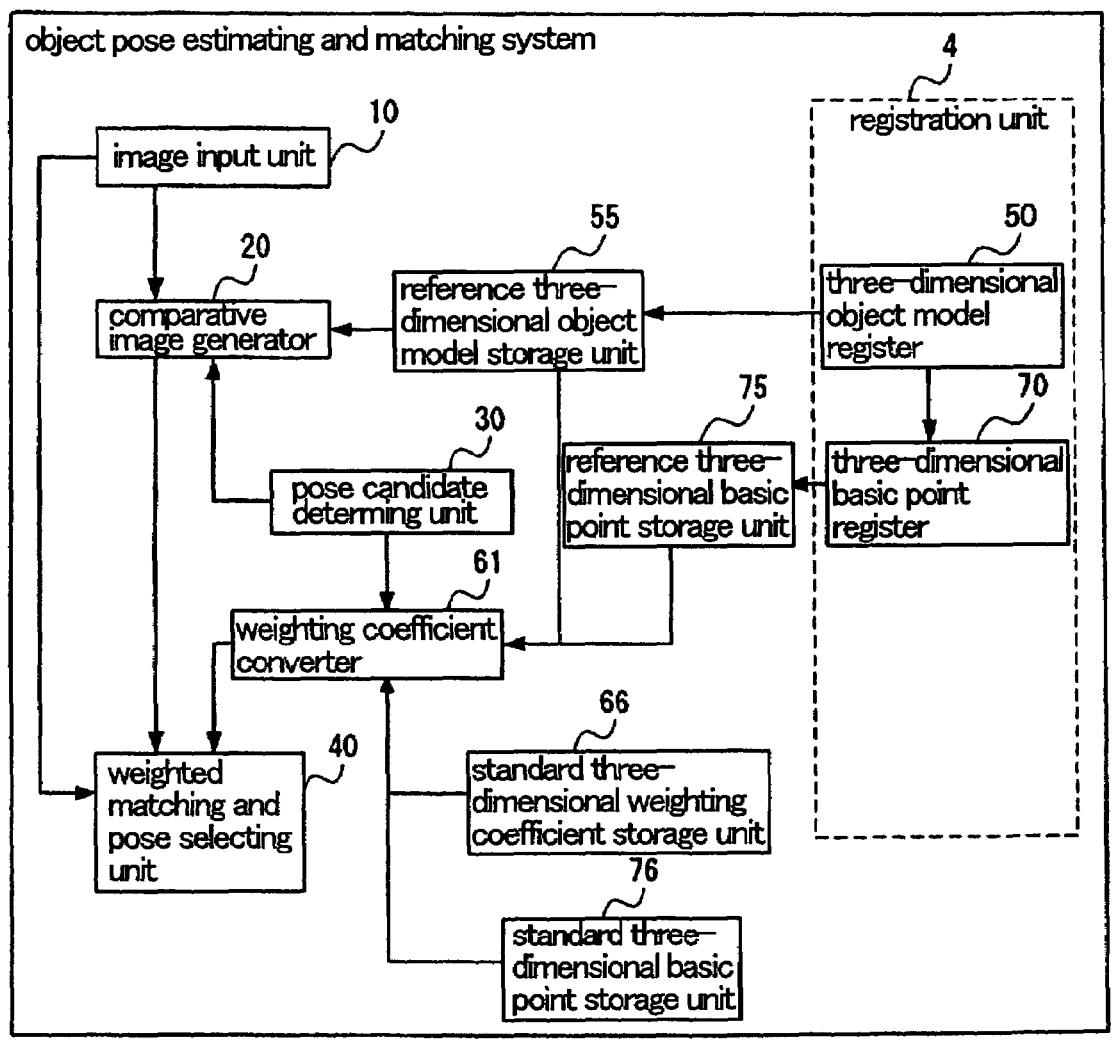
FIG. 17 is a block diagram of an arrangement of an object pose estimating and matching system according to a second embodiment of the present invention.

Referring to FIG. 17, an object pose estimating and matching system according to a second embodiment of the present invention comprises image input unit 10, comparative image generator 20, pose candidate determining unit 30, weighted matching and pose selecting unit 40, weighting coefficient converter 61, reference three-dimensional object model storage unit 55, standard three-dimensional weighting coefficient storage unit 66, reference three-dimensional basic point storage unit 75, standard three-dimensional basic point storage unit 76, and a registration unit 4. Registration unit 4 comprises three-dimensional object model register 50 and three-dimensional basic point register 70.

Image input unit 10, comparative image generator 20, pose candidate determining unit 30, weighted matching and pose selecting unit 40, reference three-dimensional object model storage unit 55, and three-dimensional object model register 50 in the same manner as the components denoted by the identical reference numerals according to the first embodiment shown in FIG. 4.

Standard three-dimensional weighting coefficient storage unit 66 stores a standard three-dimensional weighting coefficient. Reference three-dimensional basic point storage unit 75 stores reference three-dimensional basic points corresponding to reference three-dimensional object models of objects. Standard three-dimensional basic point storage unit 76 stores standard three-dimensional basic points corresponding to standard three-dimensional object models.

Weighting coefficient converter 61 determines a coordinate correspondence between the standard three-dimensional weighting coefficient obtained from standard three-dimensional weighting coefficient storage unit 66 and the reference three-dimensional object models, using the standard three-dimensional basic points obtained from standard three-dimensional basic point storage unit 76 and the reference three-dimensional basic points obtained from reference three-dimensional basic point storage unit 75, and converts the standard three-dimensional weighting coefficients into two-dimensional weighting coefficients depending on the pose candidates obtained from pose candidate determining unit 30.

Three-dimensional basic point register 70 determines reference three-dimensional basic points with respect to the reference three-dimensional object models obtained from three-dimensional object model register 50, and registers the determined three-dimensional basic points in reference three-dimensional basic point storage unit 75.

Overall operation of the second embodiment for pose estimation will be described in detail below with reference to FIG. 17 and a flowchart shown in FIG. 18. Operation of the second embodiment for one-to-one matching and one-to-N matching is similar to the operation for pose estimation except for the added determining process (step 160 shown in FIG. 6) and the added process of determining a model having a minimum distance value (steps 170 through 175 shown in FIG. 7), as with the first embodiment, and will not be described below.

Figure 18:
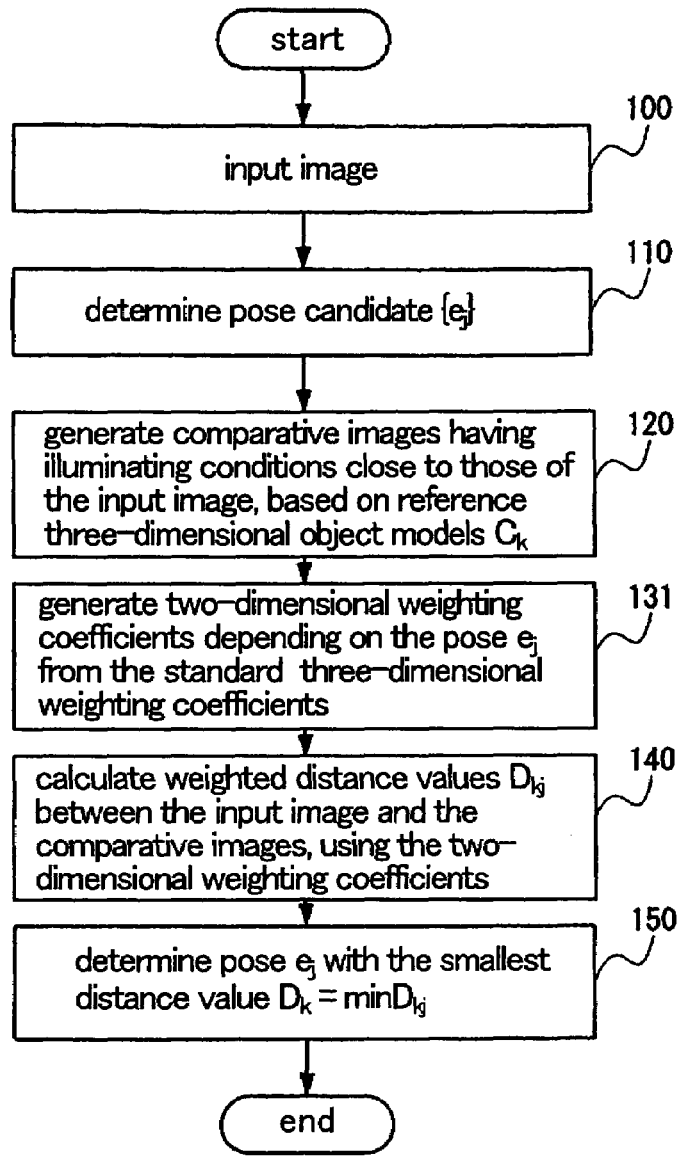
FIG. 18 is a flowchart of an operation sequence (pose estimation) of the second embodiment.

First, an input image is obtained by image input unit 10 (step 100 in FIG. 18). Then, pose candidate determining unit 30 determines a pose candidate group $\{e_j\}$ (step 110). Then, comparative image generator 20 generates comparative images having illuminating conditions close to those of the input image, with respect to the respective pose candidates, based on reference three-dimensional object models $C_k$ obtained from reference three-dimensional object model storage unit 55 (step 120).

Weighting coefficient converter 61 determines a coordinate correspondence between the standard three-dimensional weighting coefficient obtained from standard three-dimensional weighting coefficient storage unit 66 and the reference three-dimensional object models, using the standard three-dimensional basic points obtained from standard three-dimensional basic point storage unit 76 and the reference three-dimensional basic points obtained from reference three-dimensional basic point storage unit 75, and converts the standard three-dimensional weighting coefficients into two-dimensional weighting coefficients depending on the pose candidates (step 131).

Finally, weighted matching and pose selecting unit 40 calculates weighted distance values $D_{kj}$ (or similarity degrees) between the input image and the comparative images, using the two-dimensional weighting coefficients (step 140), and selects a comparative image (pose candidate) whose distance value up to the model (object) is the smallest, thereby estimating an optimum pose (step 150).

Overall operation of the present embodiment for registration will be described in detail below. First, three-dimensional object model register 50 registers reference three-dimensional object models of objects $C_k$ in reference three-dimensional object model storage unit 55. Then, three-dimensional basic point register 70 determines reference three-dimensional basic points with respect to the reference three-dimensional object models obtained from three-dimensional object model register 50, and registers the determined three-dimensional basic points in reference three-dimensional basic point storage unit 75.

Advantages of the second embodiment will be described below.

According to the present embodiment, comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses.

According to the present invention, furthermore, since only one three-dimensional weighting coefficient is used for all poses, an appropriate three-dimensional weighting coefficient depending on a desired pose can be established in a smaller storage capacity than if two-dimensional weighting coefficients are to be held for respective poses.

According to the present embodiment, furthermore, because a standard three-dimensional weighting coefficient representing an average of three-dimensional weighting coefficients of a plurality of objects is held, the storage capacity for storing the standard three-dimensional weighting coefficient is much smaller than if reference three-dimensional weighting coefficients are to be held for objects. It is not necessary to capture learning images corresponding to reference three-dimensional object models upon registration.

A specific example of operation of the second embodiment will be described below.

Figure 19:
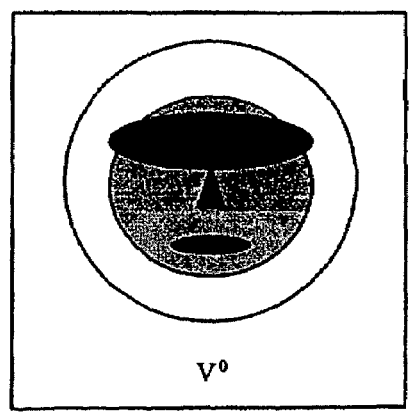
FIG. 19 is a diagram showing a specific example of a standard three-dimensional weighting coefficient according to the second embodiment.

As shown in FIG. 10, reference three-dimensional object model storage unit 55 stores reference three-dimensional object models (three-dimensional shapes $P_Q^k$ (x,y,z) and textures $T_Q^k$ (R,G,B)) of objects $C_k$. As shown in FIG. 19, standard three-dimensional weighting coefficient storage unit 66 stores a standard three-dimensional weighting coefficient $V_Q^0$.

Figure 20:
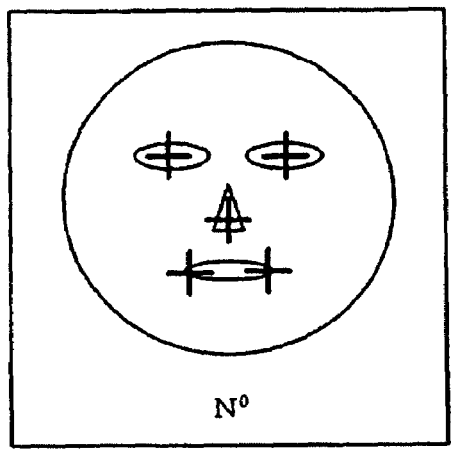
FIG. 20 is a diagram showing a specific example of standard three-dimensional basic points according to the second embodiment.
Figure 21:
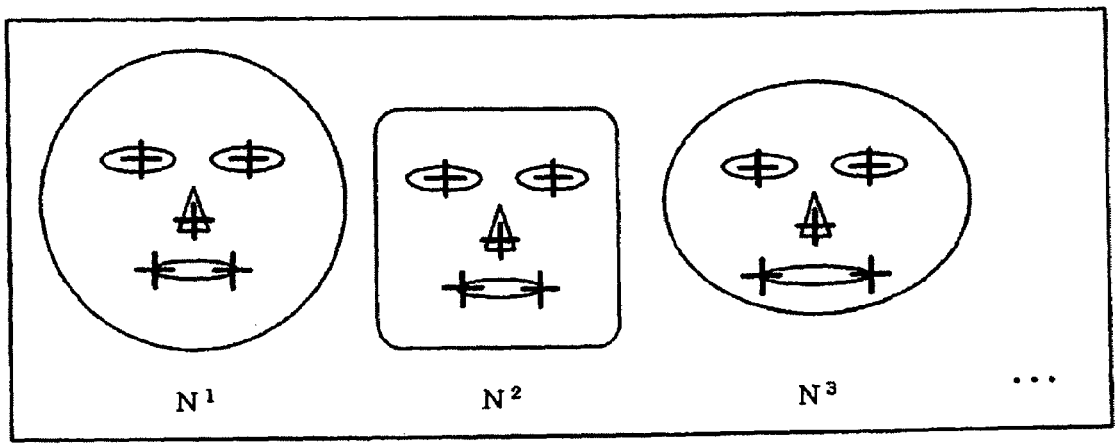
FIG. 21 is a diagram showing a specific example of reference three-dimensional basic points according to the second embodiment.
Figure 22:
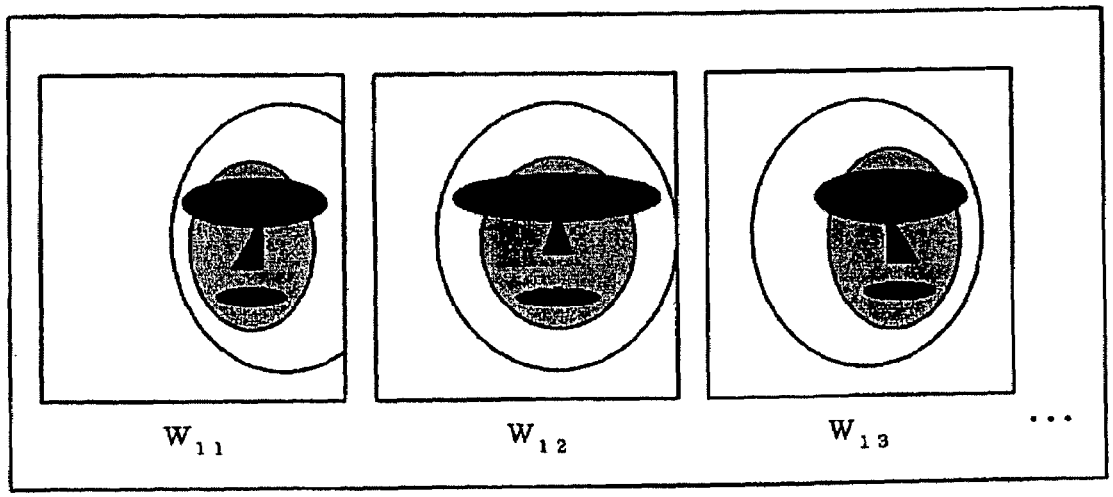
FIG. 22 is a diagram showing a specific example of two-dimensional weighting coefficients according to the second embodiment.

Furthermore, as shown in FIG. 20, standard three-dimensional basic point storage unit 76 stores the coordinates of standard three-dimensional basic points $N_i^0$. As shown in FIG. 21, reference three-dimensional basic point storage unit 75 stores the coordinates of reference three-dimensional basic points $N_i^k$. Basic points are points for positional alignment, and refer to five points including a left eye midpoint, a right eye midpoint, a nose top point, a left mouth corner point, and a right mouth corner point in FIGS. 20 and 21.

The reference three-dimensional basic points may be manually preset. However, the reference three-dimensional basic points may be automatically set according to a facial feature extracting process disclosed in Marugame and Sakamoto "Extraction of feature areas from facial three-dimensional data using shape information and color information", FIT (Forum of Information science Technology), 2002, I-100, pages 199-200. The standard three-dimensional basic points may be determined from average coordinates of the reference three-dimensional basic points or three-dimensional basic points of three-dimensional object models prepared in advance for learning purposes. The standard three-dimensional weighting coefficient may be determined by positionally aligning reference three-dimensional weighting coefficients or three-dimensional weighting coefficients of three-dimensional object models prepared in advance for learning purposes so that the three-dimensional basic points will be aligned with the standard three-dimensional basic points, and then averaging the positionally aligned three-dimensional weighting coefficients.

For positionally aligning points other than the basic points, transform equations $s_0=Hs(s,t)$, $t_0=Ht(s,t)$ for the coordinates {s,t} of the three-dimensional weighting coefficients and the coordinates {$s_0,t_0$} of the standard three-dimensional weighting coefficient can be established by determining a correspondence between basic points according to interpolation or extrapolation. The standard three-dimensional weighting coefficient can be generated by directly mapping errors of pixels onto the standard three-dimensional model, using learning images.

The estimation of a pose with respect to a model $C_1$ will be described below. It is assumed that an input image I(r) as shown in FIG. 12 is obtained by image input unit 10 (step 100 shown in FIG. 18). Pose candidate determining unit 30 determines a pose candidate group {$e_j$} (step 110). Comparative image generator 20 generates comparative images $G_{1j}(r)$ having illuminating conditions close to those of the input image, with respect to the respective pose candidates $e_j$, based on the reference three-dimensional object model $C_1$ (step 120). An example of comparative images generated with respect to the object $C_1$ is shown in FIG. 13.

Weighting coefficient converter 61 determines a coordinate correspondence between the standard three-dimensional weighting coefficient $V_Q^0$ and the reference three-dimensional object models $P_Q^k$, using the standard three-dimensional basic points $N_i^0$ and the reference three-dimensional basic points $N_i^k$, and converts the standard three-dimensional weighting coefficient $V_Q^0$ into a two-dimensional weighting coefficient $W_{1j}(r)$ depending on the pose candidates $e_j$ (step 131). When a coordinate correspondence is determined between the standard three-dimensional weighting coefficient $V_Q^0$ and the reference three-dimensional object models $P_Q^k$ (more precisely, textures $T_Q^k$), reference three-dimensional weighting coefficients $V_Q^k$ can hypothetically be generated (actually, reference three-dimensional weighting coefficients $V_Q^k$ are not generated, but a two-dimensional weighting coefficient is directly generated from the standard three-dimensional weighting coefficient). The standard three-dimensional basic points $N_i^0$ and the reference three-dimensional basic points $N_i^k$ are used in order to determine a correspondence between the standard three-dimensional weighting coefficient $V_Q^0$ and the textures $T_Q^k$ of the reference three-dimensional object models. The coordinates {$s_0, t_0$} of standard three-dimensional weighting coefficient which correspond to the coordinates r in the two-dimensional image are determined according to $s_0=Hs(F^{-1}(r))$, $t_0=Ht(F^{-1}(r))$. An example of two-dimensional weighting coefficients generated with respect to the object $C_1$ is shown in FIG. 18.

Weighted matching and pose selecting unit 40 calculates weighted distance values $D_{1j}$ between the input image I(r) and the comparative images $G_{1j}(r)$, using the two-dimensional weighting coefficients $W_{1j}(r)$ (step 140). Finally, weighted matching and pose selecting unit 40 selects a comparative image (pose candidate) whose distance value up to the model $C_1$ is the smallest, according to $D_1=\min_j D_{1j}$, thereby estimating an optimum pose (step 150).

3rd Embodiment

Figure 23:
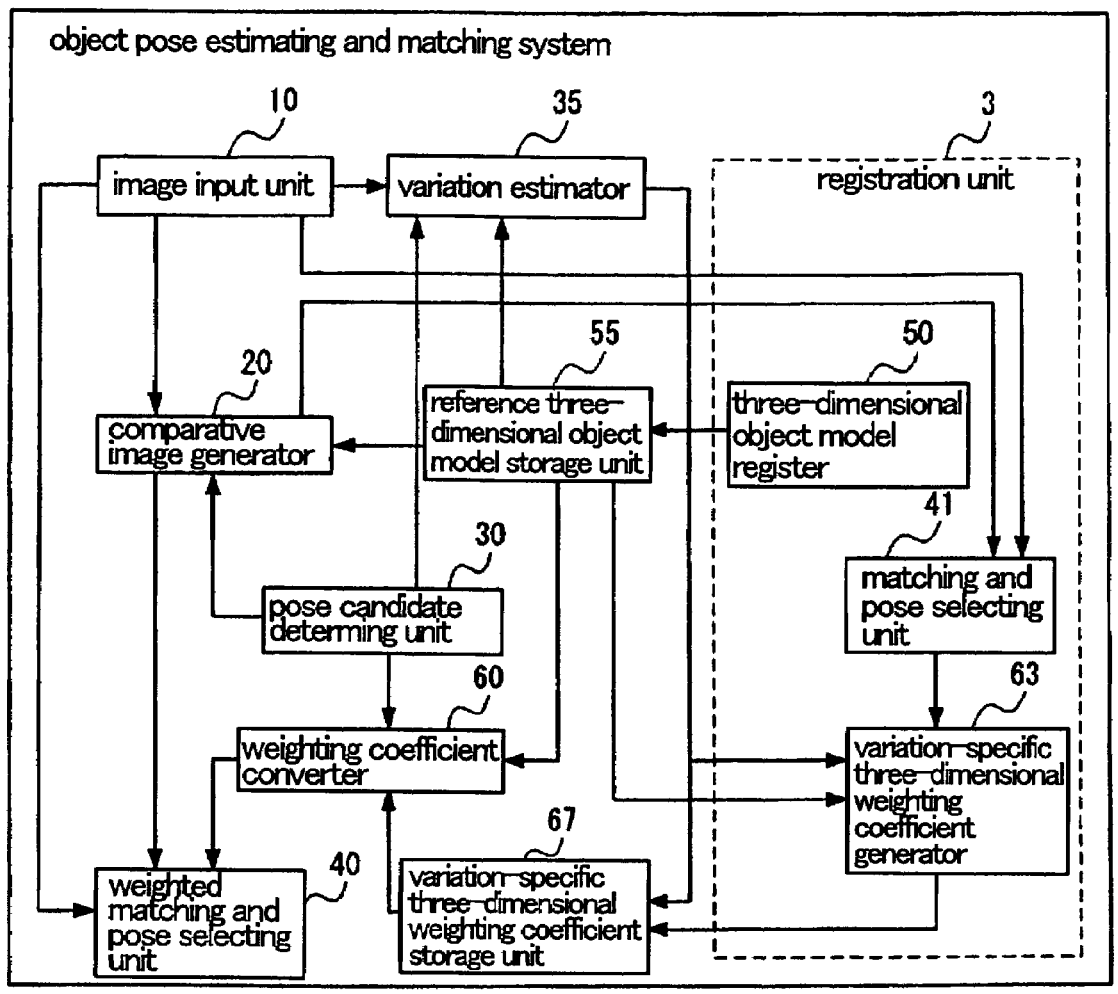
FIG. 23 is a block diagram of an arrangement of an object pose estimating and matching system according to a third embodiment of the present invention.

Referring to FIG. 23, an object pose estimating and matching system according to a third embodiment of the present invention comprises image input unit 10, comparative image generator 20, pose candidate determining unit 30, weighted matching and pose selecting unit 40, weighting coefficient converter 60, reference three-dimensional object model storage unit 55, variation estimator 35, variation-specific reference three-dimensional weighting coefficient storage unit 67, and a registration unit 3. Registration unit 3 comprises three-dimensional object model register 50, matching and pose selecting unit 41, and variation-specific three-dimensional weighting coefficient generator 63.

Image input unit 10, comparative image generator 20, pose candidate determining unit 30, weighted matching and pose selecting unit 40, weighting coefficient converter 60, reference three-dimensional object model storage unit 55, three-dimensional object model register 50, and matching and pose selecting unit 41 operate in the same manner as the components denoted by the identical reference numerals according to the first embodiment shown in FIG. 4.

Variation-specific reference three-dimensional weighting coefficient storage unit 67 stores reference three-dimensional weighting coefficients corresponding to reference three-dimensional object models and image variations. Variation estimator 35 determines a correspondence between the input image obtained from image input unit 10 and an area of a three-dimensional object model, using the pose candidates obtained from pose candidate determining unit 30 and the reference three-dimensional object models obtained from reference three-dimensional object model storage unit 55, and estimates a variation based on image information of a given area. Furthermore, variation estimator 35 sends a reference weighting coefficient based on the estimated variation, among the variation-specific reference weighting coefficients stored in variation-specific reference three-dimensional weighting coefficient storage unit 67, to weighting coefficient converter 61.

Variation-specific three-dimensional weighting coefficient generator 63 generates variation-specific reference three-dimensional weighting coefficients by learning the degree of importance in matching of each pixel on the three-dimensional model, for each image variation obtained from variation estimator 35, based on a pixel correspondence between the reference three-dimensional object models obtained from reference three-dimensional object model storage unit 55, the two-dimensional image determined by the optimum pose, and the three-dimensional model, using the comparative image of the optimum pose obtained from matching and pose selecting unit 41 and the input image, and registers the generated reference three-dimensional weighting coefficients in variation-specific reference three-dimensional weighting coefficient storage unit 67.

Overall operation of the third embodiment for pose estimation will be described in detail below with reference to FIG. 23 and a flowchart shown in FIG. 24.

Figure 24:
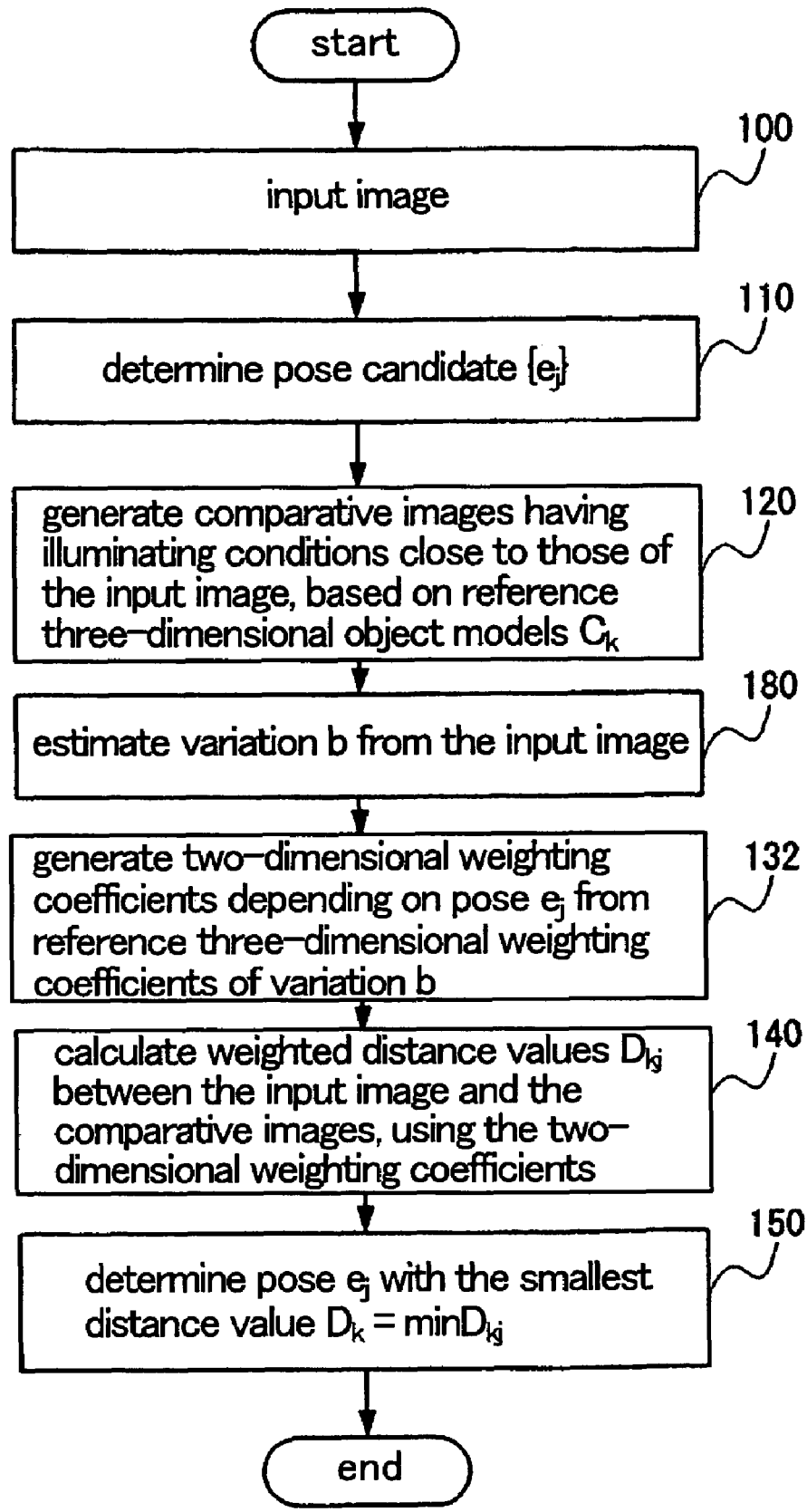
FIG. 24 is a flowchart of an operation sequence (pose estimation) of the third embodiment.

First, an input image of a model (object) is obtained by image input unit 10 (step 100 in FIG. 24). Then, pose candidate determining unit 30 determines a pose candidate group $\{e_j\}$ (step 110). Then, comparative image generator 20 generates comparative images having illuminating conditions close to those of the input image, with respect to the respective pose candidates, based on reference three-dimensional object models $C_k$ obtained from reference three-dimensional object model storage unit 55 (step 120).

Variation estimator 35 determines a correspondence between an area of a three-dimensional object model and the input image, using the pose candidates $e_j$ and the reference three-dimensional object models $C_k$, and estimates a variation b based on image information of a given area. Furthermore, variation estimator 35 sends a reference weighting coefficient based on the estimated variation b, among the variation-specific reference weighting coefficients stored in variation-specific reference three-dimensional weighting coefficient storage unit 67, to weighting coefficient converter 61 (step 180).

Weighting coefficient converter 60 converts reference three-dimensional weighting coefficients of the variation b obtained from variation-specific reference three-dimensional weighting coefficient storage unit 67 into two-dimensional weighting coefficients depending on the pose candidates, using the reference three-dimensional object models (step 130). Finally, weighted matching and pose selecting unit 40 calculates weighted distance values $D_{kj}$ (or similarity degrees) between the input image and the comparative images, using the two-dimensional weighting coefficients (step 140), and selects a comparative image (pose candidate) whose distance value up to the model (object) for the input image is the smallest, thereby estimating an optimum pose (step 150).

Overall operation of the present embodiment for registration will be described in detail below with reference to FIG. 23 and a flowchart shown in FIG. 25.

Figure 25:
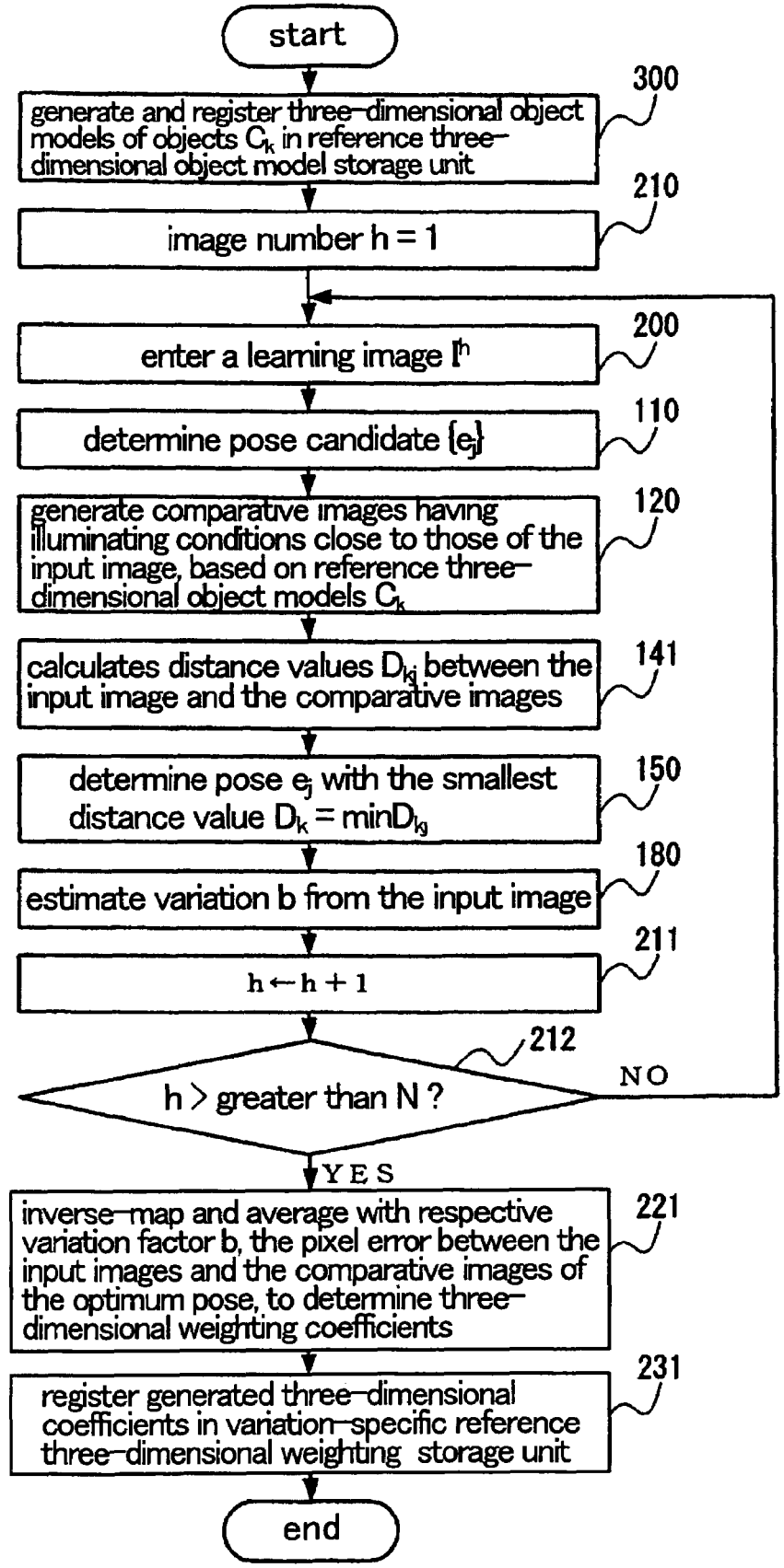
FIG. 25 is a flowchart of an operation sequence (registration) of the third embodiment.

First, three-dimensional object model register 50 registers reference three-dimensional object models of objects $C_k$ in reference three-dimensional object model storage unit 55 (step 300 in FIG. 25).

Then, variation-specific three-dimensional weighting coefficient generator 63 first sets an image number h=1 (step 210) and then enters a learning image having the image number h from image input unit 10 (step 200) for learning reference three-dimensional weighting coefficients using the learning image and the reference three-dimensional object models.

Then, pose candidate determining unit 30 determines a pose candidate group $\{e_j\}$ (step 110). Then, comparative image generator 20 generates comparative images having illuminating conditions close to those of the input image, with respect to the respective pose candidates, based on the reference three-dimensional object models $C_k$ obtained from reference three-dimensional object model storage unit 55 (step 120).

Matching and pose selecting unit 41 calculates distance values $D_{kj}'$ (or similarity degrees) between the input image and the comparative images (step 141), and selects one of the comparative images (pose candidates) whose distance value up to the model (object) is the smallest, thereby estimating an optimum pose (step 150).

Then, variation estimator 35 determines a correspondence between an area of a three-dimensional object model and the input image, using the pose candidates $e_j$ and the reference three-dimensional object models $C_k$, and estimates a variation b based on image information of a given area (step 180).

Then, variation-specific three-dimensional weighting coefficient generator 63 increments the image number h by 1 (step 211). If the image number h is equal to or smaller than the number N of learning images (step 212), then control goes back to step 200 for determining a comparative image having an optimum pose which corresponds to a next learning image.

If the image number h is greater than the number N of learning images, then variation-specific three-dimensional weighting coefficient generator 63 generates variation-specific reference three-dimensional weighting coefficients by learning the degree of importance in matching of each pixel on the three-dimensional model, for each image variation b obtained from variation estimator 35, based on a pixel correspondence between the reference three-dimensional object models, the two-dimensional image determined by the optimum pose, and the three-dimensional model, using the comparative images of the optimum poses which correspond to all the learning images (step 221).

Finally, variation-specific three-dimensional weighting coefficient generator 63 registers the generated reference three-dimensional weighting coefficients in variation-specific reference three-dimensional weighting coefficient storage unit 67 (step 231).

Advantages of the third embodiment will be described below.

According to the present embodiment, comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses.

According to the present invention, furthermore, since only one three-dimensional weighting coefficient is used for all poses, an appropriate three-dimensional weighting coefficient depending on a desired pose can be established in a smaller storage capacity than if two-dimensional weighting coefficients are to be held for respective poses.

According to the present embodiment, furthermore, because the degree of importance in matching of each pixel is learned on a three-dimensional model, an appropriate three-dimensional weighting coefficient with respect to an arbitrary pose can be determined with fewer learning images than learning images corresponding to all poses.

According to the present embodiment, moreover, variation-specific three-dimensional weighting coefficients corresponding variations which can occur in the input image are held, a variation is estimated from the input image, and a corresponding three-dimensional weighting coefficient is employed. Therefore, highly accurate pose estimation and matching can be performed by setting appropriate weighting coefficients depending on variations that may occur as object deformations and illuminating condition variations.

A specific example of operation of the third embodiment will be described below.

Figure 26:
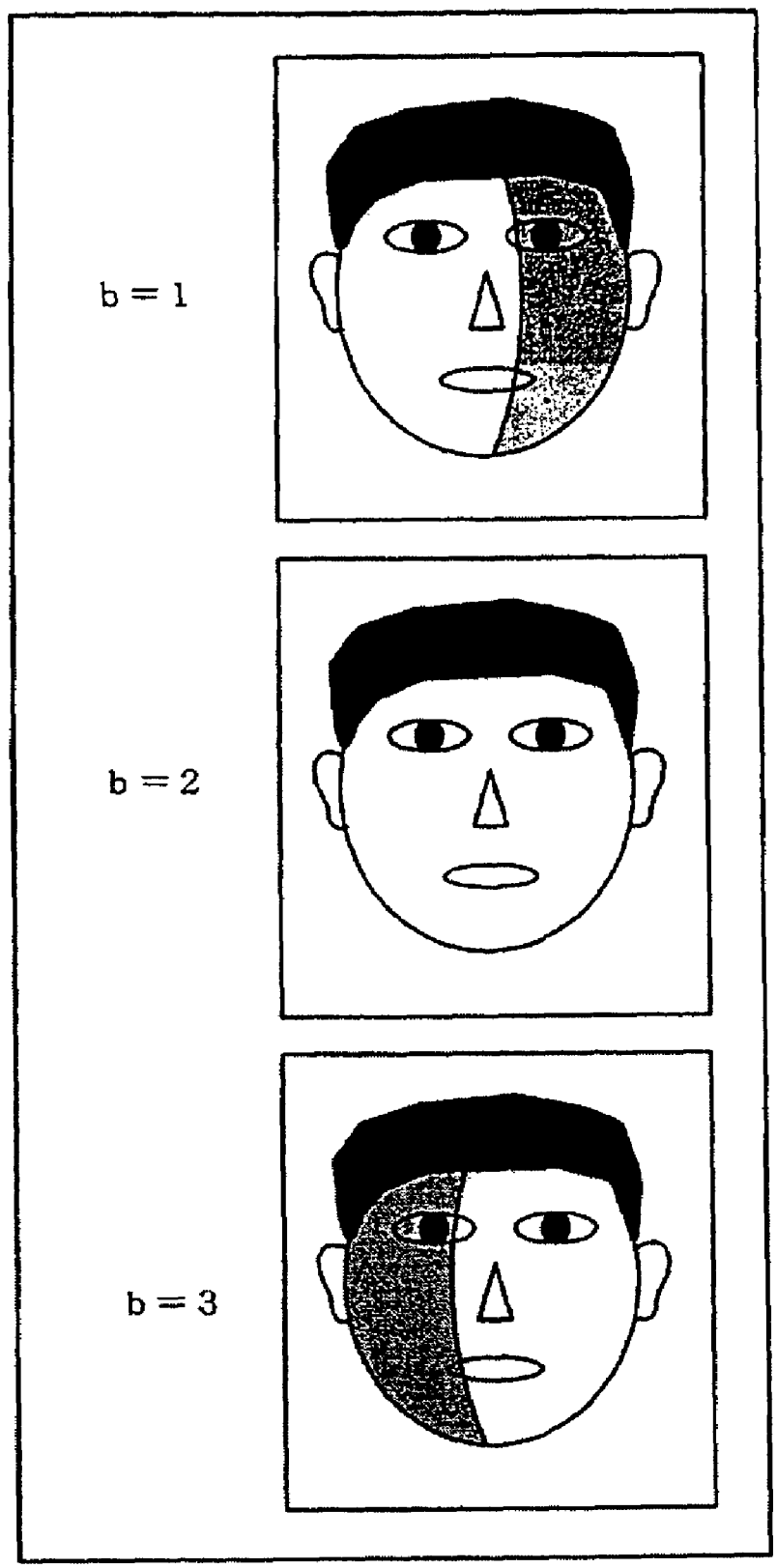
FIG. 26 is a diagram showing a specific example of variations (illuminating conditions) according to the third embodiment.

Image variations may be represented by object deformations and illuminating condition variations, for example. Illuminating condition variations may be three variations: an right illuminating direction (b=1), a front illuminating direction (b=2), and a left illuminating direction (b=3), as shown in FIG. 26, for example.

Figure 27:
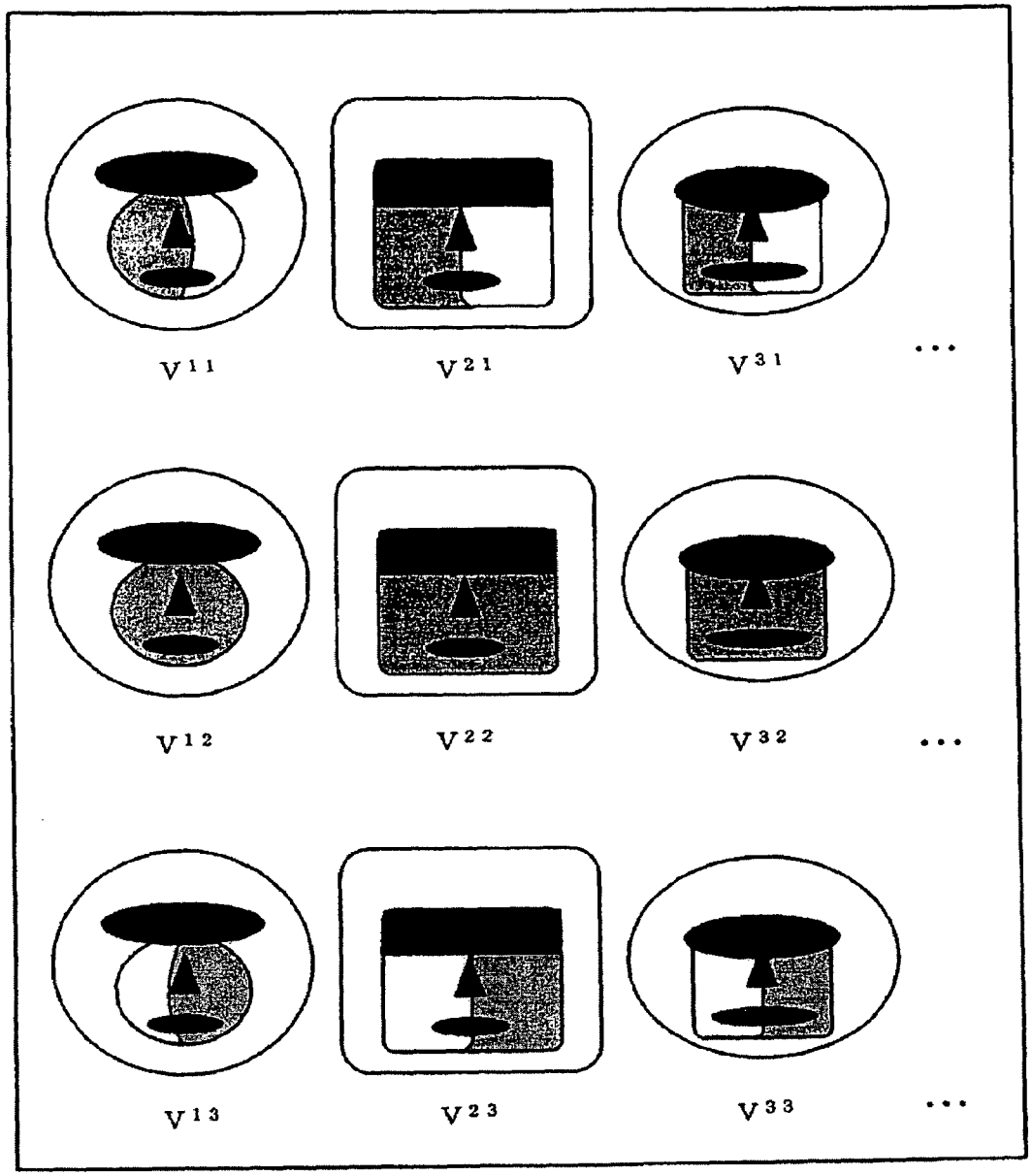
FIG. 27 is a diagram showing a specific example of variation-specific reference three-dimensional weighting coefficients according to the third embodiment.

As shown in FIG. 10, reference three-dimensional object model storage unit 55 stores reference three-dimensional object models (three-dimensional shapes $P_Q^k(x,y,z)$ and textures $T_Q^k(R,G,B)$) of objects $C_k$. As shown in FIG. 27, variation-specific reference three-dimensional weighting coefficient storage unit 67 stores variation-specific reference three-dimensional weighting coefficients $V_Q^{kb}$. The variation-specific reference three-dimensional weighting coefficients can be generated by grouping learning images with respect to each variation manually or automatically using variation estimator 35, and learning reference three-dimensional weighting coefficients with respect to each of the groups.

Figure 28:
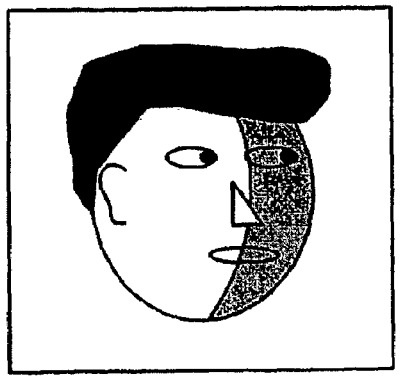
FIG. 28 is a diagram showing a specific example of an input image according to the third embodiment.
Figure 29:
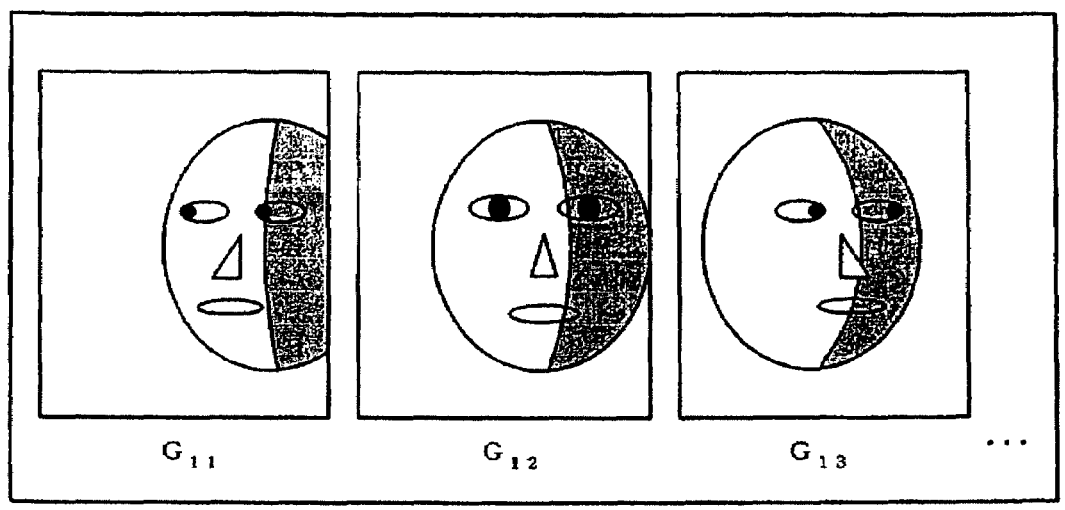
FIG. 29 is a diagram showing a specific example of comparative images according to the third embodiment.

The estimation of a pose with respect to a model $C_1$ will be described below. It is assumed that an input image I(r) as shown in FIG. 28 is obtained by image input unit 10 (step 100 shown in FIG. 24). Pose candidate determining unit 30 determines a pose candidate group $\{e_j\}$ (step 110). Comparative image generator 20 generates comparative images $G_{1j}(r)$ having illuminating conditions close to those of the input image, with respect to the respective pose candidates $e_j$, based on the reference three-dimensional object model $C_1$ (step 120). An example of comparative images generated with respect to the model $C_1$ is shown in FIG. 29.

Variation estimator 35 determines a correspondence between an area of a three-dimensional object model and the input image, using the pose candidates $e_j$ and the reference three-dimensional object models $C_k$, estimates a variation b based on image information of a given area, and sends a reference weighting coefficient based on the estimated variation b, among the variation-specific reference weighting coefficients stored in variation-specific reference three-dimensional weighting coefficient storage unit 67, to weighting coefficient converter 60 (step 180).

Illumination variations are estimated as follows: If the average luminance values of right and left halves of a face are represented by $L_1$, $L_2$, respectively, then the front illuminating direction (b=2) is estimated when $|L_1-L_2| \leq Th$ (Th represents a threshold value), the right illuminating direction (b=1) is estimated when $L_1 > L_2 + Th$, and the left illuminating direction (b=3) is estimated when $L_2 > L_1 + Th$.

Figure 30:
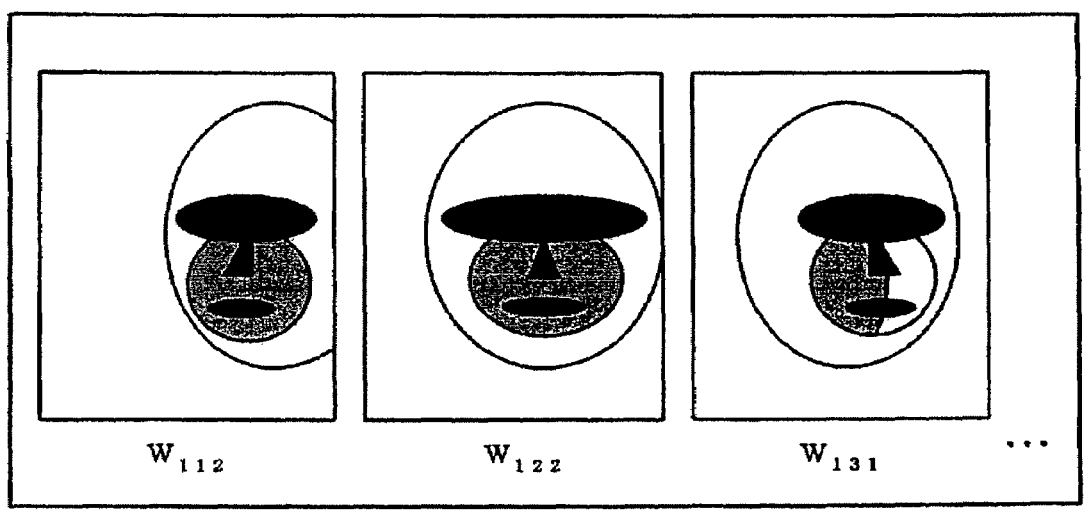
FIG. 30 is a diagram showing a specific example of two-dimensional weighting coefficients according to the third embodiment.

If the pose candidate for the input image shown in FIG. 28 is assumed to be represented by $e_1$, then since the pose does not match the input image, the shadow on the left half of the face is interpreted as not being large, the difference between the average luminance values satisfies the relationship $|L_1 - L_2| \leq Th$, and the front illuminating direction (b=2) is determined. Similarly, if the pose candidate for the input image is assumed to be represented by $e_2$, then the front illuminating direction (b=2) is also determined. If the pose candidate for the input image is assumed to be represented by $e_3$, then the right illuminating direction (b=1) is correctly determined. The pose can more accurately be estimated by using a light source direction estimating means in an image matching method disclosed in JP-2002-24830A, for example. Weighting coefficient converter 60 converts reference three-dimensional weighting coefficients $V_Q^{1b}$ of the variation b into two-dimensional weighting coefficients $W_{1j}b(r)$ depending on the pose candidates $e_j$ (step 132). An example of two-dimensional weighting coefficients generated based on the results of the above pose estimation is shown in FIG. 30.

Weighted matching and pose selecting unit 40 calculates weighted distance values $D_{1j}$ between the input image I(r) and the comparative images $G_{1j}(r)$, using the two-dimensional weighting coefficients $W_{1jb}(r)$ (step 140). Finally, weighted matching and pose selecting unit 40 selects a comparative image (pose candidate) whose distance value up to the model $C_1$ is the smallest, according to $D_1 = \min_j D_{1j}$, thereby estimating an optimum pose (step 150).

4th Embodiment

Figure 31:
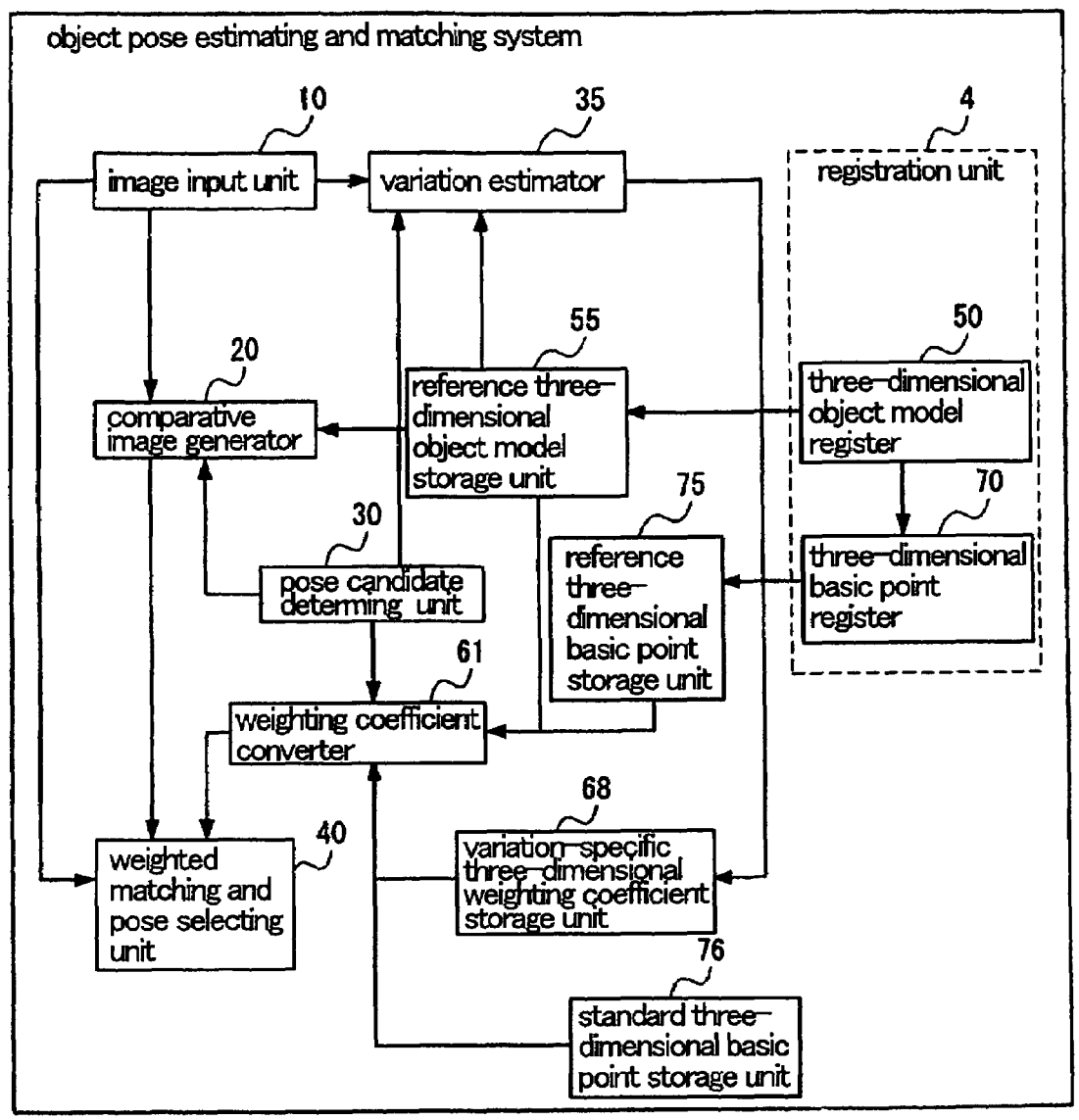
FIG. 31 is a block diagram of an arrangement of an object pose estimating and matching system according to a fourth embodiment of the present invention.

Referring to FIG. 31, an object pose estimating and matching system according to a fourth embodiment of the present invention comprises image input unit 10, comparative image generator 20, pose candidate determining unit 30, weighted matching and pose selecting unit 40, weighting coefficient converter 61, reference three-dimensional object model storage unit 55, reference three-dimensional basic point storage unit 75, standard three-dimensional basic point storage unit 76, variation estimator 35, variation-specific standard three-dimensional weighting coefficient storage unit 68, and a registration unit 4. Registration unit 4 comprises three-dimensional object model register 50 and three-dimensional basic point register 70.

Image input unit 10, comparative image generator 20, pose candidate determining unit 30, weighted matching and pose selecting unit 40, weighting coefficient converter 61, reference three-dimensional object model storage unit 55, reference three-dimensional basic point storage unit 75, standard three-dimensional basic point storage unit 76, three-dimensional object model register 50, and three-dimensional basic point register 70 operate in the same manner as the components denoted by the identical reference numerals according to the second embodiment shown in FIG. 17. Variation estimator 35 operates in the same manner as variation estimator 35 according to the third embodiment shown in FIG. 23. Variation-specific standard three-dimensional weighting coefficient storage unit 68 stores standard three-dimensional weighting coefficients corresponding to image variations.

Overall operation of the present embodiment for pose estimation will be described in detail below with reference to FIG. 31 and a flowchart shown in FIG. 32.

Figure 32:
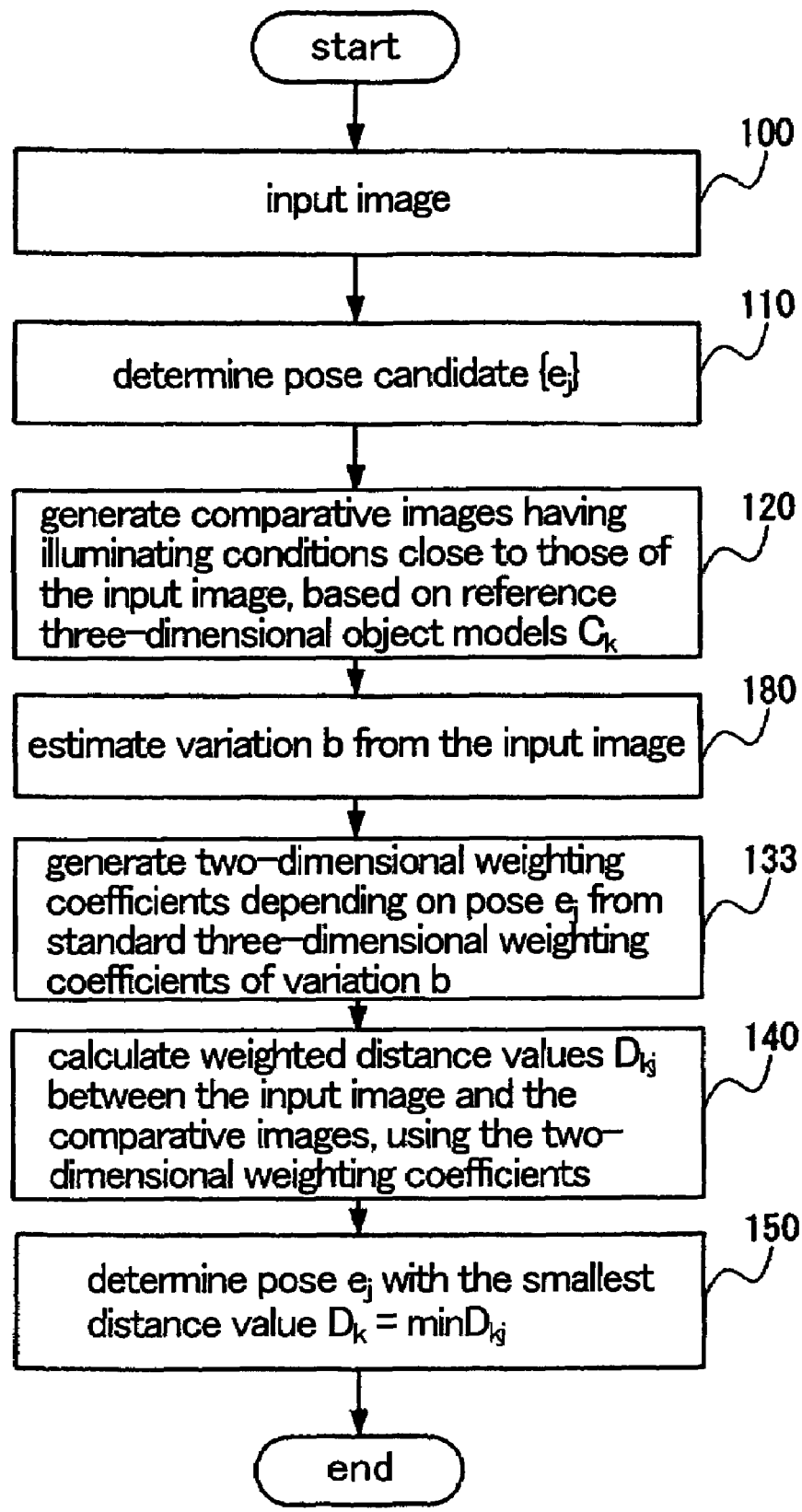
FIG. 32 is a flowchart of an operation sequence (pose estimation) of the fourth embodiment.

First, an input image of a model (object) is obtained by image input unit 10 (step 100 in FIG. 32). Then, pose candidate determining unit 30 determines a pose candidate group $\{e_j\}$ (step 110). Then, comparative image generator 20 generates comparative images having illuminating conditions close to those of the input image, with respect to the respective pose candidates, based on reference three-dimensional object models $C_k$ obtained from reference three-dimensional object model storage unit 55 (step 120).

Variation estimator 35 determines a correspondence between an area of a three-dimensional object model and the input image, using the pose candidates $e_j$ and the reference three-dimensional object models $C_k$, estimates a variation b based on image information of a given area, and sends a standard weighting coefficient based on the estimated variation b, among the variation-specific standard weighting coefficients stored in variation-specific standard three-dimensional weighting coefficient storage unit 68, to weighting coefficient converter 61 (step 180).

Weighting coefficient converter 61 determines a coordinate correspondence between the standard three-dimensional weighting coefficient of variation b obtained from variation-specific standard three-dimensional weighting coefficient storage unit 68 and the reference three-dimensional object models, depending on the pose candidate, using the standard three-dimensional basic points obtained from standard three-dimensional basic point storage unit 76 and the reference three-dimensional basic points obtained from reference three-dimensional basic point storage unit 75, and converts the standard three-dimensional weighting coefficients into two-dimensional weighting coefficients.

Finally, weighted matching and pose selecting unit 40 calculates weighted distance values $D_{kj}$ (or similarity degrees) between the input image and the comparative images, using the two-dimensional weighting coefficients (step 140), and selects a comparative image (pose candidate) whose distance value up to the model (object) is the smallest, thereby estimating an optimum pose (step 150).

Advantages of the fourth embodiment will be described below.

According to the present embodiment, comparative images are generated from reference three-dimensional object models depending on pose candidates, and three-dimensional weighting coefficients are converted into two-dimensional weighting coefficients, so that weighted distances are calculated. Therefore, highly accurate pose estimation and matching can be performed by setting appropriate weighting coefficients depending on poses.

According to the present invention, furthermore, since only one three-dimensional weighting coefficient is used for all poses, an appropriate three-dimensional weighting coefficient depending on an arbitrary pose can be established in a smaller storage capacity than if two-dimensional weighting coefficients are to be held for respective poses.

According to the present embodiment, furthermore, because a standard three-dimensional weighting coefficient representing an average of three-dimensional weighting coefficients of a plurality of objects is held, the storage capacity for storing the standard three-dimensional weighting coefficient is much smaller than if reference three-dimensional weighting coefficients are to be held for objects. It is not necessary to capture learning images corresponding to reference three-dimensional object models upon registration.

According to the present embodiment, moreover, variation-specific three-dimensional weighting coefficients corresponding variations which can occur in the input image are held, a variation is estimated from the input image, and a corresponding three-dimensional weighting coefficient is employed. Therefore, highly accurate pose estimation and matching can be performed by setting appropriate weighting coefficients depending on variations that may occur as object deformations and illuminating condition variations.

A specific example of operation of the fourth embodiment will be described below.

Figure 33:
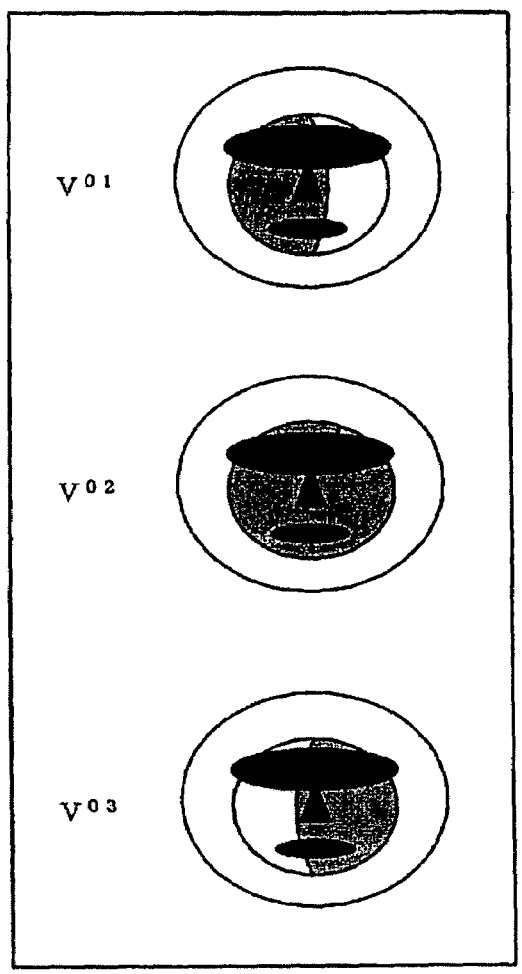
FIG. 33 is a diagram showing a specific example of variation-specific reference three-dimensional weighting coefficients according to the fourth embodiment.

As shown in FIG. 10, reference three-dimensional object model storage unit 55 stores reference three-dimensional object models (three-dimensional shapes $P_Q^k(x,y,z)$ and textures $T_Q^k(R,G,B)$) of objects $C_k$. As shown in FIG. 20, standard three-dimensional basic point storage unit 76 stores the coordinates of standard three-dimensional basic points $N_i^0$. As shown in FIG. 21, reference three-dimensional basic point storage unit 75 stores the coordinates of reference three-dimensional basic points $N_i^k$. Furthermore, as shown in FIG. 33, Variation-specific standard three-dimensional weighting coefficient storage unit 68 stores standard three-dimensional weighting coefficients $V_Q^{0b}$ classified according to variations. The variation-specific standard three-dimensional weighting coefficients can be generated by grouping learning images with respect to each variation manually or automatically using variation estimator 35, and learning standard three-dimensional weighting coefficients with respect to each of the groups.

The estimation of a pose with respect to a model $C_1$ will be described below. It is assumed that an input image I(r) as shown in FIG. 28 is obtained by image input unit 10 (step 100 shown in FIG. 33). Pose candidate determining unit 30 determines a pose candidate group $\{e_j\}$ (step 110). Comparative image generator 20 generates comparative images $G_{1j}(r)$ having illuminating conditions close to those of the input image, with respect to the respective pose candidates $e_j$, based on the reference three-dimensional object model $C_1$ (step 120). An example of comparative images generated with respect to the model $C_1$ is shown in FIG. 29.

Variation estimator 35 determines a correspondence between an area of a three-dimensional object model and the input image, using the pose candidates $e_j$ and the reference three-dimensional object models $C_k$, estimates a variation b based on image information of a given area, and sends a standard weighting coefficient of the corresponding variation b, among the variation-specific standard weighting coefficients stored in variation-specific standard three-dimensional weighting coefficient storage unit 68, to weighting coefficient converter 61 (step 180).

Figure 34:
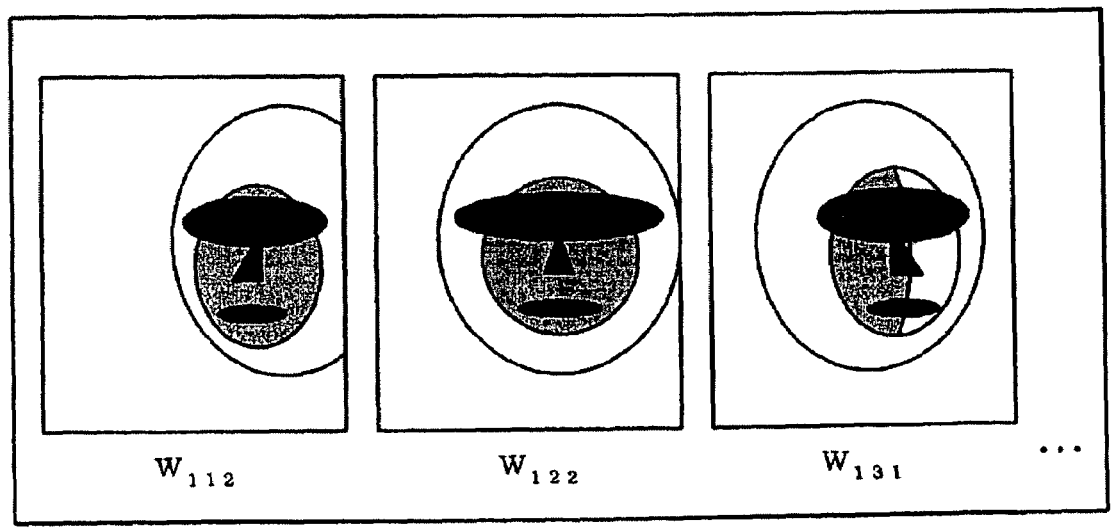
FIG. 34 is a diagram showing a specific example of two-dimensional weighting coefficients according to the fourth embodiment.

Weighting coefficient converter 61 determines a coordinate correspondence between the standard three-dimensional weighting coefficients $V_Q^{0b}$ of the variation b and the reference three-dimensional object models $PQ^k$ depending on the pose candidates $e_j$, using the standard three-dimensional basic points $N_i^0$ and the reference three-dimensional basic points $N_i^k$, and converts the standard three-dimensional weighting coefficients $V_Q^{0b}$ into two-dimensional weighting coefficients $W_{1jb}(r)$ (step 133). An example of two-dimensional weighting coefficients generated based on the results of the above pose estimation is shown in FIG. 34.

Weighted matching and pose selecting unit 40 calculates weighted distance values $D_{1j}$ between the input image I(r) and the comparative images $G_{1j}(r)$, using the two-dimensional weighting coefficients $W_{1jb}(r)$ (step 140). Finally, weighted matching and pose selecting unit 40 selects a comparative image (pose candidate) whose distance value up to the model $C_1$ is the smallest, according to $D_1=\min_j D_{1j}$, thereby estimating an optimum pose (step 150).

5th Embodiment

Figure 35:
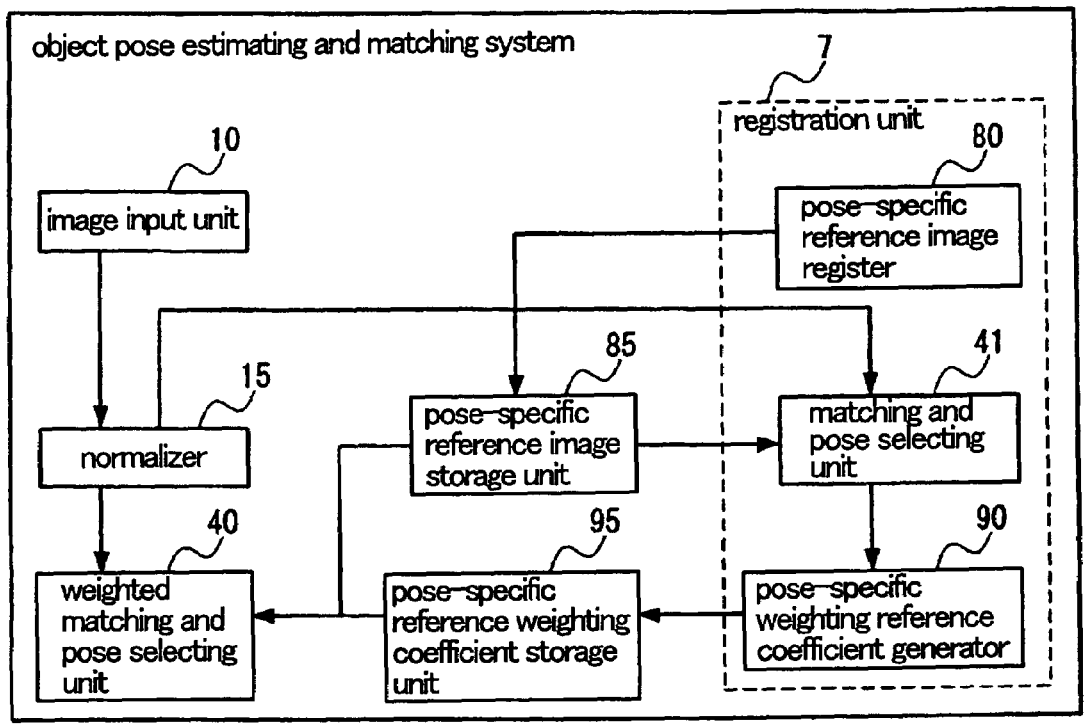
FIG. 35 is a block diagram of an arrangement of an object pose estimating and matching system according to a fifth embodiment of the present invention.

Referring to FIG. 35, an object pose estimating and matching system according to a fifth embodiment of the present invention comprises image input unit 10, normalizer 15, weighted matching and pose selecting unit 40, pose-specific reference image storage unit 85, pose-specific reference weighting coefficient storage unit 95, and registration unit 7. Registration unit 7 comprises pose-specific reference image register 80, matching and pose selecting unit 41, and pose-specific weighting coefficient generator 90.

Image input unit 10, normalizer 15, matching and pose selecting unit 41, and pose-specific reference image storage unit 85 operate in the same manner as the components denoted by the identical reference numerals according to the first prior art. Weighted matching and pose selecting unit 40 calculates weighted distance values between the normalized image and pose-specific reference images obtained from pose-specific reference image storage unit 85, using the pose-specific weighting coefficients obtained from pose-specific reference weighting coefficient storage unit 95, and selects a reference image whose distance value is the smallest, thereby estimating an optimum pose. Pose-specific reference image register 80 registers pose-specific reference images in pose-specific reference image storage unit 85. Pose-specific weighting coefficient generator 90 generates pose-specific reference weighting coefficients by learning the degree of importance in matching of each pixel, with respect to respective poses using a reference image of the optimum pose obtained from matching and pose selecting unit 41 and the input image, and registers the generated pose-specific reference weighting coefficients in pose-specific reference weighting coefficient storage unit 95.

Overall operation of the fifth embodiment for pose estimation will be described in detail below with reference to FIG. 35 and a flowchart shown in FIG. 36.

Figure 36:
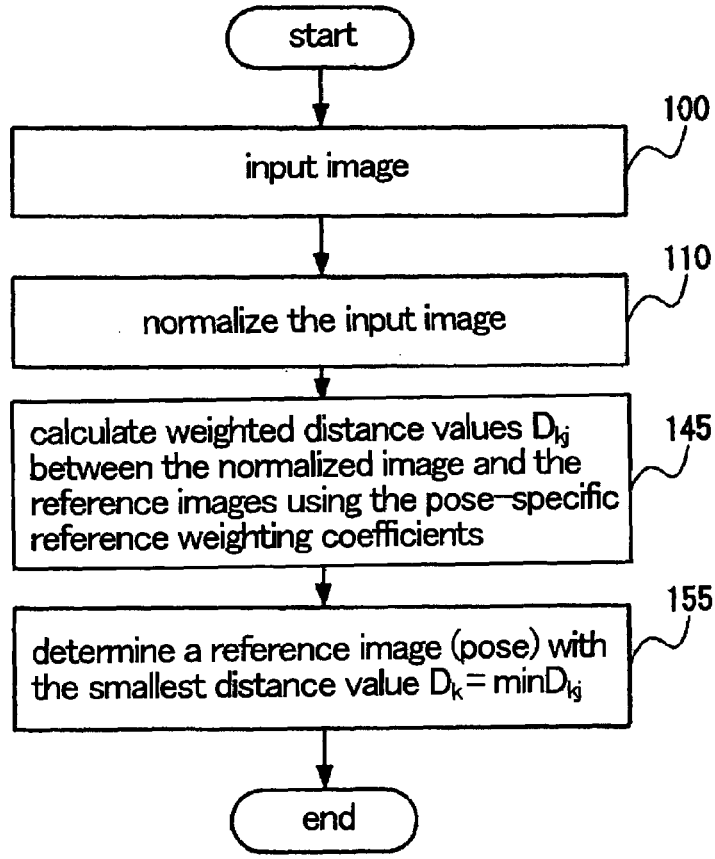
FIG. 36 is a flowchart of an operation sequence (pose estimation) of the fifth embodiment.

First, an input image is obtained by image input unit 10 (step 100 in FIG. 36). Then, normalizer 15 aligns the input image using feature points extracted from the object, and generates a normalized image (step 101).

Finally, weighted matching and pose selecting unit 40 calculates weighted distance values (or similarity degrees) between the normalized image and the pose-specific reference images obtained from pose-specific reference image storage unit 85, using the pose-specific reference weighting coefficients obtained from pose-specific reference weighting coefficient storage unit 95 (step 145), and selects a reference image (pose) whose distance value up to the object is the smallest, thereby estimating an optimum pose (step 155).

Overall operation of the fifth embodiment for registration will be described in detail below with reference to FIG. 35 and a flowchart shown in FIG. 37.

Figure 37:
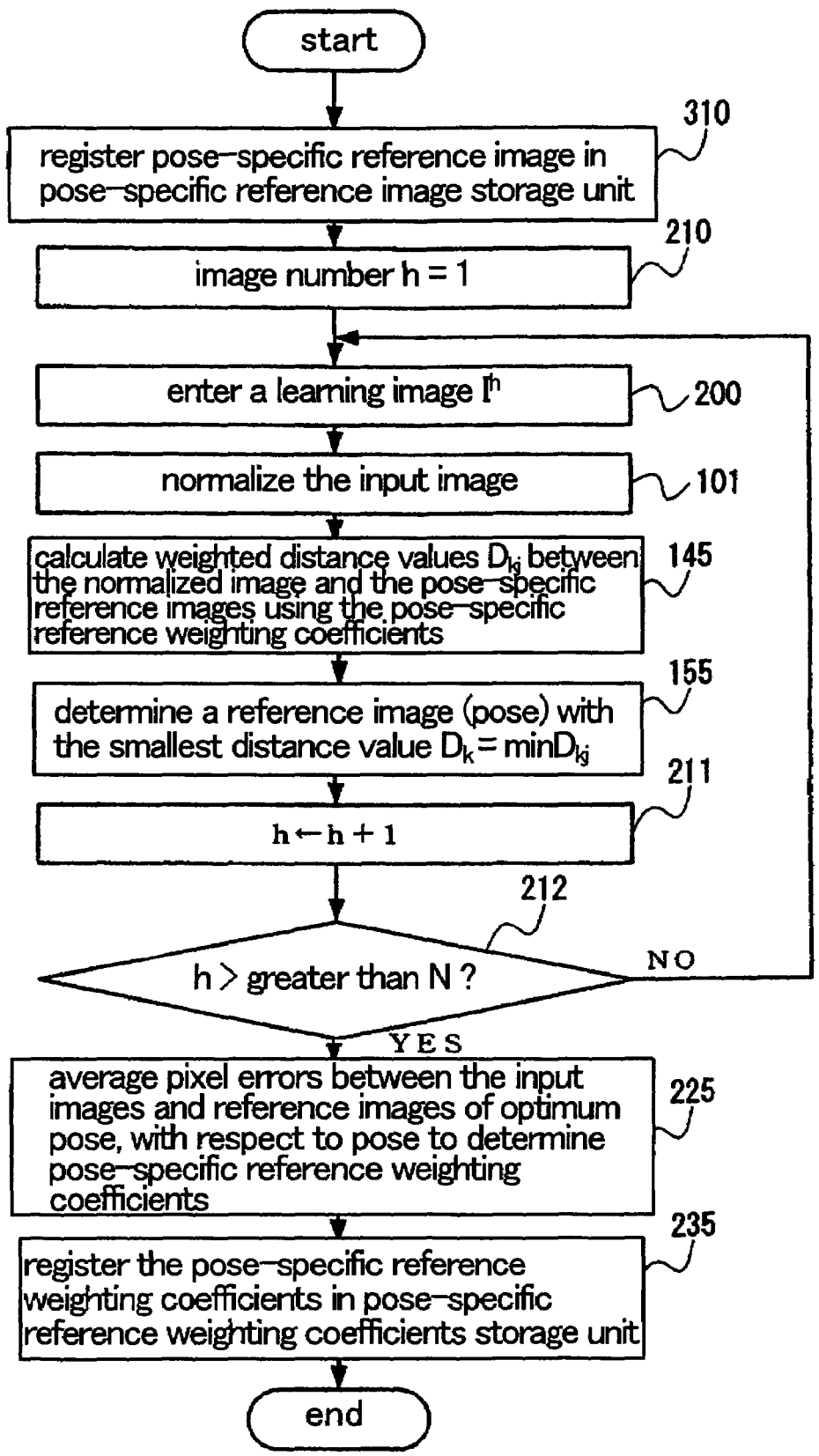
FIG. 37 is a flowchart of an operation sequence (registration) of the fifth embodiment.

First, pose-specific reference image register 80 registers reference images of objects $C_k$ in pose-specific reference image storage unit 85 (step 310 in FIG. 37). Then, pose-specific weighting coefficient generator 90 first sets an image number h=1 (step 210) and then enters a learning image having the image number h from image input unit 10 (step 200) in order to learn reference three-dimensional weighting coefficients using the learning image and the reference images.

Then, normalizer 15 aligns the input image using feature points extracted from the object, and generates a normalized image (step 101). Matching and pose selecting unit 41 calculates distance values $D_{kj}'$ (or similarity degrees) between the input image and the reference images (step 145), and selects one of the reference images (pose candidates) whose distance value up to the model (object) is the smallest, thereby estimating an optimum pose (step 155).

Then, pose-specific weighting coefficient generator 90 increments the image number h by 1 (step 211). If the image number h is equal to or smaller than the number N of learning images (step 212), then control goes back to step 200 for determining a comparative image having an optimum pose which corresponds to a next learning image. If the image number h is greater than the number N of learning images, then pose-specific weighting coefficient generator 90 generates pose-specific reference weighting coefficients by learning the degree of importance in matching of each pixel with respect to each of the poses, using the reference images of the optimum poses which correspond to all the learning images (step 225). The fifth embodiment differs from the first embodiment only in that it has pose-specific reference images and reference weighing coefficients instead of one reference three-dimensional object model and reference three-dimensional weighting coefficients. That is, the comparative images for the respective pose candidates and the two-dimensional weighting coefficients in the first embodiment correspond to the reference images and the reference weighting coefficients in the fifth embodiment. Therefore, with respect to the learning of the degree of importance, if the errors $d_{kj}^{h}(r)$ in the first embodiment are calculated using the reference images in place of the comparative images G and a (two-dimensional) average error thereof is represented by $E^{kj}$, then the reference weighting coefficients can be calculated according to $W_{kj}=A/E^{kj}$.

Finally, the pose-specific reference weighting coefficients are registered in pose-specific reference weighting coefficient storage unit 95 (step 235).

Advantages of the fifth embodiment will be described below.

According to the present embodiment, weighted distances are calculated using pose-specific weighting coefficients corresponding to pose-specific reference images. Therefore, highly accurate pose estimation and matching can be performed by setting appropriate weighting coefficients depending on poses.

A specific example of operation of the fifth embodiment will be described below.

Figure 38:
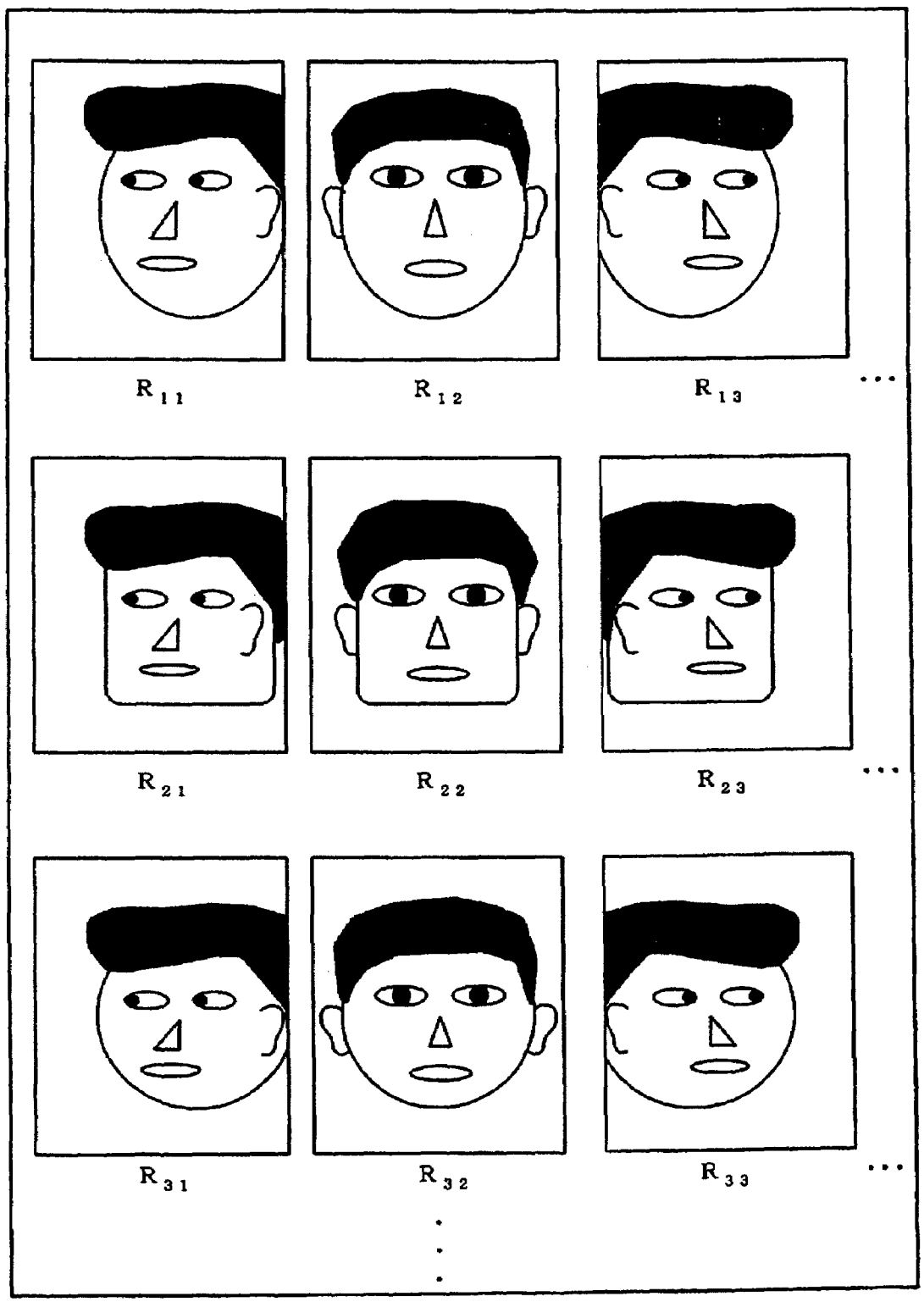
FIG. 38 is a diagram showing a specific example of pose-specific reference images according to the fifth embodiment.
Figure 39:
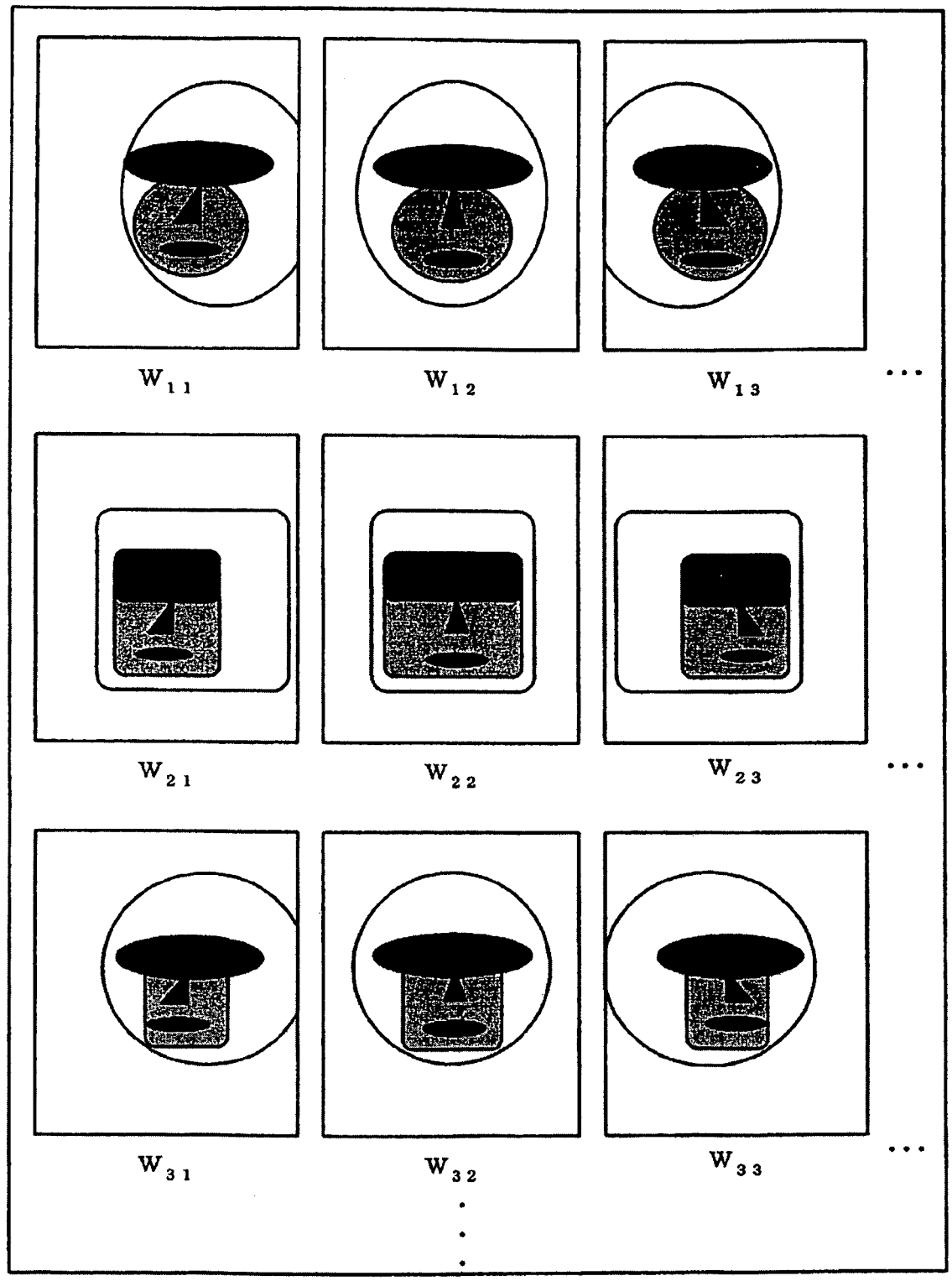
FIG. 39 is a diagram showing a specific example of pose-specific reference weighting coefficients according to the fifth embodiment.

As shown in FIG. 38, pose-specific reference image storage unit 85 stores pose-specific reference images $R_{kj}$ of objects $C_k$. As shown in FIG. 39, reference weighting coefficient storage unit 95 stores pose-specific reference weighting coefficients $W_{kj}$.

Figure 40:
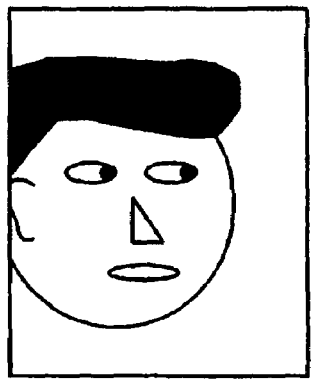
FIG. 40 is a diagram showing a specific example of a normalized image according to the fifth embodiment.

The estimation of a pose with respect to a model $C_1$ will be described below. It is assumed that an input image I(r) as shown in FIG. 12 is obtained by image input unit 10 (step 100 shown in FIG. 36). Then, normalizer 15 aligns the input image using feature points extracted from the object, and generates a normalized image I'(r) (step 101). An example of a normalized image with respect to the input image shown in FIG. 12 is illustrated in FIG. 40. Finally, weighted matching and pose selecting unit 40 calculates weighted distance values $D_{1j}$ (or similarity degrees) between the normalized image I'(r) and the pose-specific reference images $R_{1j}(r)$ obtained from pose-specific reference image storage unit 85, using the pose-specific reference weighting coefficients $W_{1j}$ of respective objects obtained from pose-specific reference weighting coefficient storage unit 95 (step 145), and selects a reference image (pose) whose distance value up to the object is the smallest, thereby estimating an optimum pose (step 155). If the Euclidean distance is used, then weighting is calculated according to $D_{kj}=\Sigma_r W_{kj}(r)\{I'(r)-R_{kj}(r)\}^2$. For the normalized image shown in FIG. 40, $R_{13}$ of the pose $e_3$, for example, is selected as a comparative image whose distance value is the smallest.

6th Embodiment

Figure 41:
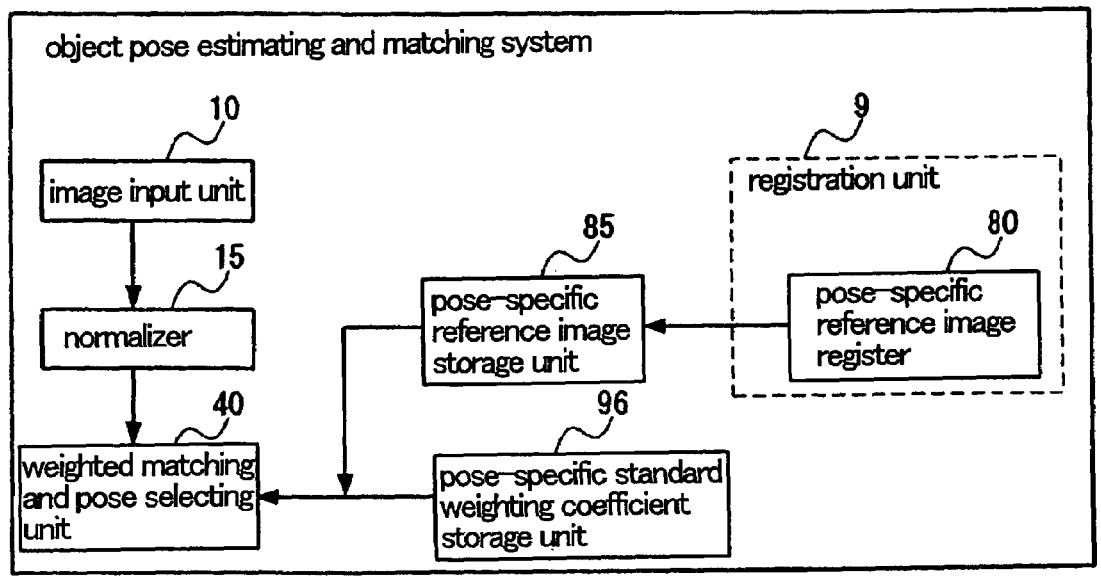
FIG. 41 is a block diagram of an arrangement of an object pose estimating and matching system according to a sixth embodiment of the present invention.

Referring to FIG. 41, an object pose estimating and matching system according to a sixth embodiment of the present invention comprises image input unit 10, normalizer 15, weighted matching and pose selecting unit 40, pose-specific reference image storage unit 85, pose-specific standard weighting coefficient storage unit 96, and registration unit 9. Registration unit 9 comprises pose-specific reference image register 80.

Image input unit 10, normalizer 15, and pose-specific reference image storage unit 85 operate in the same manner as the components denoted by the identical reference numerals according to the fifth embodiment shown in FIG. 35. Pose-specific standard weighting coefficient storage unit 96 stores pose-specific standard weighting coefficients. Weighted matching and pose selecting unit 40 calculates weighted distance values between the normalized image and pose-specific reference images obtained from pose-specific reference image storage unit 85, using the pose-specific standard weighting coefficients obtained from pose-specific standard weighting coefficient storage unit 96, and selects a reference image whose distance value is the smallest, thereby estimating an optimum pose.

Overall operation of the sixth embodiment for pose estimation will be described in detail below with reference to FIG. 41 and a flowchart shown in FIG. 42.

Figure 42:
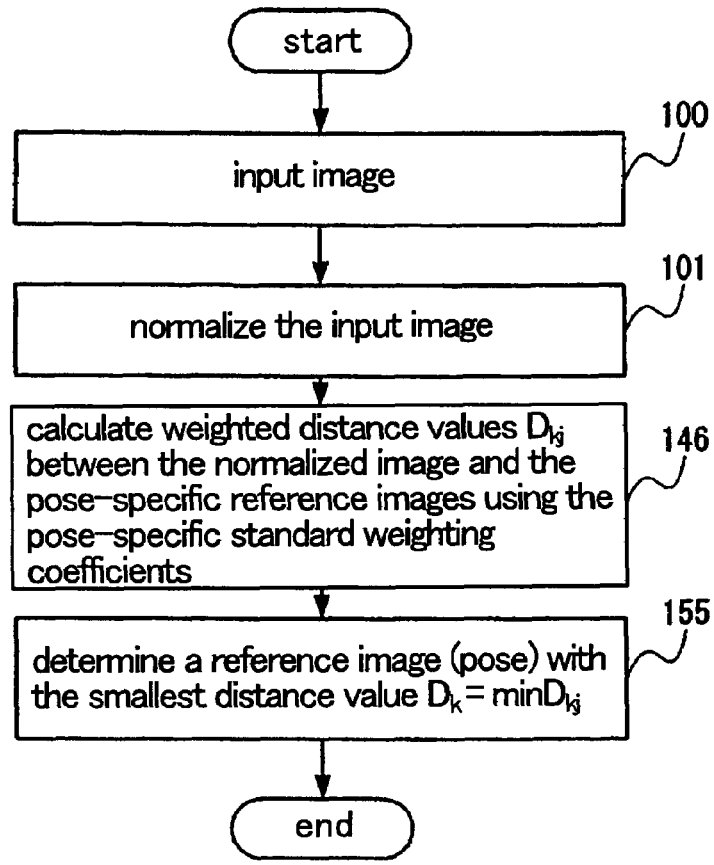
FIG. 42 is a flowchart of an operation sequence (pose estimation) of the sixth embodiment.

First, an input image is obtained by image input unit 10 (step 100 in FIG. 42). Then, normalizer 15 aligns the input image using feature points extracted from the object, and generates a normalized image (step 101). Finally, weighted matching and pose selecting unit 40 calculates weighted distance values (or similarity degrees) between the normalized image and the pose-specific reference images of respective objects obtained from pose-specific reference image storage unit 85, using the pose-specific standard weighting coefficients obtained from pose-specific standard weighting coefficient storage unit 96 (step 146), and selects a reference image (pose) whose distance value up to the object is the smallest, thereby estimating an optimum pose (step 155).

Advantages of the sixth embodiment will be described below.

According to the present embodiment, weighted distances are calculated using pose-specific weighting coefficients corresponding to pose-specific reference images. Therefore, highly accurate pose estimation and matching can be performed by setting appropriate weighting coefficients depending on poses.

According to the present embodiment, furthermore, because a standard weighting coefficient representing an average of weighting coefficients of a plurality of objects is held, the storage capacity for storing the standard three-dimensional weighting coefficient is much smaller than if reference three-dimensional weighting coefficients are to be held for objects. It is not necessary to capture learning images corresponding to reference images upon registration.

A specific example of operation of the sixth embodiment will be described below.

Figure 43:
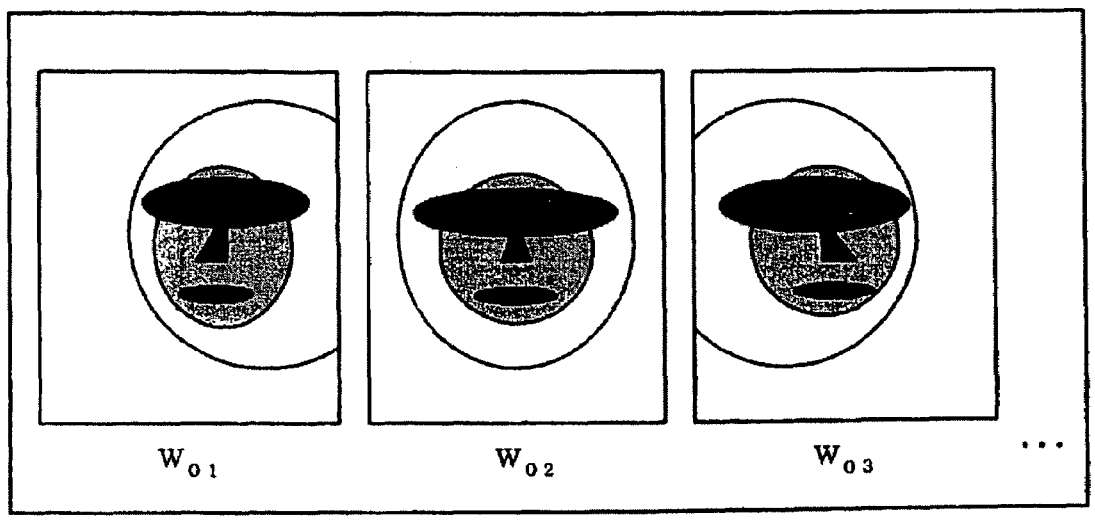
FIG. 43 is a diagram showing a specific example of pose-specific standard weighting coefficients according to the sixth embodiment.

As shown in FIG. 38, pose-specific reference image storage unit 85 stores pose-specific reference images $R_{kj}$ of objects $C_k$. As shown in FIG. 43, pose-specific standard weighting coefficient storage unit 96 stores pose-specific standard weighting coefficients $W_{0j}$. The pose-specific standard weighting coefficients can be determined by averaging pose-specific reference weighting coefficients for each pose or learning prepared learning reference images for each pose.

The estimation of a pose with respect to a model $C_1$ will be described below. It is assumed that an input image I(r) as shown in FIG. 12 is obtained by image input unit 12 (step 100 shown in FIG. 42). Then, normalizer 15 aligns the input image using feature points extracted from the object, and generates a normalized image I'(r) (step 101). An example of a normalized image with respect to the input image shown in FIG. 12 is illustrated in FIG. 40. Finally, weighted matching and pose selecting unit 40 calculates weighted distance values $D_{1j}$ (or similarity degrees) between the normalized image I'(r) and the pose-specific reference images $R_{1j}(r)$ of respective objects obtained from pose-specific reference image storage unit 85, using the pose-specific standard weighting coefficients $W_{0j}$ obtained from pose-specific standard weighting coefficient storage unit 96 (step 146), and selects a reference image (pose) whose distance value up to the object is the smallest, thereby estimating an optimum pose (step 155).

7th Embodiment

Figure 44:
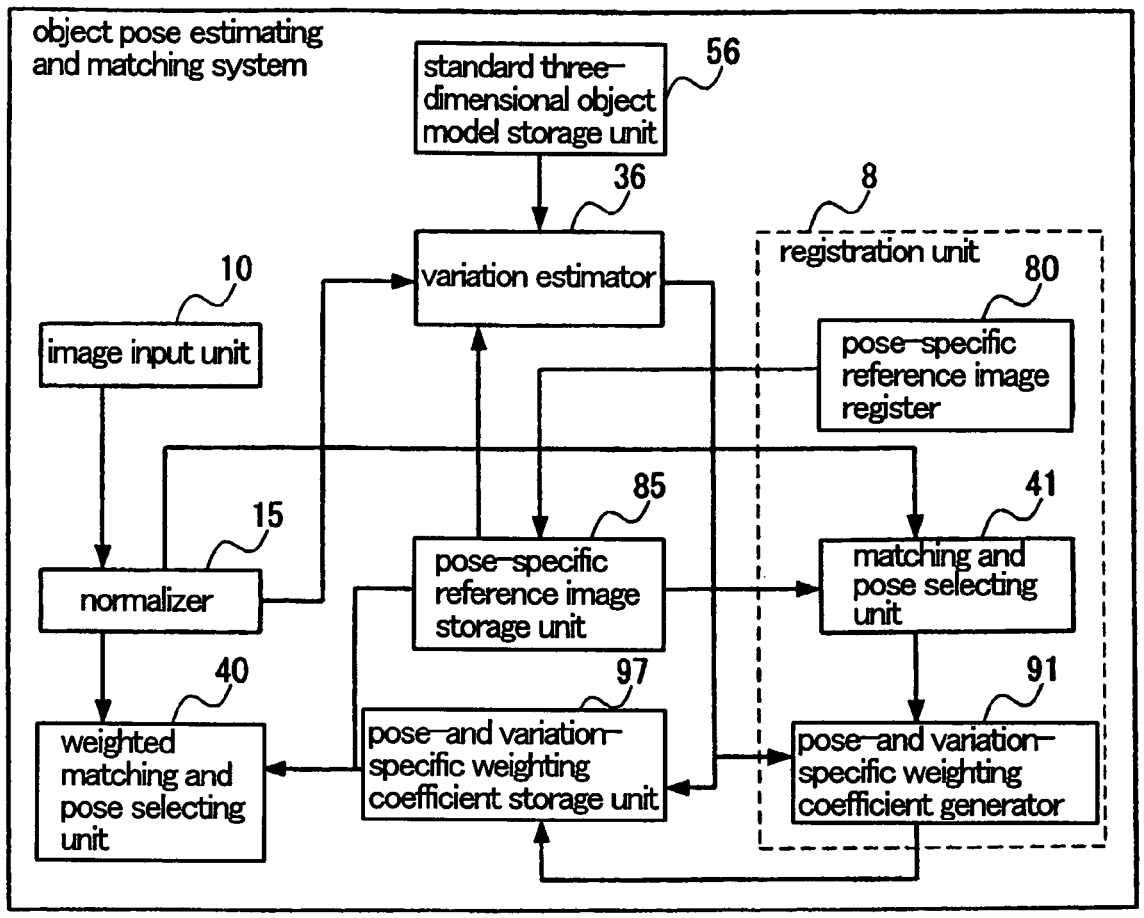
FIG. 44 is a block diagram of an arrangement of an object pose estimating and matching system according to a seventh embodiment of the present invention.

Referring to FIG. 44, an object pose estimating and matching system according to a seventh embodiment of the present invention comprises image input unit 10, normalizer 15, weighted matching and pose selecting unit 40, pose-specific reference image storage unit 85, pose- and variation-specific reference weighting coefficient storage unit 97, variation estimator 36, standard three-dimensional object model storage unit 56, and registration unit 8. Registration unit 8 comprises pose-specific reference image register 80, matching and pose selecting unit 41, and pose- and variation-specific weighting coefficient generator 91.

Image input unit 10, normalizer 15, weighted matching and pose selecting unit 40, pose-specific reference image storage unit 85, pose-specific reference image register 80, and matching and pose selecting unit 41 operate in the same manner as the components denoted by the identical reference numerals according to the fifth embodiment.

Pose- and variation-specific reference weighting coefficient storage unit 97 stores pose- and variation-specific weighting coefficients. Standard three-dimensional object model storage unit 56 stores standard three-dimensional object models.

Variation estimator 36 determines a correspondence between the normalized image obtained from normalizer 15 and an area of a three-dimensional object model, using the pose information of the reference images obtained from pose-specific reference image storage unit 85 and the standard three-dimensional object models obtained from standard three-dimensional object model storage unit 56, and estimates a variation based on image information of a given area. Furthermore, variation estimator 36 sends a corresponding pose- and variation-specific weighting coefficient based on the estimated variation, among the pose- and variation-specific weighting coefficients stored in pose- and variation-specific reference three-dimensional weighting coefficient storage unit 97, to weighted matching and pose selecting unit 40.

Pose- and variation-specific weighting coefficient generator 91 generates pose- and variation-specific reference weighting coefficients by learning the degree of importance in matching of each pixel for each image variation obtained from variation estimator 36, using the reference image of the optimum pose obtained from matching and pose selecting unit 41 and the input image, and registers the generated pose- and variation-specific reference weighting coefficients in pose- and variation-specific reference weighting coefficient storage unit 97.

Overall operation of the seventh embodiment for pose estimation will be described in detail below with reference to FIG. 44 and a flowchart shown in FIG. 45.

Figure 45:
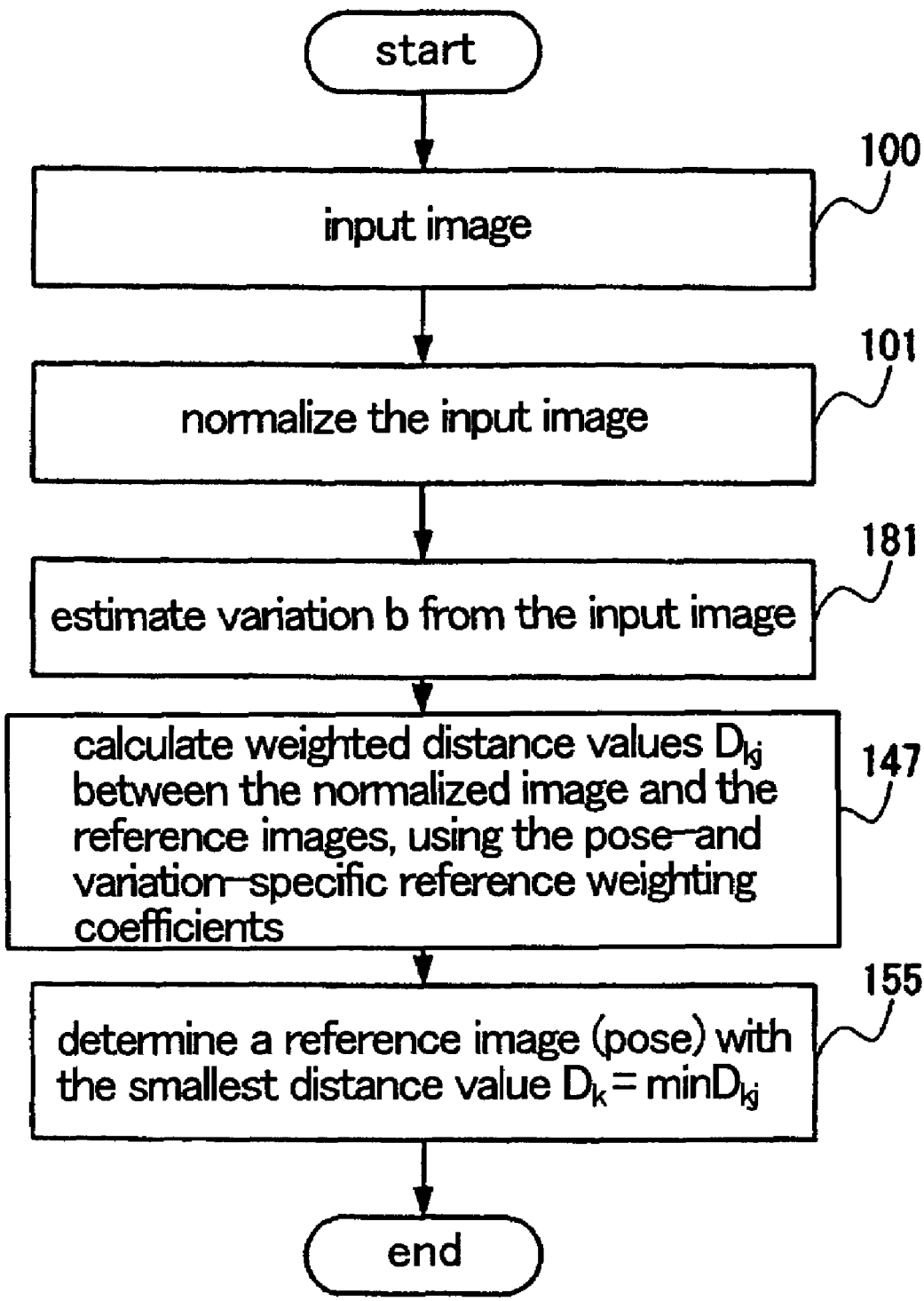
FIG. 45 is a flowchart of an operation sequence (pose estimation) of the seventh embodiment.

First, an input image is obtained by image input unit 10 (step 100 in FIG. 45). Then, normalizer 15 aligns the input image using feature points extracted from the object, and generates a normalized image (step 101).

Variation estimator 36 determines a correspondence between the normalized image and an area of a three-dimensional object model, using the pose information of the reference images obtained from pose-specific reference image storage unit 85 and the standard three-dimensional object models obtained from standard three-dimensional object model storage unit 56, estimates a variation b based on image information of a given area, and sends a corresponding pose- and variation-specific weighting coefficient based on the estimated variation, among the pose- and variation-specific weighting coefficients stored in pose- and variation-specific reference three-dimensional weighting coefficient storage unit 97, to weighted matching and pose selecting unit 40 (step 181).

Finally, weighted matching and pose selecting unit 40 calculates weighted distance values (or similarity degrees) between the normalized image and the pose-specific reference images obtained from pose-specific reference image storage unit 85, using the pose- and variation-specific reference weighting coefficients obtained from pose- and variation-specific reference weighting coefficient storage unit 97 (step 147), and selects a reference image (pose) whose distance value up to the object is the smallest, thereby estimating an optimum pose (step 155).

Overall operation of the seventh embodiment for registration will be described in detail below with reference to FIG. 44 and a flowchart shown in FIG. 46.

Figure 46:
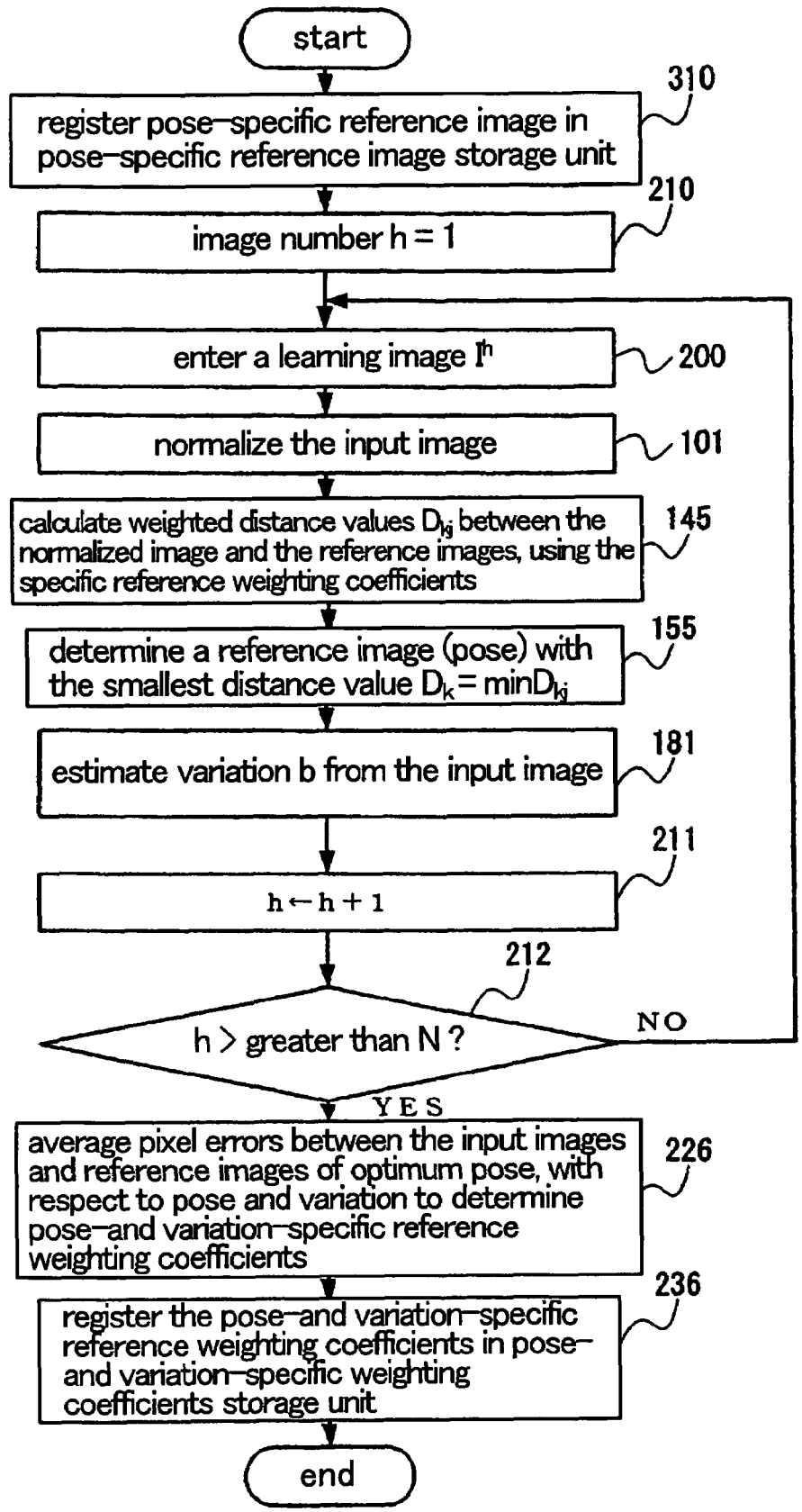
FIG. 46 is a flowchart of an operation sequence (registration) of the seventh embodiment.

First, pose-specific reference image register 80 registers reference images of objects $C_k$ in pose-specific reference image storage unit 85 (step 310 in FIG. 46).

Then, pose- and variation-specific weighting coefficient generator 91 first sets an image number h=1 (step 210) and then enters a learning image having the image number h from image input unit 10 (step 200) in order to learn reference weighting coefficients using the learning image and the reference images.

Then, normalizer 15 aligns the input image using feature points extracted from the object, and generates a normalized image (step 101). Matching and pose selecting unit 41 calculates distance values $D_{kj}'$ (or similarity degrees) between the input image and the reference images (step 145), and selects one of the reference images (pose candidates) whose distance value up to the model (object) is the smallest, thereby estimating an optimum pose (step 155).

Then, variation estimator 36 determines a correspondence between the normalized image and an area of a three-dimensional object model, using the pose information of the reference images obtained from pose-specific reference image storage unit 85 and the standard three-dimensional object models obtained from standard three-dimensional object model storage unit 56, and estimates a variation b based on image information of a given area (step 181).

Then, pose- and variation-specific weighting coefficient generator 91 increments the image number h by 1 (step 211). If the image number h is equal to or smaller than the number N of learning images (step 212), then control goes back to step 200 for determining a comparative image having an optimum pose which corresponds to a next learning image.

If the image number h is greater than the number N of learning images, then pose- and variation-specific weighting coefficient generator 91 generates pose- and variation-specific reference weighting coefficients by learning the degree of importance in matching of each pixel with respect to each pose and variation b, using the reference images of the optimum poses which correspond to all the learning images (step 226).

Finally, pose- and variation-specific weighting coefficient generator 91 registers the generated pose- and variation-specific reference weighting coefficients in pose- and variation-specific reference weighting coefficient storage unit 97 (step 236).

Advantages of the seventh embodiment will be described below.

According to the present embodiment, weighted distances are calculated using pose-specific weighting coefficients corresponding to pose-specific reference images. Therefore, highly accurate pose estimation and matching can be performed by setting appropriate weighting coefficients depending on poses.

According to the present invention, moreover, pose- and variation-specific weighting coefficients corresponding variations which can occur in the input image are held, a variation is estimated from the normalized image, and a corresponding weighting coefficient is employed. Therefore, highly accurate pose estimation and matching can be performed by setting appropriate weighting coefficients depending on variations that may occur as object deformations and illuminating condition variations.

A specific example of operation of the seventh embodiment will be described below.

Figure 47:
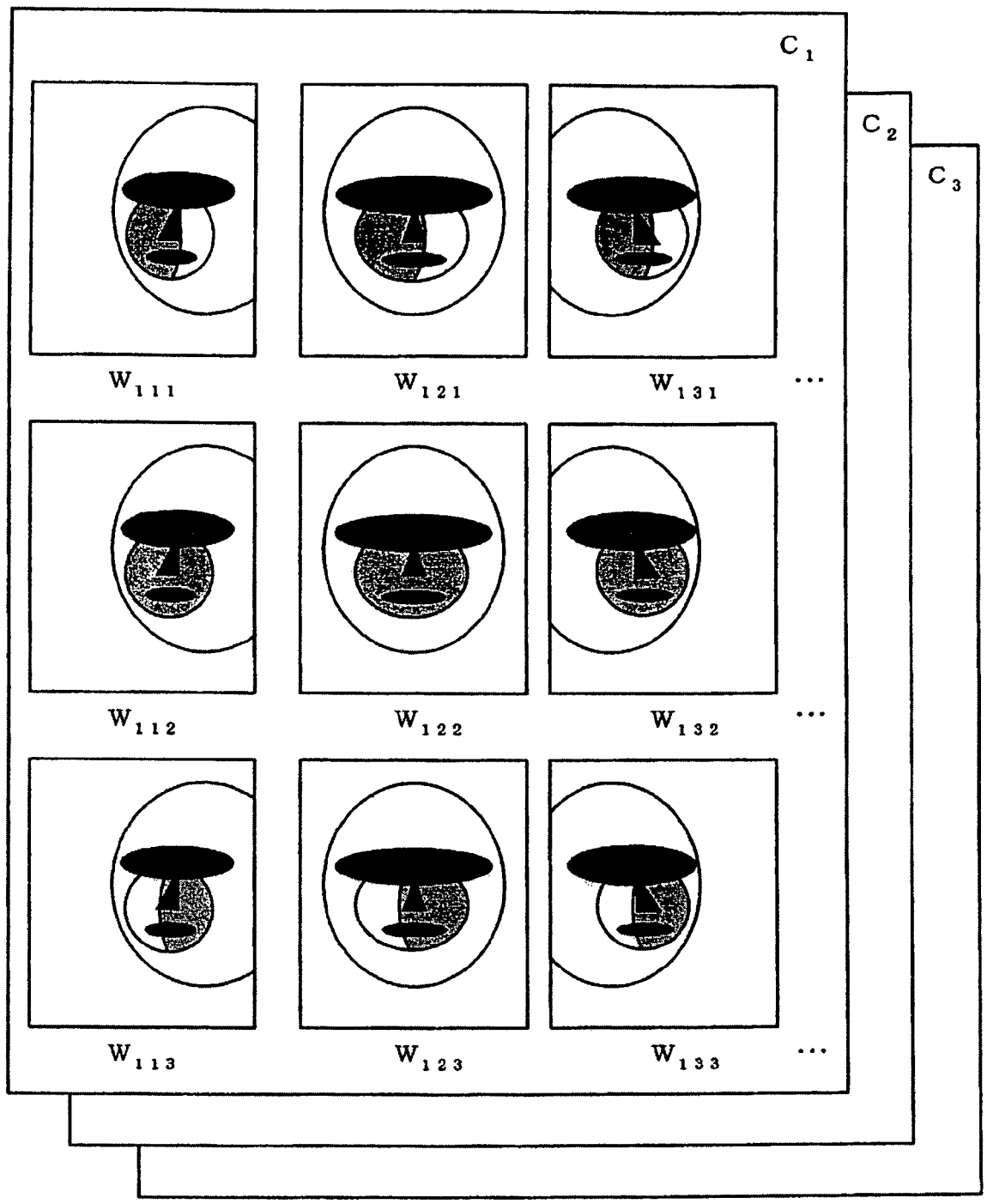
FIG. 47 is a diagram showing a specific example of pose- and variation-specific reference weighting coefficients according to the seventh embodiment.

As shown in FIG. 38, pose-specific reference image storage unit 85 stores pose-specific reference images $R_{kj}$ of objects $C_k$. As shown in FIG. 47, pose- and variation-specific reference weighting coefficient storage unit 97 stores pose- and variation-specific reference weighting coefficients $W_{kjb}$.

The estimation of a pose with respect to a model $C_1$ will be described below. It is assumed that an input image I(r) as shown in FIG. 28 is obtained by image input unit 12 (step 100 shown in FIG. 45).

Then, normalizer 15 aligns the input image using feature points extracted from the object, and generates a normalized image I'(r) (step 101).

Variation estimator 36 determines a correspondence between the normalized image and an area of a three-dimensional object model, using the pose information $e_j$ of the reference images $R_{1j}$ obtained from pose-specific reference image storage unit 85 and the standard three-dimensional object models obtained from standard three-dimensional object model storage unit 56, estimates a variation b based on image information of a given area, and sends a corresponding pose- and variation-specific weighting coefficient based on the estimated variation, among the pose- and variation-specific weighting coefficients $W_{kjb}$ stored in pose- and variation-specific reference three-dimensional weighting coefficient storage unit 97, to weighted matching and pose selecting unit 40 (step 181). It is determined which area of the standard three-dimensional object models each pixel of the reference images corresponds to, from the pose information of the reference images and the standard three-dimensional object models. Since the normalized image is matched, with an assumed pose, against the reference images, it is determined which area of the standard three-dimensional object models each pixel of the normalized image corresponds to using the correspondence of pixels between the normalized image and the reference images. The process of estimating a variation based on the image information of the given area is the same as the process in the third embodiment. For example, a variation is estimated from the average luminance values of right and left halves of a face, for example. As it is determined which area of the standard three-dimensional object models each pixel of the normalized image corresponds to, the average luminance values of right and left halves of a face can be calculated using the luminance values of the pixels of the normalized image, and a variation can be estimated.

Illumination variations are estimated as follows: If the front illuminating direction (b=2), the front illuminating direction (b=2), and the right illuminating direction (b=1) are determined respectively with respect to the pose information $e_1$, $e_2$, $e_3$, then pose- and variation-specific weighting coefficients $W_{112}$, $W_{122}$, $W_{131}$ are selected. Finally, weighted matching and pose selecting unit 40 calculates weighted distance values $D_{1j}$ between the normalized image I'(r) and the pose-specific reference images $R_{1j}$, using the pose- and variation-specific reference weighting coefficients $W_{1jb}(r)$ obtained from pose- and variation-specific weighting coefficient storage unit 97 (step 147), and selects a reference image (pose) whose distance value up to the object is the smallest, thereby estimating an optimum pose (step 155). For the normalized image shown in FIG. 40, the distance value is the smallest when the pose is represented by $e_3$ and the pose- and variation-specific weighting coefficient is represented by $W_{131}$ for the variation (illuminating condition) b=1, and the comparative image $R_{13}$ whose distance value is the smallest is selected.

8th Embodiment

Figure 48:
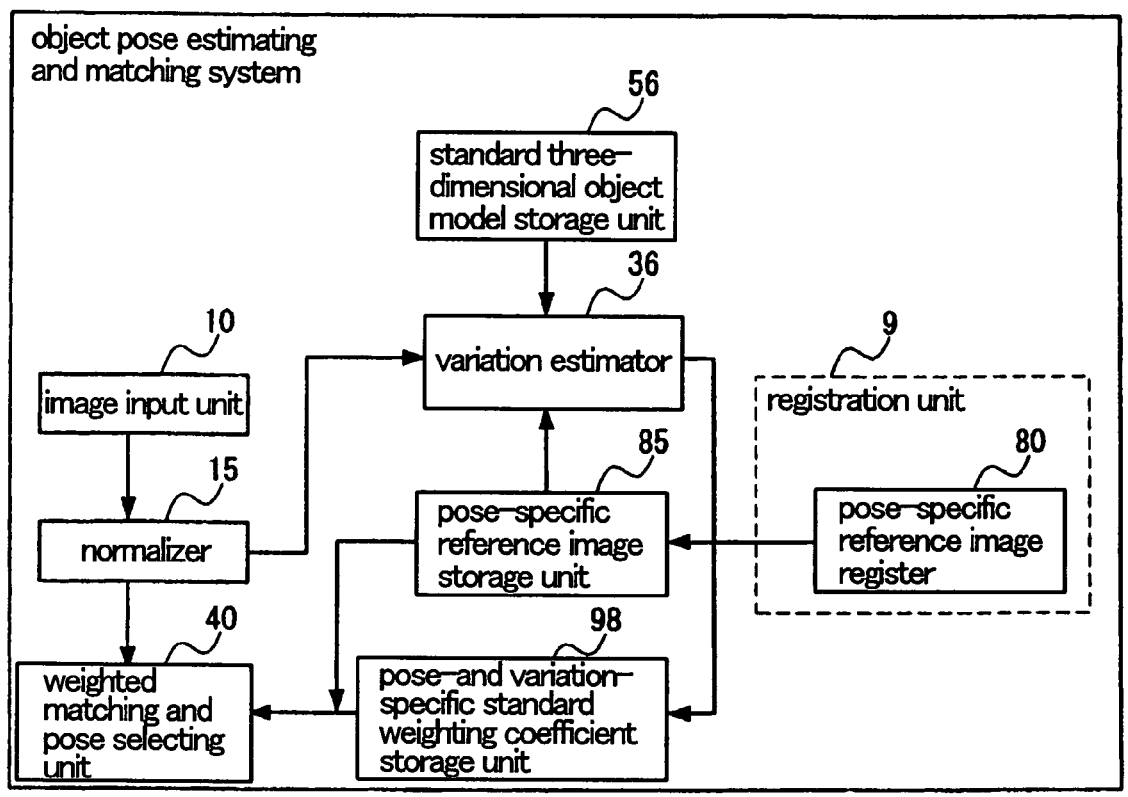
FIG. 48 is a block diagram of an arrangement of an object pose estimating and matching system according to an eighth embodiment of the present invention.

Referring to FIG. 48, an object pose estimating and matching system according to an eighth embodiment of the present invention comprises image input unit 10, normalizer 15, weighted matching and pose selecting unit 40, pose-specific reference image storage unit 85, pose- and variation-specific standard weighting coefficient storage unit 98, variation estimator 36, standard three-dimensional object model storage unit 56, and registration unit 9. Registration unit 9 comprises pose-specific reference image register 80.

Image input unit 10, normalizer 15, weighted matching and pose selecting unit 40, pose-specific reference image storage unit 85, variation estimator 36, standard three-dimensional object model storage unit 56, and pose-specific reference image register 80 operate in the same manner as the components denoted by the identical reference numerals according to the seventh embodiment shown in FIG. 44. Weighted matching and pose selecting unit 40 calculates weighted distance values between the normalized image obtained from normalizer 15 and pose-specific reference images obtained from pose-specific reference image storage unit 85, using the pose- and variation-specific standard weighting coefficients obtained from pose- and variation-specific standard weighting coefficient storage unit 98, and selects a reference image whose distance value is the smallest, thereby estimating an optimum pose.

Overall operation of the eighth embodiment for pose estimation will be described in detail below with reference to FIG. 44 and a flowchart shown in FIG. 49.

Figure 49:
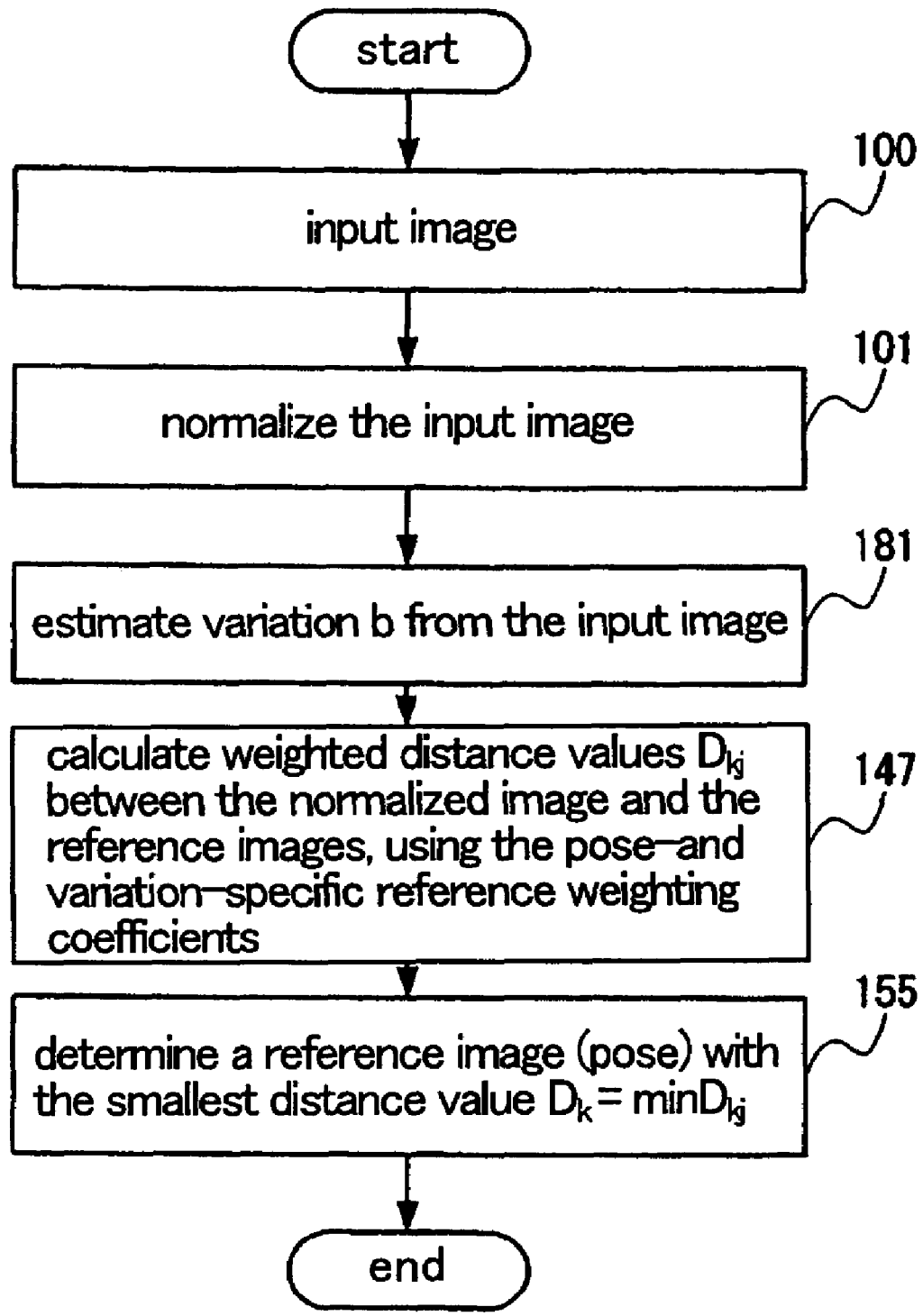
FIG. 49 is a flowchart of an operation sequence (pose estimation) of the eighth embodiment.
Figure 50:
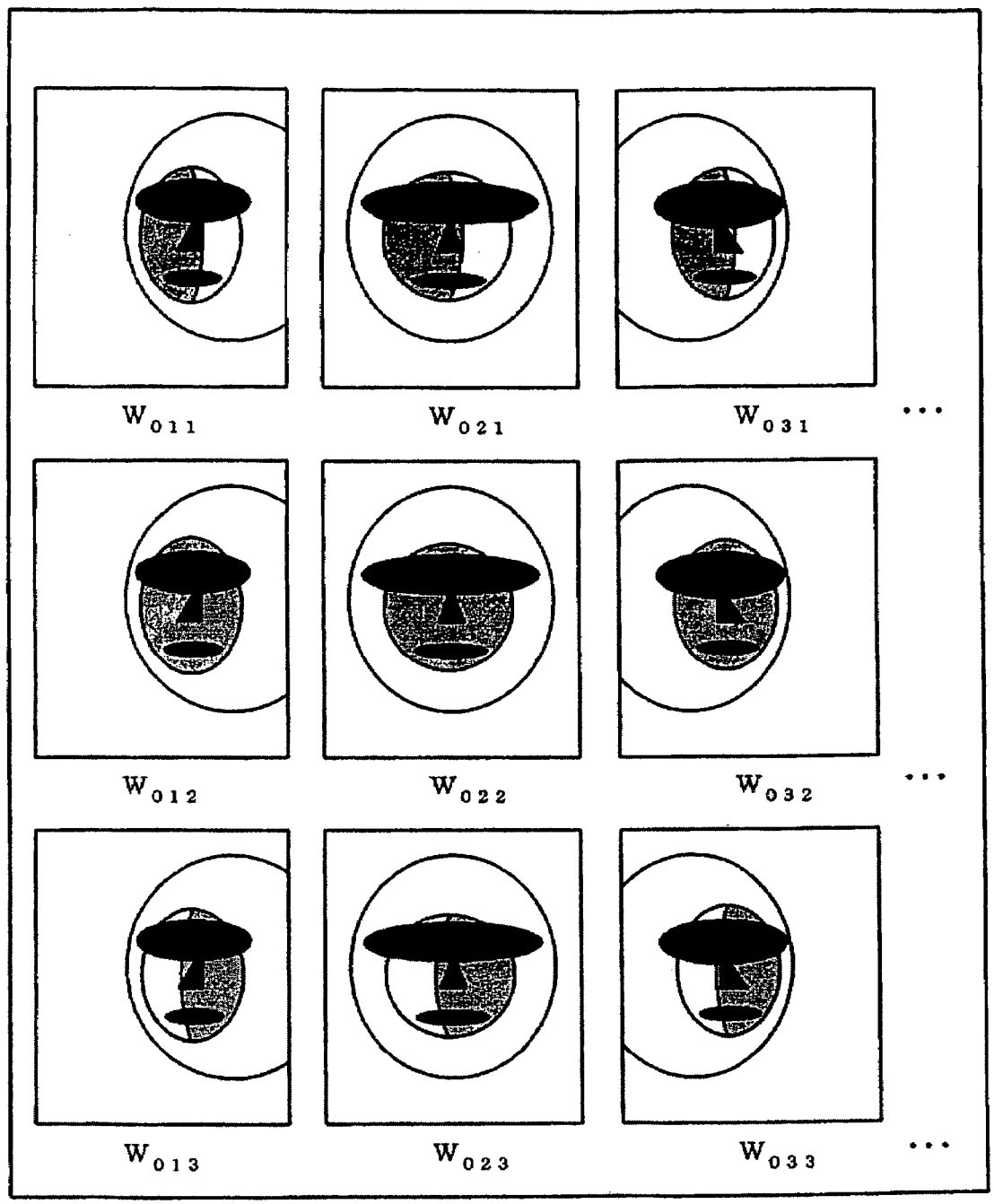
FIG. 50 is a diagram showing a specific example of pose- and variation-specific standard weighting coefficients according to the eighth embodiment.

First, an input image is obtained by image input unit 10 (step 100 in FIG. 49). Then, normalizer 15 aligns the input image using feature points extracted from the object, and generates a normalized image (step 101).

Variation estimator 36 determines a correspondence between the normalized image and an area of a three-dimensional object model, using the pose information of the reference images obtained from pose-specific reference image storage unit 85 and the standard three-dimensional object models obtained from standard three-dimensional object model storage unit 56, estimates a variation b based on image information of a given area, and sends a corresponding pose- and variation-specific standard weighting coefficient based on the estimated variation, among the pose- and variation-specific weighting coefficients stored in pose- and variation-specific standard weighting coefficient storage unit 98, to weighted matching and pose selecting unit 40 (step 181).

Finally, weighted matching and pose selecting unit 40 calculates weighted distance values (or similarity degrees) between the normalized image and the pose-specific reference images obtained from pose-specific reference image storage unit 85, using the pose- and variation-specific standard weighting coefficients obtained from pose- and variation-specific standard weighting coefficient storage unit 98 (step 147), and selects a reference image (pose) whose distance value up to the object is the smallest, thereby estimating an optimum pose (step 155).

Advantages of the eighth embodiment will be described below.

According to the eighth embodiment, weighted distances are calculated using pose-specific weighting coefficients corresponding to pose-specific reference images. Therefore, highly accurate pose estimation and matching can be performed by setting appropriate weighting coefficients depending on poses.

According to the present embodiment, furthermore, because a standard weighting coefficient representing an average of weighting coefficients of a plurality of objects is held, the storage capacity for storing the standard three-dimensional weighting coefficient is much smaller than if reference three-dimensional weighting coefficients are to be held for objects. It is not necessary to capture learning images corresponding to reference images upon registration.

According to the present invention, moreover, pose- and variation-specific weighting coefficients corresponding variations which can occur in the input image are held, a variation is estimated from the normalized image, and a corresponding weighting coefficient is employed. Therefore, highly accurate pose estimation and matching can be performed by setting appropriate weighting coefficients depending on variations that may occur as object deformations and illuminating condition variations.

A specific example of operation of the eighth embodiment will be described below.

As shown in FIG. 38, pose-specific reference image storage unit 85 stores pose-specific reference images $R_{kj}$ of objects $C_k$. As shown in FIG. 43, pose- and variation-specific standard weighting coefficient storage unit 98 stores pose- and variation-specific standard weighting coefficients $W_{0jb}$. The pose- and variation-specific standard weighting coefficients can be determined by averaging pose- and variation-specific reference weighting coefficients for each pose and variation or prepared learning reference images for each pose and variation.

The estimation of a pose with respect to a model $C_1$ will be described below. It is assumed that an input image I(r) as shown in FIG. 28 is obtained by image input unit 10 (step 100 shown in FIG. 49).

Then, normalizer 15 aligns the input image using feature points extracted from the object, and generates a normalized image I'(r) (step 101). Variation estimator 36 determines a correspondence between the normalized image and an area of a three-dimensional object model, using the pose information $e_j$ of the reference images $R_{1j}$ obtained from pose-specific reference image storage unit 85 and the standard three-dimensional object models obtained from standard three-dimensional object model storage unit 56, estimates a variation b based on image information of a given area, and sends a corresponding pose- and variation-specific standard weighting coefficient based on the estimated variation, among the pose- and variation-specific weighting coefficients $W_{0jb}$ stored in pose- and variation-specific weighting coefficient storage unit 98, to weighted matching and pose selecting unit 40 (step 181).

Illumination variations are estimated as follows: If the front illuminating direction (b=2), the front illuminating direction (b=2), and the right illuminating direction (b=1) are determined respectively with respect to the pose information $e_1$, $e_2$, $e_3$, then pose- and variation-specific weighting coefficients $W_{112}$, $W_{122}$, $W_{131}$ are selected.

Finally, weighted matching and pose selecting unit 40 calculates weighted distance values $D_{1j}$ between the normalized image I'(r) and the pose-specific reference images $R_{1j}$, using the pose- and variation-specific standard weighting coefficients $W_{0jb}$(r) obtained from pose- and variation-specific standard weighting coefficient storage unit 98 (step 147), and selects a reference image (pose) whose distance value up to the object is the smallest, thereby estimating an optimum pose (step 155).

In the second and fourth embodiments of the present invention, a correspondence between standard three-dimensional weighting coefficients and reference three-dimensional models is determined using basic points, and two-dimensional weighting coefficients are generated. However, the correspondence may be calculated in advance, and standard three-dimensional weighting coefficients may be converted into reference three-dimensional weighting coefficients, and such reference three-dimensional weighting coefficients may be stored.

In the fifth through eighth embodiments of the present invention, the pose-specific reference weighting coefficients, the pose-specific standard weighting coefficients, the pose- and variation-specific reference weighting coefficients, and the pose- and variation-specific standard weighting coefficients are learned with respect to each pose (and each variation), using pose-specific learning reference images. However, as with the first through fourth embodiments, reference three-dimensional object models may be used, an error between an input image and reference images may be inversely converted into those on the three-dimensional object models, and three-dimensional weighting coefficients may be learned and then converted depending on the pose, thereby generating weighting coefficients. The reference three-dimensional object models may be generated from the learning reference images or may be generated using a three-dimensional shape measuring apparatus. Learning reference images do not need to be necessarily prepared depending on poses.

In the third, fourth, seventh, and eighth embodiments, variations have been described as occurring in illuminating conditions. However, variations are not limited to occurring in illuminating conditions. If variations occur as object shape deformations (facial changes if an object is the face of a person), then the variations can be estimated using image information of a given area. For example, the opening and closing of an eye or the opening and closing of a mouth can be estimated by preparing image templates and matching the eye or the mouth against the image templates. Alternatively, the estimation of variations may not be performed, but all variation-specific three-dimensional weighting coefficients or pose- and variation-specific weighting coefficients may be used to perform weighted matching, and a variation whose distance value is the smallest (whose similarity degree is the greatest) may be selected.

In each of the embodiments of the present invention, for pose estimation, weighting coefficients are used and weighted distances are calculated. However, if matching is the purpose to be achieved, then for pose estimation, distance calculations which do not use weighting coefficients may be carried out to determine an optimum pose, and then weighted distances may be calculated again.

In each of the embodiments of the present invention, weighting coefficients are determined according to the reciprocal of an average of errors of pixels between an input image (or a normalized image) and reference images (or comparative images). However, weighting coefficients are not limited to being determined in the above manner. Rather than an input image of the same object as for reference images, an input image of a different object may be used and learned. At this time, if an average error averaged over a learning image of an object $C_k$ is represented by $E_Q^k$ and an average error averaged over a learning image of another object by $E_Q^{k-}$, then reference three-dimensional weighting coefficients may be established according to $V_Q^k = A'E_Q^k - /E_Q^k$ (A' indicates a normalization coefficient), for example.

The functions of the means as the components of the object pose estimating and matching system according to the present invention may be hardware-implemented or may be performed by loading an object pose estimating and matching program (application) which performs the functions of the above means, into a memory of a computer and controlling the computer. The object pose estimating and matching program is stored in a recording medium such as a magnetic disk, a semiconductor memory, or the like, and loaded from the recording medium into the computer.

While the preferred embodiments of the present invention have been described above. the present invention is not limited to the above embodiments, but may be modified in various ways within the scope of the technical ideas thereof.

The invention claimed is:

1. An object pose estimating and matching system comprising:
    reference three-dimensional object model storage means for storing, in advance, reference three-dimensional object models of objects;
    standard three-dimensional weighting coefficient storage means for storing, in advance, standard three-dimensional weighting coefficients;
    reference three-dimensional basic point storage means for storing, in advance, reference three-dimensional basic points corresponding to said reference three-dimensional object models;

standard three-dimensional basic point storage means for storing, in advance, standard three-dimensional basic points corresponding to standard three-dimensional object models;

pose candidate determining means for determining pose candidates for an object;

comparative image generating means for generating comparative images close to an input image depending on said pose candidates, based on said reference three-dimensional object models;

weighting coefficient converting means for determining a coordinate correspondence between said standard three-dimensional weighting coefficients and said reference three-dimensional object models, using said standard three-dimensional basic points and said reference three-dimensional basic points, and converting said standard three-dimensional weighting coefficients into two-dimensional weighting coefficients depending on said pose candidates; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

2. An object pose estimating and matching system comprising:

reference three-dimensional object model storage means for storing, in advance, reference three-dimensional object models of objects;

variation-specific standard three-dimensional weighting coefficient storage means for storing, in advance, standard three-dimensional weighting coefficients corresponding to image variations;

reference three-dimensional basic point storage means for storing, in advance, reference three-dimensional basic points corresponding to said reference three-dimensional object models;

standard three-dimensional basic point storage means for storing, in advance, standard three-dimensional basic points corresponding to standard three-dimensional object models;

pose candidate determining means for determining pose candidates for an object;

variation estimating means for determining a correspondence between an area of a three-dimensional object model and an input image, using said pose candidates and said reference three-dimensional object models, and estimating a variation based on image information of a given area of said input image;

comparative image generating means for generating comparative images close to said input image depending on said pose candidates, based on said reference three-dimensional object models;

weighting coefficient converting means for determining a coordinate correspondence between said standard three-dimensional weighting coefficients corresponding to the estimated variation and said reference three-dimensional object models, using said standard three-dimensional basic points and said reference three-dimensional basic points, and converting said standard three-dimensional weighting coefficients into two-dimensional weighting coefficients depending on said pose candidates; and weighted matching and pose selecting means for calculating weighted distance values or similarity degrees between said input image and said comparative images, using said two-dimensional weighting coefficients, and selecting one of the comparative images whose distance value up to said object is the smallest or whose similarity degree with respect to said object is the greatest, thereby to estimate and match the pose of said object.

3. An object pose estimating and matching system according to claim 1, further comprising:

three-dimensional object model registering means for registering reference three-dimensional object models in said reference three-dimensional object model storage means; and three-dimensional basic point registering means for determining reference three-dimensional basic points with respect to said reference three-dimensional object models, and registering the determined reference three-dimensional basic points in said reference three-dimensional basic point storage means.

* * * * *